(12) United States Patent
Guo et al.

(10) Patent No.: US 12,722,814 B2
(45) Date of Patent: Sep. 1, 2026

(54) REPOSITIONABLE CHARGING HUBS IN BASE STATIONS FOR UNMANNED AERIAL VEHICLES

(71) Applicant: Skydio, Inc., San Mateo, CA (US)

(72) Inventors: Jia Guo, Redwood City, CA (US); Yevgeniy Andreyevich Kozlenko, New Fairfield, CT (US); George Oliver Turvey, Brookdale, CA (US); Yee Shan Woo, Campbell, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/190,255

(22) Filed: Apr. 25, 2025

(65) Prior Publication Data

US 2026/0048873 A1 Feb. 19, 2026

Related U.S. Application Data

(60) Provisional application No. 63/683,498, filed on Aug. 15, 2024.

(51) Int. Cl.
*B64U 70/99* (2023.01)
*B64F 1/35* (2024.01)
(Continued)

(52) U.S. Cl.
CPC ................ *B64U 70/99* (2023.01); *B64F 1/35* (2024.01); *B64U 70/90* (2023.01); *B64U 70/95* (2023.01);
(Continued)

(58) Field of Classification Search
CPC ........ B64U 80/25; B64U 70/95; B64U 70/99; B64U 10/14; B64U 80/30
See application file for complete search history.

(56) References Cited

U.S. PATENT DOCUMENTS 3,253,806 A * 5/1966 Eickmann ............... B64C 27/12 244/17.23
3,417,729 A * 12/1968 Gilday .................. B64C 27/006 416/61

(Continued)

FOREIGN PATENT DOCUMENTS

CN 108945441 A 12/2018
CN 112406607 A 2/2021

(Continued)

OTHER PUBLICATIONS

International Search Report and Written Opinion mailed on Oct. 21, 2025 in corresponding PCT Application No. PCT/US2025/042012.

*Primary Examiner* — Medhat Badawi
(74) *Attorney, Agent, or Firm* — Young Basile Hanlon & MacFarlane, P.C.

(57) ABSTRACT

A charging hub for a base station that is configured to receive an unmanned aerial vehicle (UAV) during docking. The charging hub includes: a charging base; a registration member that is connected to the charging base and which is configured for engagement with the UAV; and a charging head that is configured for electrical connection to the UAV. The charging head is repositionable in relation to the charging base and the registration member between normal and deflected positions to facilitate alignment between corresponding electrical contacts on the UAV and the charging head.

20 Claims, 33 Drawing Sheets

(51) Int. Cl.

| | |
|---|---|
| ***B64U 70/90*** | (2023.01) |
| ***B64U 70/95*** | (2023.01) |
| ***B64U 70/97*** | (2023.01) |
| ***B64U 80/25*** | (2023.01) |
| ***H01R 13/52*** | (2006.01) |
| *B64U 10/14* | (2023.01) |
| *B64U 80/30* | (2023.01) |

(52) U.S. Cl.
CPC ............. *B64U 70/97* (2023.01); *B64U 80/25* (2023.01); *H01R 13/5227* (2013.01); *B64U 10/14* (2023.01); *B64U 80/30* (2023.01)

(56) References Cited

U.S. PATENT DOCUMENTS 3,483,696 A * 12/1969 Gilbert .................... B64C 27/08 416/157 R
3,575,527 A * 4/1971 Watanabe ............. F04D 29/052 416/169 R
3,805,723 A * 4/1974 Bernaerts ............... B63H 3/002 416/61
4,262,712 A * 4/1981 Young ...................... B67D 7/54 141/DIG. 1
4,865,248 A * 9/1989 Barth .................... E05B 35/086 312/215
4,954,962 A * 9/1990 Evans, Jr. ............ G05D 1/0246 701/28
5,040,116 A * 8/1991 Evans, Jr. ............ G05D 1/0246 701/28
5,116,273 A * 5/1992 Chan ...................... A45B 23/00 160/370.21
5,283,739 A * 2/1994 Summerville ....... G05D 1/0289 700/255
5,371,581 A * 12/1994 Wangler ................ G01S 17/933 340/963
5,386,462 A * 1/1995 Schlamp ................. G07F 11/62 379/93.12
5,452,374 A * 9/1995 Cullen ...................... G06T 7/70 382/296
5,478,250 A 12/1995 Hoffman
5,497,236 A * 3/1996 Wolff ..................... H04N 1/047 358/406
5,731,884 A * 3/1998 Inoue ................... H04N 1/4076 358/3.06
5,842,667 A * 12/1998 Jones ........................ B64F 1/00 244/114 R
5,847,522 A * 12/1998 Barba .................. H02K 7/1025 318/269
5,850,135 A 12/1998 Kuki et al.
5,901,253 A * 5/1999 Tretter .................... G06T 3/606 382/292
5,995,898 A * 11/1999 Tuttle ..................... G07C 5/085 427/255.31
6,031,612 A * 2/2000 Shirley ............. G01B 11/2531 356/511
6,073,283 A * 6/2000 Zheng .................... A47G 9/062 5/502
6,079,668 A * 6/2000 Brown ...................... B64F 1/36 244/114 R
6,266,577 B1 * 7/2001 Popp ...................... B25J 9/1682 700/248
6,344,796 B1 * 2/2002 Ogilvie .................... G07C 9/27 340/568.1
6,374,155 B1 * 4/2002 Wallach ............... G05D 1/0295 701/25
6,426,699 B1 * 7/2002 Porter ..................... A47F 10/00 340/568.1
6,507,670 B1 * 1/2003 Moed ........................ G06T 5/77 382/172
6,543,983 B1 * 4/2003 Felder .................. B23Q 7/1442 414/389
6,636,781 B1 * 10/2003 Shen ........................ B25J 9/065 703/2
6,676,460 B1 * 1/2004 Motsenbocker ....... B63H 5/165 440/71
6,690,997 B2 * 2/2004 Rivalto ............. G06Q 10/0835 700/242
6,694,217 B2 * 2/2004 Bloom ..................... G07C 9/21 700/242
6,705,523 B1 * 3/2004 Stamm ................... G06Q 10/08 235/383
6,804,607 B1 * 10/2004 Wood .................. G05D 1/1062 340/425.5
6,919,803 B2 * 7/2005 Breed .................. G08B 29/181 340/568.1
6,954,290 B1 * 10/2005 Braudaway ........ H04N 1/00045 358/488
6,961,711 B1 * 11/2005 Chee ......................... G07F 7/00 705/26.1
6,965,440 B1 * 11/2005 Nakagiri ............... G06F 3/1262 715/251
6,970,838 B1 * 11/2005 Kamath ............ G06Q 30/0617 705/26.81
7,006,952 B1 * 2/2006 Matsumoto ............... G06F 7/60 703/2
7,016,536 B1 * 3/2006 Ling ...................... G06V 30/15 382/290
7,031,519 B2 * 4/2006 Elmenhurst ........... G06F 18/254 382/101
7,082,883 B1 * 8/2006 Arias ..................... A47C 31/11 108/90
7,129,817 B2 * 10/2006 Yamagishi ............... G07C 9/37 340/5.71
7,133,743 B2 * 11/2006 Tilles ...................... G07F 17/13 700/242
7,145,699 B2 * 12/2006 Dolan ................ G06V 30/1478 358/452
7,149,611 B2 * 12/2006 Beck ...................... B64U 30/26 701/32.4
7,171,879 B2 * 2/2007 Gass ...................... B27G 21/00 83/477.1
7,188,513 B2 * 3/2007 Wilson ................. G01N 1/2226 73/864.81
7,334,755 B2 * 2/2008 Svoboda, Jr. ........... B64C 27/08 244/17.23
7,335,071 B1 * 2/2008 Motsenbocker ....... B63H 23/30 440/71
7,337,686 B2 * 3/2008 Sagi-Dolev ............ G01V 11/00 73/866
7,337,944 B2 * 3/2008 Devar .................... A47G 29/16 232/19
7,339,993 B1 * 3/2008 Brooks .......... H04N 21/440281 375/240.1
7,459,880 B1 * 12/2008 Rosen ................. H01M 10/465 320/101
7,639,386 B1 * 12/2009 Siegel .................... G06Q 40/03 358/1.18
7,668,404 B2 * 2/2010 Adams ................... G06V 10/24 382/101
7,673,831 B2 * 3/2010 Steele ................... F42B 12/365 244/1 TD
7,685,953 B2 * 3/2010 Giles ........................ B63J 99/00 114/72
7,693,745 B1 * 4/2010 Pomerantz .............. G07F 17/13 705/26.5
7,894,939 B2 * 2/2011 Zini ....................... G05D 1/028 700/245
7,925,375 B2 * 4/2011 Schininger .............. G07F 11/54 700/214
7,946,526 B2 * 5/2011 Zimet .................... B64U 30/24 244/17.23
7,946,530 B1 * 5/2011 Talmage, Jr. ......... B64C 27/006 244/140
7,966,093 B2 * 6/2011 Zhuk .................... G05D 1/0088 706/50
8,007,308 B2 8/2011 Feldman et al.

(56) References Cited

U.S. PATENT DOCUMENTS 8,015,023 B1 * 9/2011 Lee ........................ G06Q 10/08
700/226
8,052,081 B2 * 11/2011 Olm ........................ B64U 10/13
244/17.23
8,078,317 B2 * 12/2011 Allinson ................. G07F 11/62
700/242
8,126,642 B2 * 2/2012 Trepagnier ............. G05D 1/024
701/28
8,131,607 B2 * 3/2012 Park ..................... G06Q 10/047
705/28
8,145,351 B2 * 3/2012 Schininger .............. G07F 9/009
221/12
8,195,328 B2 * 6/2012 Mallett .................. G16H 40/67
221/102
8,245,469 B2 * 8/2012 Rubel ...................... E04B 5/48
52/223.6
8,256,172 B2 * 9/2012 Benson ............. E04F 15/02183
52/489.1
8,286,236 B2 * 10/2012 Jung ...................... G06Q 50/18
713/168
8,412,588 B1 * 4/2013 Bodell ............... G06Q 30/0643
706/919
8,418,959 B2 * 4/2013 Kang ..................... B64U 80/25
244/116
8,429,754 B2 * 4/2013 Jung ......................... H04L 9/40
726/21
8,511,606 B1 * 8/2013 Lutke ..................... B64U 80/40
320/109
8,599,027 B2 * 12/2013 Sanchez ................ G01S 13/931
340/435
8,602,349 B2 * 12/2013 Petrov .................. G05D 1/0866
244/17.23
8,639,400 B1 * 1/2014 Wong ..................... A63H 27/12
701/16
8,721,355 B2 5/2014 Belack
8,736,820 B2 * 5/2014 Choe ...................... G05D 1/024
356/9
8,752,166 B2 * 6/2014 Jung ...................... B33Y 50/02
700/95
8,791,790 B2 * 7/2014 Robertson ................ G07C 9/20
455/411
8,874,301 B1 * 10/2014 Rao ........................ B60K 28/04
340/576
8,899,903 B1 * 12/2014 Saad ...................... B65G 67/00
320/109
8,948,914 B2 * 2/2015 Zini ................. G05B 19/41895
700/258
8,956,100 B2 * 2/2015 Davi ......................... B60P 1/02
414/334
8,989,053 B1 * 3/2015 Skaaksrud .............. H04W 4/80
370/255
9,033,285 B2 * 5/2015 Iden ........................ B61C 17/12
701/19
9,050,997 B1 * 6/2015 Schramm ............... B62D 6/002
9,051,043 B1 * 6/2015 Peeters ................... G05D 1/104
9,056,676 B1 * 6/2015 Wang ........................ B60R 9/00
9,079,587 B1 * 7/2015 Rupp ................... G05D 1/0289
9,126,693 B1 * 9/2015 Shi ....................... G05D 1/0669
9,139,310 B1 * 9/2015 Wang ..................... G05D 1/102
9,163,909 B2 * 10/2015 Chengalva ........... G05D 1/0088
9,193,452 B2 * 11/2015 Carreker ................. B64C 27/52
9,195,959 B1 * 11/2015 Lopez ................ G06Q 30/0635
9,216,587 B2 * 12/2015 Ando ....................... B41J 29/38
9,216,857 B1 * 12/2015 Kalyan ................ G06Q 10/087
9,235,213 B2 * 1/2016 Villamar .............. G06Q 10/087
9,244,147 B1 * 1/2016 Soundararajan ... G06Q 10/0833
9,256,852 B1 * 2/2016 Myllymaki ............. B60P 3/007
9,261,578 B2 * 2/2016 Im ...................... G01S 5/02526
9,290,277 B2 * 3/2016 You ........................ B64U 50/34
9,321,531 B1 * 4/2016 Takayama ............. B64D 47/06
9,336,635 B2 * 5/2016 Robertson .......... G07C 9/00571
9,358,975 B1 * 6/2016 Watts .................. G05D 1/0223
9,381,916 B1 * 7/2016 Zhu .................. B60W 30/0956
9,387,928 B1 * 7/2016 Gentry ................... B64U 50/39
9,397,518 B1 * 7/2016 Theobald ................. B25J 5/005
9,404,761 B2 * 8/2016 Meuleau ............ G01C 21/3453
9,409,644 B2 * 8/2016 Stanek ................. G05D 1/0202
9,411,337 B1 * 8/2016 Theobald ............. G05D 1/0225
9,412,280 B1 * 8/2016 Zwillinger ............... G08G 5/54
9,421,869 B1 * 8/2016 Ananthanarayanan ......................
B60L 5/005
9,436,183 B2 * 9/2016 Thakur ............. G01C 21/3407
9,436,926 B2 * 9/2016 Cousins ............... G05D 1/0246
9,446,858 B2 * 9/2016 Hess ......................... B64F 3/02
9,448,559 B2 * 9/2016 Kojo ................. G01C 21/3685
9,457,899 B2 * 10/2016 Duffy ..................... B64U 10/16
9,489,490 B1 * 11/2016 Theobald ............... G16H 20/13
9,527,605 B1 * 12/2016 Gentry ................. G05D 1/0094
9,535,421 B1 * 1/2017 Canoso ................ G05D 1/0214
9,545,852 B2 * 1/2017 Streett ........................ H02J 7/35
9,551,989 B2 * 1/2017 Scarlatti ................... G05D 1/00
9,561,941 B1 * 2/2017 Watts .................. G05D 1/0268
9,563,201 B1 * 2/2017 Tofte ...................... H04N 23/90
9,568,335 B2 * 2/2017 Thakur ................ G05D 1/0217
9,582,950 B2 * 2/2017 Shimizu ................... G07C 9/28
9,589,448 B1 * 3/2017 Schneider ................. F41H 9/10
9,600,645 B2 * 3/2017 Fadell ..................... H04L 67/12
9,619,776 B1 * 4/2017 Ford ...................... B64U 80/86
9,623,562 B1 * 4/2017 Watts ..................... B25J 13/006
9,643,722 B1 * 5/2017 Myslinski .............. G05D 1/689
9,650,136 B1 * 5/2017 Haskin ................... B64U 10/13
9,652,912 B2 * 5/2017 Fadell .................... G06Q 10/08
9,656,805 B1 * 5/2017 Evans .................... B64U 80/25
9,671,791 B1 * 6/2017 Paczan ..................... G08G 5/57
9,676,481 B1 * 6/2017 Buchmueller ....... G05D 1/0094
9,677,564 B1 * 6/2017 Woodworth ........... B64U 20/30
9,697,730 B2 * 7/2017 Thakur ................ G08G 1/0112
9,718,564 B1 * 8/2017 Beckman ............ B61L 15/0027
9,720,414 B1 * 8/2017 Theobald ................. B25J 5/007
9,731,821 B2 * 8/2017 Hoareau ................ G06Q 10/08
9,733,646 B1 * 8/2017 Nusser ................... B65G 57/03
9,746,852 B1 * 8/2017 Watts ...................... G01S 17/86
9,746,853 B2 * 8/2017 Scheepjens .......... G05D 1/0212
9,778,653 B1 * 10/2017 McClintock ........... G06Q 10/08
9,783,075 B2 * 10/2017 Henry ..................... B60L 53/36
9,783,301 B2 * 10/2017 Schliwa ............. B64D 11/0007
9,786,187 B1 * 10/2017 Bar-Zeev ......... G06Q 10/08355
9,796,529 B1 * 10/2017 Hoareau ................ G06Q 10/08
9,815,633 B1 * 11/2017 Kisser .................... B65G 37/02
9,828,092 B1 * 11/2017 Navot .................... B64U 10/14
9,858,604 B2 * 1/2018 Apsley ............... G06Q 30/0635
9,886,035 B1 * 2/2018 Watts .................. G05D 1/0088
9,896,204 B1 * 2/2018 Willison ................ G05D 1/102
9,957,045 B1 * 5/2018 Daly ...................... B64U 50/19
9,959,771 B1 * 5/2018 Carlson .................... G08G 5/57
9,974,612 B2 * 5/2018 Pinter .................... A61B 5/741
10,011,352 B1 * 7/2018 Dahlstrom ............. B64U 10/60
10,022,753 B2 * 7/2018 Chelian ................... B07C 5/362
10,048,697 B1 * 8/2018 Theobald ............... B65G 47/61
10,099,561 B1 * 10/2018 Ananthanarayanan ......................
B60L 53/126
10,099,785 B1 * 10/2018 Gonzalez ............... B64U 50/31
10,108,185 B1 * 10/2018 Theobald ........... G05B 19/4189
10,112,712 B1 * 10/2018 Gentry .................... B60L 53/51
10,137,984 B1 * 11/2018 Flick ......................... B64F 1/00
10,176,722 B1 * 1/2019 Boyd ....................... G08G 5/57
10,239,638 B1 * 3/2019 Cohen .................... B64U 70/50
10,268,208 B1 * 4/2019 Hopwood Thomas ......................
G05D 1/0676
10,287,033 B2 * 5/2019 Hu ........................... B64F 1/02
10,310,501 B2 * 6/2019 Greenberger ........... H02J 7/342
10,418,830 B1 * 9/2019 Parodi ................... H02J 7/0042
10,434,885 B2 * 10/2019 Antonini ................. B64C 25/52
10,467,685 B1 * 11/2019 Brisson ................ G06Q 10/083
10,526,094 B2 * 1/2020 Cheng .................... B64U 80/25
10,558,226 B1 * 2/2020 Bigdeli .................. G06V 10/22
10,577,126 B2 * 3/2020 Mozer ....................... B64F 1/02
10,618,675 B2 * 4/2020 Conyers .................. H02S 99/00
10,719,080 B2 * 7/2020 Zhang ....................... B64F 5/60
10,745,102 B2 * 8/2020 Nysæter ................. B64U 30/20
10,745,132 B1 * 8/2020 Kimchi .................. B64U 10/13
10,780,988 B2 * 9/2020 Buchmueller ......... B64U 50/19

(56) References Cited

U.S. PATENT DOCUMENTS

D903,576 S * 12/2020 Feldman .................... D12/345
10,860,115 B1 * 12/2020 Tran ..................... G06F 3/0346
10,875,648 B2 * 12/2020 Schmalzried ......... B64C 39/024
10,899,436 B2 * 1/2021 Gentry .................. B64C 25/001
10,967,970 B2 * 4/2021 Van Niekerk .......... B64U 20/87
11,007,290 B2 * 5/2021 Kreitenberg ............. A61L 2/24
11,079,752 B1 * 8/2021 Lombardini ........... B64U 80/60
11,111,033 B1 * 9/2021 Burks ................... B64U 50/19
D932,369 S * 10/2021 Passley ..................... D12/16.1
11,148,805 B2 * 10/2021 Cooper .................. B64U 70/97
11,148,808 B2 * 10/2021 Wiggerich ............. B64U 30/26
11,164,149 B1 * 11/2021 Williams ......... G06K 19/06028
11,180,253 B1 * 11/2021 Seeley .................. B64U 60/50
11,235,890 B1 * 2/2022 Dahlstrom ............ B05B 13/005
11,292,620 B1 * 4/2022 Molony ............... B64G 1/1071
11,370,561 B2 * 6/2022 Ratajczak ................ G08G 5/55
11,453,514 B2 9/2022 Rainville
11,459,117 B1 * 10/2022 Shapiro .................... G08G 5/54
11,511,886 B1 * 11/2022 Tian ......................... B60P 3/11
11,534,801 B2 * 12/2022 Volta ....................... B66F 9/063
11,572,197 B1 * 2/2023 Nevdahs ................ B64U 50/19
11,597,515 B2 * 3/2023 Passley .................. B64F 1/007
11,597,516 B1 * 3/2023 Klinkmueller ......... B64U 70/20
11,603,218 B2 * 3/2023 Fisher .................... B64F 1/222
11,603,219 B2 * 3/2023 Ratajczak ................ G05D 1/46
11,619,952 B2 * 4/2023 Kwon .................. G05D 1/0808
701/3
11,628,932 B2 * 4/2023 Seung ................... B64U 60/50
244/17.23
11,636,771 B2 * 4/2023 Barker ................... B64F 1/222
701/16
11,641,966 B2 * 5/2023 Nakanishi ............ A47G 29/124
232/44
11,649,050 B1 * 5/2023 Miller .................. G05D 1/0808
701/11
11,655,048 B2 5/2023 Sugimoto et al.
11,655,057 B1 5/2023 Greenberg et al.
11,667,402 B2 * 6/2023 Liske .................... B64U 80/25
244/116
11,673,690 B2 * 6/2023 Dayan ................... B64U 70/97
244/114 R
11,710,092 B2 * 7/2023 Dearing ............ G07C 9/00896
705/330
11,713,117 B2 8/2023 Stanhope et al.
11,713,136 B2 * 8/2023 Foggia ................... B64F 1/222
244/114 R
11,714,189 B2 * 8/2023 Padmanabhan ......... G01S 19/51
342/22
11,738,867 B2 * 8/2023 Ehasoo ................... B60L 53/00
244/17.11
11,741,422 B2 * 8/2023 Gil .................. G06Q 10/08355
705/338
11,748,688 B2 * 9/2023 Ur ........................ B64C 39/024
705/332
11,760,485 B2 * 9/2023 Wabnegger ............. H02G 1/02
244/121
11,767,129 B2 * 9/2023 Warwick ............... B64C 39/024
244/137.1
11,772,814 B2 * 10/2023 Dubois .................. B64U 70/83
244/110 E
11,772,819 B2 10/2023 Shah et al.
11,776,136 B1 * 10/2023 Pachikov ............... B64U 10/13
244/17.23
11,780,606 B2 * 10/2023 Carthew ................ B64U 70/99
244/114 R
11,794,894 B2 * 10/2023 Brock .................... B64U 30/20
11,794,922 B1 * 10/2023 Twyford ................ B64U 80/25
11,808,580 B1 * 11/2023 Ebrahimi Afrouzi .......................
G01C 21/1656
11,814,191 B2 * 11/2023 Cheng ..................... B64F 1/005
11,814,241 B2 * 11/2023 Tian ......................... B60P 3/11
D1,008,873 S * 12/2023 Lin ............................ D12/16.1
11,840,152 B2 * 12/2023 Fisher ..................... B64C 29/02
11,851,162 B1 * 12/2023 Daube ..................... B64C 19/00
11,851,209 B2 * 12/2023 Fisher ..................... B64F 1/005
11,858,662 B2 * 1/2024 Gil ......................... B64U 80/10
11,866,168 B2 * 1/2024 Cooper .................. B64U 70/97
11,868,146 B2 * 1/2024 Yasunaga ............. G05D 1/0094
11,873,116 B2 * 1/2024 Kozlenko ................. B64F 1/18
11,884,422 B2 * 1/2024 Lowe ................. H05K 7/20436
11,898,368 B2 * 2/2024 Blake ..................... B64U 80/10
11,900,823 B2 * 2/2024 Surace ................... G05D 1/042
11,912,438 B2 2/2024 Wankewycz et al.
11,932,315 B2 * 3/2024 Hwang ..................... B64F 1/32
11,933,613 B2 * 3/2024 Michini ................. G05D 1/689
11,939,046 B1 * 3/2024 Berry ...................... B64C 27/08
11,939,057 B2 * 3/2024 Hamm ................... B64U 20/70
11,939,080 B2 * 3/2024 Cowden ................. B64U 80/30
11,939,083 B2 * 3/2024 Baklycki ................... B64F 1/36
11,986,115 B2 * 5/2024 Walsh ..................... B64F 1/362
D1,032,432 S 6/2024 Liao et al.
12,017,553 B2 * 6/2024 Lowe ..................... B64U 70/97
12,020,582 B2 * 6/2024 Barker .................... B64F 1/222
12,043,421 B2 7/2024 Cevacins et al.
12,059,089 B1 * 8/2024 Dunn .................. A47G 29/141
12,084,211 B2 * 9/2024 Li .......................... B64U 70/99
12,091,194 B2 * 9/2024 Wang ...................... E05F 15/00
12,099,370 B2 * 9/2024 Jourdan ............... G05D 1/0676
12,134,329 B2 * 11/2024 Todeschini ........... G05D 1/0202
12,168,533 B1 * 12/2024 Hinman ................. B64U 70/97
12,172,777 B2 * 12/2024 Carthew ................ B64U 70/93
12,183,940 B2 * 12/2024 Bell ..................... G05D 1/0202
12,195,213 B2 * 1/2025 Qi .......................... B64U 70/97
12,227,318 B1 * 2/2025 Bata ....................... B64U 20/83
12,246,610 B2 * 3/2025 Altenhofen ............ B64U 70/92
12,275,318 B2 * 4/2025 Lowe ..................... B64U 70/92
12,280,901 B2 * 4/2025 Smith ..................... B64F 1/005
12,330,811 B2 * 6/2025 Fisher .................... B64U 70/80
12,337,992 B2 6/2025 Johnson
12,378,002 B2 * 8/2025 Kozlenko .............. B64U 70/30
12,378,017 B2 * 8/2025 Woo ....................... B64U 80/70
12,415,634 B2 * 9/2025 Fu ............................. H02J 7/34
2001/0045449 A1 * 11/2001 Shannon .................. G07C 9/21
232/19
2002/0016726 A1 * 2/2002 Ross ...................... G06Q 10/08
705/339
2002/0035450 A1 * 3/2002 Thackston ......... G05B 19/4099
703/1
2002/0072979 A1 * 6/2002 Sinha ................... G06Q 10/087
705/26.7
2002/0087375 A1 * 7/2002 Griffin ............... G06Q 10/0835
705/336
2002/0107751 A1 * 8/2002 Rajagopalan ...... G06Q 30/0627
705/26.7
2002/0111914 A1 * 8/2002 Terada ................... G06Q 30/02
705/60
2002/0116289 A1 * 8/2002 Yang ...................... G06Q 10/08
705/26.81
2002/0123930 A1 * 9/2002 Boyd ................ G06Q 30/0254
705/14.1
2002/0156645 A1 * 10/2002 Hansen ................... G07F 17/13
705/26.1
2003/0040980 A1 * 2/2003 Nakajima ............... G07F 17/13
705/26.8
2003/0072031 A1 * 4/2003 Kuwata .............. H04N 1/00188
358/1.15
2003/0121968 A1 * 7/2003 Miller ..................... G07F 17/13
235/375
2003/0141411 A1 * 7/2003 Pandya .................. G06Q 10/02
244/114 R
2004/0002898 A1 * 1/2004 Kuhlmann ......... G06Q 30/0635
705/26.81
2004/0068416 A1 * 4/2004 Solomon .............. G05D 1/0088
446/454
2004/0112660 A1 * 6/2004 Johansson ............... B63B 27/19
180/167
2004/0160335 A1 * 8/2004 Reitmeier ........... A47J 31/4407
340/4.12
2004/0162638 A1 * 8/2004 Solomon .............. G05D 1/0088
700/247

(56) References Cited

U.S. PATENT DOCUMENTS

2004/0256519 A1* 12/2004 Ellis .......... B64F 1/125 244/110 E
2004/0257199 A1* 12/2004 Fitzgibbon .......... G07C 9/00182 340/5.71
2005/0051667 A1* 3/2005 Arlton .......... G08B 13/19621 244/17.11
2005/0061910 A1* 3/2005 Wobben .......... B64C 29/00 244/17.23
2005/0068178 A1* 3/2005 Lee .......... G06Q 30/06 700/214
2005/0093865 A1* 5/2005 Jia .......... H04N 1/38 345/426
2005/0102240 A1* 5/2005 Misra .......... G06Q 30/06 705/59
2005/0178894 A1* 8/2005 McGeer .......... B64U 70/70 244/63
2005/0244060 A1* 11/2005 Nagarajan .......... H04N 1/41 382/302
2005/0285934 A1* 12/2005 Carter .......... H04N 7/147 348/14.06
2006/0038067 A1* 2/2006 Dennis .......... B64F 1/06 244/63
2006/0053534 A1* 3/2006 Mullen .......... F41H 7/005 2/456
2006/0118162 A1* 6/2006 Saelzer .......... H02J 3/38 136/246
2006/0136237 A1* 6/2006 Spiegel .......... G06Q 10/0835 705/13
2006/0249622 A1* 11/2006 Steele .......... B64U 80/20 244/115
2006/0287829 A1* 12/2006 Pashko-Paschenko .......... G08G 5/723 340/436
2007/0016496 A1* 1/2007 Bar .......... G06Q 10/087 705/28
2007/0073552 A1* 3/2007 Hileman .......... G06Q 10/08 705/333
2007/0102565 A1* 5/2007 Speer .......... B64U 10/20 244/2
2007/0150375 A1* 6/2007 Yang .......... G06Q 10/08 705/26.81
2007/0170237 A1* 7/2007 Neff .......... A47G 29/122 232/36
2007/0176432 A1* 8/2007 Rolt .......... F03D 9/255 290/55
2007/0210953 A1* 9/2007 Abraham .......... G08G 5/57 342/36
2007/0233337 A1* 10/2007 Plishner .......... G05D 1/0295 701/23
2007/0244763 A1* 10/2007 Williams .......... G06Q 10/10 705/26.1
2007/0246601 A1* 10/2007 Layton .......... B64C 39/10 244/12.2
2007/0262195 A1* 11/2007 Bulaga .......... B64U 10/20 244/12.4
2007/0293978 A1* 12/2007 Wurman .......... G05B 19/4189 700/213
2008/0012697 A1* 1/2008 Smith .......... B60K 35/50 340/439
2008/0027591 A1* 1/2008 Lenser .......... G05D 1/0038 701/28
2008/0100258 A1* 5/2008 Ward .......... H01M 10/465 320/101
2008/0109246 A1* 5/2008 Russell .......... G06Q 10/04 414/800
2008/0111816 A1* 5/2008 Abraham .......... G06Q 30/06 345/420
2008/0141921 A1* 6/2008 Hinderks .......... F01L 3/22 114/274
2008/0150679 A1* 6/2008 Bloomfield .......... B60R 25/24 340/5.72
2008/0154659 A1* 6/2008 Bettes .......... G06Q 10/08 705/7.36
2008/0167817 A1* 7/2008 Hessler .......... G01C 21/005 701/514
2008/0184906 A1* 8/2008 Kejha .......... B64D 27/33 102/374
2008/0189012 A1* 8/2008 Kaufmann .......... B62D 15/025 701/41
2008/0217486 A1* 9/2008 Colten .......... B64U 10/25 244/45 R
2008/0301009 A1* 12/2008 Plaster .......... G06Q 10/087 705/28
2009/0027253 A1* 1/2009 van Tooren .......... G08G 5/59 342/29
2009/0057486 A1* 3/2009 Becht, IV .......... B64F 1/007 244/114 R
2009/0062974 A1* 3/2009 Tamamoto .......... G05D 1/0295 701/25
2009/0063166 A1* 3/2009 Palmer .......... B65D 19/42 211/133.4
2009/0079388 A1* 3/2009 Reddy .......... G06Q 40/12 320/109
2009/0086275 A1* 4/2009 Liang .......... G06V 10/25 358/3.21
2009/0091435 A1* 4/2009 Bolourchi .......... B60K 28/066 340/575
2009/0106124 A1* 4/2009 Yang .......... G06Q 30/0601 705/26.1
2009/0149985 A1* 6/2009 Chirnomas .......... G07F 11/26 705/26.1
2009/0164379 A1* 6/2009 Jung .......... G06Q 10/06 705/310
2009/0165127 A1* 6/2009 Jung .......... G06Q 10/06 726/21
2009/0216394 A1* 8/2009 Heppe .......... B64U 20/87 701/16
2009/0236470 A1* 9/2009 Goossen .......... B64U 70/80 244/115
2009/0254457 A1* 10/2009 Folsom .......... G06Q 30/0601 705/26.1
2009/0254482 A1* 10/2009 Vadlamani .......... G06F 21/10 705/59
2009/0299903 A1* 12/2009 Hung .......... G06Q 20/40 235/462.11
2009/0303507 A1* 12/2009 Abeloe .......... B33Y 30/00 358/1.9
2009/0314883 A1* 12/2009 Arlton .......... B64U 80/40 244/63
2010/0007479 A1* 1/2010 Smith .......... B60W 50/14 340/576
2010/0030608 A1* 2/2010 Kaminsky .......... G06Q 10/10 707/E17.014
2010/0031351 A1* 2/2010 Jung .......... G06F 21/10 700/98
2010/0038480 A1* 2/2010 Wu .......... B64F 1/26 244/114 B
2010/0088163 A1* 4/2010 Davidson .......... G06Q 10/08 340/425.5
2010/0088175 A1* 4/2010 Lundquist .......... G06Q 30/0234 705/26.1
2010/0100269 A1* 4/2010 Ekhaguere .......... G08G 5/74 701/26
2010/0169185 A1* 7/2010 Cottingham .......... G06F 3/01 715/708
2010/0170993 A1* 7/2010 Misegades .......... B64C 7/00 244/130
2010/0206145 A1* 8/2010 Tetelbaum .......... B27G 19/02 83/13
2010/0287065 A1* 11/2010 Alivandi .......... G06Q 30/02 705/26.1
2010/0299067 A1* 11/2010 McCollough .......... G08G 5/51 701/301
2010/0299222 A1* 11/2010 Hamilton, IV .......... G06Q 20/12 705/26.1
2010/0320313 A1* 12/2010 Hanafin .......... B64F 1/125 244/114 R

(56) References Cited

U.S. PATENT DOCUMENTS

2011/0035149 A1* 2/2011 McAndrew .......... G05D 1/0077 701/466
2011/0068224 A1* 3/2011 Kang .......... B64U 80/25 244/116
2011/0074570 A1* 3/2011 Feldstein .......... G08B 13/196 348/E7.087
2011/0087350 A1* 4/2011 Fogel .......... G06T 19/00 700/98
2011/0112761 A1* 5/2011 Hurley .......... G06Q 10/08 701/465
2011/0153052 A1* 6/2011 Pettibone .......... G06F 30/13 700/98
2011/0166707 A1* 7/2011 Romanov .......... G01S 5/16 700/255
2011/0174925 A1* 7/2011 Ying .......... B64F 1/005 701/16
2011/0178711 A1* 7/2011 Christoph .......... G01S 7/51 701/301
2011/0210866 A1* 9/2011 David .......... G08G 1/166 340/901
2011/0227435 A1* 9/2011 Maeda .......... B60L 50/16 310/77
2011/0246331 A1* 10/2011 Luther .......... G06Q 30/0627 705/26.63
2011/0253831 A1* 10/2011 Cheng .......... A63H 27/12 244/17.11
2011/0264311 A1* 10/2011 Lee .......... H04N 7/183 348/E7.085
2011/0282476 A1* 11/2011 Hegemier .......... G06Q 30/0621 705/26.5
2011/0301787 A1* 12/2011 Chaperon .......... A63H 27/12 701/2
2011/0313878 A1* 12/2011 Norman .......... G06F 30/12 705/26.5
2012/0039694 A1* 2/2012 Suzanne .......... E04H 5/02 414/339
2012/0078592 A1* 3/2012 Sims, Jr. .......... G06F 30/00 703/1
2012/0080556 A1* 4/2012 Root, Jr. .......... B64F 1/06 73/170.28
2012/0091260 A1* 4/2012 Callou .......... G05D 1/0858 244/17.13
2012/0109419 A1* 5/2012 Mercado .......... G07C 9/00182 701/2
2012/0219397 A1* 8/2012 Baker .......... B65G 1/1373 414/796
2012/0221438 A1* 8/2012 Cook, Jr. .......... G06Q 30/0641 705/26.61
2012/0227389 A1* 9/2012 Hinderks .......... F02B 75/002 60/317
2012/0229325 A1* 9/2012 Dutruc .......... G01S 7/03 342/29
2012/0234969 A1* 9/2012 Savoye .......... B64U 10/13 244/17.11
2012/0235606 A1* 9/2012 Takeuchi .......... H02K 7/116 318/371
2012/0323365 A1* 12/2012 Taylor .......... G05D 1/0225 901/1
2013/0006739 A1* 1/2013 Horvitz .......... G06Q 30/0222 705/14.23
2013/0073477 A1* 3/2013 Grinberg .......... G06Q 30/00 705/332
2013/0081245 A1* 4/2013 Vavrina .......... B60L 53/51 29/281.1
2013/0093582 A1* 4/2013 Walsh .......... G08G 1/166 340/436
2013/0126611 A1* 5/2013 Kangas .......... G06K 7/10178 235/385
2013/0148123 A1* 6/2013 Hayashi .......... G03F 9/7046 356/401
2013/0193269 A1* 8/2013 Zwaan .......... B64U 20/87 244/118.1
2013/0194769 A1 8/2013 Belack
2013/0206915 A1* 8/2013 Desaulniers .......... B64U 10/20 244/165
2013/0218446 A1* 8/2013 Bradley .......... G06Q 10/00 701/123
2013/0218799 A1* 8/2013 Lehmann .......... G06Q 10/063 705/337
2013/0233964 A1* 9/2013 Woodworth .......... B64U 10/60 244/175
2013/0261792 A1* 10/2013 Gupta .......... G05B 15/02 700/232
2013/0262252 A1* 10/2013 Lakshman .......... G06Q 30/06 705/26.1
2013/0262276 A1* 10/2013 Wan .......... G06Q 10/00 705/28
2013/0262336 A1* 10/2013 Wan .......... G06Q 10/087 705/339
2013/0264381 A1* 10/2013 Kim .......... G07F 17/13 232/24
2013/0320133 A1* 12/2013 Ratti .......... B64C 33/025 244/22
2013/0324164 A1* 12/2013 Vulcano .......... H04W 4/02 455/457
2013/0332062 A1* 12/2013 Kreitmair-Steck .......... G08G 5/80 701/301
2013/0344778 A1* 12/2013 Schafer .......... B24B 41/02 451/294
2014/0010656 A1* 1/2014 Nies .......... F03D 7/0244 29/889
2014/0025230 A1* 1/2014 Levien .......... A63H 27/12 701/2
2014/0030444 A1* 1/2014 Swaminathan .......... C23C 16/48 427/569
2014/0031964 A1* 1/2014 Sidhu .......... G05B 19/41865 700/99
2014/0032034 A1* 1/2014 Raptopoulos .......... G08G 5/55 701/25
2014/0040065 A1* 2/2014 DuBois .......... G06Q 30/0621 705/26.5
2014/0052661 A1* 2/2014 Shakes .......... G06Q 10/0836 705/339
2014/0058959 A1* 2/2014 Isbjornssund .......... G06Q 50/184 705/310
2014/0081445 A1* 3/2014 Villamar .......... G06Q 10/087 701/19
2014/0089073 A1* 3/2014 Jacobs .......... G06Q 20/326 705/16
2014/0124619 A1* 5/2014 McGeer .......... B64U 70/70 244/110 F
2014/0124621 A1* 5/2014 Godzdanker .......... B64F 1/125 244/110 E
2014/0136282 A1* 5/2014 Fedele .......... G06Q 10/06 705/7.31
2014/0136414 A1* 5/2014 Abhyanker .......... G06Q 20/3224 701/25
2014/0149244 A1* 5/2014 Abhyanker .......... G06Q 30/0605 705/26.2
2014/0156053 A1* 6/2014 Mahdavi .......... B29C 64/112 700/119
2014/0180914 A1* 6/2014 Abhyanker .......... G06Q 10/0832 705/332
2014/0200697 A1* 7/2014 Cheng .......... G06Q 30/06 700/98
2014/0214684 A1* 7/2014 Pell .......... G06Q 30/02 705/57
2014/0244433 A1* 8/2014 Cruz .......... G06T 7/001 705/26.8
2014/0254896 A1* 9/2014 Zhou .......... G06Q 20/3829 705/16
2014/0257595 A1* 9/2014 Tillmann .......... B64U 10/14 701/2
2014/0271200 A1* 9/2014 Sutton .......... B64C 27/33 29/889
2014/0283104 A1* 9/2014 Nilsson .......... H04N 1/32117 726/26

(56) References Cited

U.S. PATENT DOCUMENTS

2014/0309813 A1* 10/2014 Ricci ..................... G06V 20/59 701/1
2014/0319272 A1* 10/2014 Casado .................. B60L 58/10 244/110 E
2014/0325218 A1* 10/2014 Shimizu ................. H04L 12/10 713/168
2014/0330456 A1* 11/2014 Lopez Morales .... G06Q 10/087 701/3
2015/0006005 A1* 1/2015 Yu ......................... G05D 1/667 701/22
2015/0066178 A1* 3/2015 Stava ..................... B22F 10/47 700/98
2015/0069968 A1* 3/2015 Pounds .................. B60L 53/35 320/109
2015/0097530 A1* 4/2015 Scarlatti ................... H02J 7/00 320/109
2015/0098819 A1* 4/2015 Tourin ............... G01M 5/0091 416/61
2015/0102154 A1* 4/2015 Duncan ............... G05D 1/0094 701/300
2015/0112837 A1* 4/2015 O'Dea .................. G06Q 20/24 705/26.41
2015/0112885 A1* 4/2015 Fadell ................. G08B 29/185 705/330
2015/0120094 A1* 4/2015 Kimchi ................. B64U 10/14 701/3
2015/0120602 A1* 4/2015 Huffman ............. G06Q 10/083 700/214
2015/0123462 A1* 5/2015 Kamradt ................. B67D 7/02 141/192
2015/0127712 A1* 5/2015 Fadell ................ H04L 12/2807 709/202
2015/0129716 A1* 5/2015 Yoffe ..................... B64F 1/029 244/110 C
2015/0158587 A1* 6/2015 Patrick .................... B64D 1/12 701/3
2015/0158599 A1* 6/2015 Sisko ....................... B64F 1/20 244/114 R
2015/0175276 A1* 6/2015 Koster .................. A47G 29/14 244/114 R
2015/0183528 A1* 7/2015 Walsh ................... B64U 80/70 244/114 R
2015/0185034 A1* 7/2015 Abhyanker .......... G05D 1/0088 701/23
2015/0191255 A1* 7/2015 Zolich ...................... B64F 1/16 340/946
2015/0202770 A1* 7/2015 Patron ................... G06Q 50/01 901/50
2015/0217860 A1* 8/2015 Yang ...................... B64C 25/32 244/102 R
2015/0227882 A1* 8/2015 Bhatt .................. G06Q 10/083 705/330
2015/0246727 A1* 9/2015 Masticola ............ G08B 29/145 701/2
2015/0253777 A1* 9/2015 Binney ............... G05D 1/0214 701/28
2015/0254611 A1* 9/2015 Perez .............. G06Q 10/08355 705/5
2015/0259078 A1* 9/2015 Filipovic ................ H04W 4/38 244/114 R
2015/0286216 A1* 10/2015 Miwa .................. G05D 1/0808 701/4
2015/0314881 A1* 11/2015 Tsaliah ................ B64D 17/725 244/146
2015/0317597 A1* 11/2015 Shucker ............ G06Q 10/0833 235/375
2015/0332206 A1* 11/2015 Trew ................... G06Q 10/083 705/330
2015/0336669 A1* 11/2015 Kantor ................ G01C 21/343 701/3
2015/0336670 A1* 11/2015 Zhang .................... B29C 43/18 244/119
2015/0336677 A1* 11/2015 Smaoui ................. H01R 24/38 320/109
2015/0363843 A1* 12/2015 Loppatto ........... G06Q 30/0283 705/330
2015/0367850 A1* 12/2015 Clarke ..................... B60T 7/12 701/28
2015/0370251 A1* 12/2015 Siegel ..................... B64D 1/22 701/2
2016/0001877 A1* 1/2016 Paulos .................. B64U 30/29 701/3
2016/0001883 A1* 1/2016 Sanz ..................... B64U 10/13 244/17.23
2016/0003637 A1* 1/2016 Andersen ............ G01C 21/362 701/519
2016/0009413 A1* 1/2016 Lee .......................... G08G 5/57 701/16
2016/0011592 A1* 1/2016 Zhang .................... B64U 70/97 244/114 R
2016/0019495 A1* 1/2016 Kolchin ............ G06Q 10/0833 705/333
2016/0023761 A1* 1/2016 McNally ............. G05D 1/0094 701/3
2016/0033966 A1* 2/2016 Farris ................... G01C 21/20 701/16
2016/0039541 A1* 2/2016 Beardsley ........... G05D 1/0011 701/2
2016/0051110 A1* 2/2016 Cao ........................ A47L 9/009 15/324
2016/0058181 A1* 3/2016 Han .................... H04N 23/661 312/236
2016/0068264 A1* 3/2016 Ganesh .................... G08G 5/55 701/4
2016/0068265 A1* 3/2016 Hoareau ............... G06Q 10/08 701/3
2016/0068267 A1* 3/2016 Liu ........................ G05D 1/042 701/4
2016/0070265 A1* 3/2016 Liu ................... G01C 21/3848 701/25
2016/0085238 A1* 3/2016 Hayes ...................... G08G 5/22 701/4
2016/0101856 A1* 4/2016 Kohstall ............. G05D 1/0669 244/17.23
2016/0104099 A1* 4/2016 Villamar ............... G06Q 10/08 705/26.81
2016/0104113 A1* 4/2016 Gorlin ............. G06Q 10/08355 705/338
2016/0107750 A1* 4/2016 Yates ..................... B64U 10/25 244/2
2016/0114488 A1* 4/2016 Mascorro Medina ...................... B25J 9/1697 901/1
2016/0117931 A1* 4/2016 Chan ........................ G08G 5/56 701/120
2016/0125746 A1* 5/2016 Kunzi ...................... G08G 5/55 701/11
2016/0129592 A1* 5/2016 Saboo ................... B25J 19/021 700/248
2016/0130000 A1* 5/2016 Rimanelli ............. B64U 20/50 244/2
2016/0130015 A1* 5/2016 Caubel ................. B64C 27/001 244/120
2016/0131025 A1* 5/2016 Pekrul ..................... F02B 53/10 123/205
2016/0132059 A1* 5/2016 Mason ................ B65G 1/1373 701/28
2016/0144734 A1* 5/2016 Wang ................. B64C 29/0016 701/17
2016/0144982 A1* 5/2016 Sugumaran ............ B64C 25/32 244/108
2016/0180618 A1* 6/2016 Ho ..................... G07C 9/00563 340/5.52
2016/0185466 A1* 6/2016 Dreano, Jr. .......... G06Q 10/083 705/26.81
2016/0194959 A1* 7/2016 Pekrul ..................... F01C 19/06 418/146

(56) References Cited

U.S. PATENT DOCUMENTS

2016/0196755 A1* 7/2016 Navot .................. G05D 1/0088 701/4
2016/0196756 A1* 7/2016 Prakash ................. B64U 80/25 701/3
2016/0200438 A1* 7/2016 Bokeno ................. B64C 39/024 244/2
2016/0207627 A1* 7/2016 Hoareau .................. B64D 1/02
2016/0214717 A1* 7/2016 De Silva .................. B64D 5/00
2016/0214728 A1* 7/2016 Rossi ................... B64U 30/291
2016/0221671 A1* 8/2016 Fisher .................... B64U 30/26
2016/0229299 A1* 8/2016 Streett ..................... B64F 1/222
2016/0229530 A1* 8/2016 Welsh .................... B64U 30/24
2016/0235236 A1* 8/2016 Byers ..................... A47G 29/14
2016/0239789 A1* 8/2016 Hanks ..................... G06Q 30/04
2016/0239803 A1* 8/2016 Borley ............. G06Q 10/08355
2016/0244162 A1* 8/2016 Weller ................... B64U 10/13
2016/0244187 A1* 8/2016 Byers ..................... A47G 29/14
2016/0257401 A1* 9/2016 Buchmueller ....... G01C 21/343
2016/0257423 A1* 9/2016 Martin ................... A47G 29/14
2016/0257424 A1* 9/2016 Stabler ................... A63H 27/12
2016/0257426 A1* 9/2016 Mozer .................... B64U 70/30
2016/0258775 A1* 9/2016 Santilli .............. G06Q 10/0833
2016/0266578 A1* 9/2016 Douglas ............... G05D 1/0282
2016/0272317 A1* 9/2016 Cho ........................ G08G 1/162
2016/0280371 A1* 9/2016 Canavor ............... H04W 4/029
2016/0282126 A1* 9/2016 Watts ..................... G06Q 10/08
2016/0286128 A1* 9/2016 Zhou .................... H04N 23/698
2016/0291445 A1* 10/2016 Fisher, Sr. ............. F16M 11/10
2016/0299233 A1* 10/2016 Levien .................... G08G 5/53
2016/0304198 A1* 10/2016 Jourdan .................. G08G 5/57
2016/0304217 A1* 10/2016 Fisher ..................... B64F 1/222
2016/0307448 A1* 10/2016 Salnikov ................ A01C 21/00
2016/0311329 A1* 10/2016 Rodriguez .............. B60L 58/18
2016/0321503 A1* 11/2016 Zhou ...................... B64U 50/38
2016/0334229 A1* 11/2016 Ross ...................... G08B 25/00
2016/0340006 A1* 11/2016 Tang ......................... B63C 9/01
2016/0340021 A1* 11/2016 Zhang ................... B64C 27/006
2016/0355261 A1* 12/2016 Chin ...................... B64U 70/20
2016/0364660 A1* 12/2016 Brown ................... G01C 21/20
2016/0364679 A1* 12/2016 Cao ...................... G06Q 10/083
2016/0364823 A1* 12/2016 Cao ....................... G06Q 50/40
2016/0364989 A1* 12/2016 Speasl ...................... G08G 5/57
2016/0371984 A1* 12/2016 Macfarlane ............ G05D 1/106
2016/0378108 A1* 12/2016 Paczan ................ G06Q 10/083 705/330
2017/0011333 A1* 1/2017 Greiner .............. G06K 7/10722
2017/0011340 A1* 1/2017 Gabbai .................. G05D 1/667
2017/0015415 A1* 1/2017 Chan ...................... G06Q 30/04
2017/0021923 A1* 1/2017 Fisher .................... B64U 70/97
2017/0021941 A1* 1/2017 Fisher .................. G05D 1/0011
2017/0021942 A1* 1/2017 Fisher .................... B64U 70/80
2017/0023949 A1* 1/2017 Fisher ...................... G08G 5/55
2017/0032315 A1* 2/2017 Gupta .................... G06Q 10/08
2017/0050749 A1* 2/2017 Pilskalns ................. B60L 53/37
2017/0073085 A1* 3/2017 Tremblay ................ B64F 1/007
2017/0081043 A1* 3/2017 Jones ...................... B64C 37/02
2017/0087999 A1* 3/2017 Miller ................ G01C 21/3679
2017/0096222 A1* 4/2017 Spinelli .................. B64U 80/25
2017/0100837 A1* 4/2017 Zevenbergen ....... G05D 1/0225
2017/0113352 A1* 4/2017 Lutz ...................... B25J 9/1682
2017/0117676 A1* 4/2017 James .................... B64U 80/70
2017/0121023 A1* 5/2017 High ........................ B64D 9/00
2017/0129464 A1* 5/2017 Wang .................... H02J 7/0045
2017/0129603 A1* 5/2017 Raptopoulos ............. B64F 1/22
2017/0132558 A1* 5/2017 Perez .................. G06Q 10/083
2017/0137118 A1* 5/2017 Gentry ..................... B64D 1/02
2017/0137150 A1* 5/2017 Conyers ................... B60K 1/02
2017/0144776 A1* 5/2017 Fisher ................... B64C 39/024
2017/0147975 A1* 5/2017 Natarajan .......... G06Q 10/0832
2017/0152060 A1* 6/2017 Morisawa .............. B64U 50/23
2017/0154347 A1* 6/2017 Bateman .............. G06Q 10/067
2017/0158352 A1* 6/2017 von Flotow .......... B64F 1/0295
2017/0158353 A1* 6/2017 Schmick ................. B60L 53/12
2017/0166327 A1* 6/2017 Schmidt .................. B64F 1/007
2017/0167881 A1* 6/2017 Rander ............. B60W 60/0016
2017/0174335 A1* 6/2017 Malloy ................ B64D 35/021
2017/0190443 A1* 7/2017 Fisher ..................... B64F 1/005
2017/0193442 A1* 7/2017 Ekkel .................. G06Q 10/083
2017/0197725 A1* 7/2017 Foo ........................ B64U 70/97
2017/0199522 A1* 7/2017 Li ........................ G07C 5/0866
2017/0203632 A1* 7/2017 Westendarp ....... B60H 1/00378
2017/0203857 A1* 7/2017 O'Toole .............. A47G 29/141
2017/0210470 A1 7/2017 Pardell
2017/0225782 A1* 8/2017 Kohstall ................ B64U 30/26
2017/0225783 A1* 8/2017 Fisher .................... B64U 20/87
2017/0225799 A1* 8/2017 Selwyn .................. B64F 1/005
2017/0225801 A1* 8/2017 Bennett .................. B64U 70/90
2017/0225802 A1* 8/2017 Lussier .................. B64U 10/20
2017/0240291 A1* 8/2017 Kim .................... H01M 16/006
2017/0247120 A1* 8/2017 Miller .................... B64U 80/25
2017/0253349 A1* 9/2017 Wang ..................... B64U 70/97
2017/0255896 A1* 9/2017 Van Dyke .......... G06Q 10/0835
2017/0270314 A1* 9/2017 Tsybrovskyy ........ H04W 12/06
2017/0275025 A1* 9/2017 Johnson .................... B64F 1/12
2017/0283042 A1* 10/2017 Gamble ................. B64U 30/24
2017/0283090 A1* 10/2017 Miller .................... B64U 70/97
2017/0286905 A1* 10/2017 Richardson ........ G06Q 10/0836
2017/0300855 A1* 10/2017 Lund ......................... B64F 5/10
2017/0305526 A1* 10/2017 Thomassey ............. B64C 27/26
2017/0305575 A1* 10/2017 Bash ......................... B64F 1/32
2017/0308850 A1* 10/2017 Roush ................. G01C 21/343
2017/0313421 A1* 11/2017 Gil ......................... B64D 45/04
2017/0316379 A1* 11/2017 Lepek ................. G06Q 10/047
2017/0316701 A1* 11/2017 Gil ..................... G06Q 10/0832
2017/0320565 A1* 11/2017 Gamble .................. B64C 17/04
2017/0323129 A1* 11/2017 Davidson ............. G05D 1/0234
2017/0327091 A1* 11/2017 Capizzo .................. B60L 53/68
2017/0330145 A1* 11/2017 Studnicka .......... G07C 9/00896
2017/0341769 A1* 11/2017 Haberbusch ............ F17C 5/007
2017/0345245 A1* 11/2017 Torresani ................ H04W 4/80
2017/0372256 A1* 12/2017 Kantor ...................... G08G 5/34
2018/0024554 A1* 1/2018 Brady ................ G06Q 10/0833 701/23
2018/0029723 A1* 2/2018 Krauss ................... B64U 80/25
2018/0039286 A1* 2/2018 Tirpak ................... G05D 1/042
2018/0053139 A1* 2/2018 Stoman .................. B64U 10/13
2018/0056794 A1* 3/2018 Kim ...................... B60L 53/126
2018/0088586 A1* 3/2018 Hance ................. G05D 1/0236
2018/0092345 A1* 4/2018 Okumura .............. F41G 7/2253
2018/0092484 A1* 4/2018 Lewis ...................... G08G 5/54
2018/0105020 A1* 4/2018 Smith .................... B60H 1/262
2018/0105271 A1* 4/2018 Wypyszynski ........ B64U 10/13
2018/0105289 A1* 4/2018 Walsh ....................... B64F 1/32
2018/0118340 A1* 5/2018 Russo .................... B64U 50/37
2018/0118374 A1* 5/2018 Lombardini .............. B64F 3/02
2018/0127211 A1* 5/2018 Jarvis ................... G05D 1/0285
2018/0137454 A1* 5/2018 Kulkarni ................ G05D 1/021
2018/0141682 A1* 5/2018 Blake ..................... B64U 70/97
2018/0148170 A1* 5/2018 Stamatovski .......... B64U 80/25
2018/0194484 A1* 7/2018 Livieratos ............. B64U 10/13
2018/0196418 A1* 7/2018 Meier .................. G05D 1/0206
2018/0208070 A1* 7/2018 Sanchez ................ B64U 10/13
2018/0233055 A1* 8/2018 Damnjanovic .......... G08G 5/57
2018/0237161 A1* 8/2018 Minnick ................ B64U 50/37
2018/0245365 A1* 8/2018 Wankewycz ........... B64U 10/13
2018/0257775 A1* 9/2018 Baek ...................... B64U 30/26
2018/0265196 A1* 9/2018 Phillips ..................... B64F 1/20
2018/0265295 A1* 9/2018 Beckman ................. G08G 5/57
2018/0265296 A1* 9/2018 Beckman ............... B64U 70/90
2018/0295327 A1* 10/2018 Yearwood ............. G06V 20/62
2018/0312276 A1* 11/2018 Miller .................... B64U 10/14
2018/0319496 A1* 11/2018 Zhang .................... B64U 20/50
2018/0327091 A1* 11/2018 Burks .................... B64U 50/13
2018/0332726 A1 11/2018 Zhu et al.
2018/0354649 A1* 12/2018 Ortiz .................. G08B 13/1436
2018/0357910 A1* 12/2018 Hobbs ...................... G08G 5/54
2018/0360326 A1* 12/2018 Lee ....................... G06F 3/0346
2018/0364740 A1* 12/2018 Collins ................ G05D 1/0088
2018/0370618 A1* 12/2018 Harris ..................... B64C 25/24
2018/0370652 A1* 12/2018 Vendrame ............... B64F 1/007
2019/0002127 A1 1/2019 Straus et al.
2019/0002128 A1* 1/2019 Raz ........................ B64U 70/99
2019/0009926 A1* 1/2019 Hu ......................... B64U 70/99
2019/0016476 A1* 1/2019 Scherz ...................... H02J 7/00

(56) References Cited

U.S. PATENT DOCUMENTS

2019/0023133 A1* 1/2019 Renold .................. B60L 53/35
2019/0023416 A1* 1/2019 Borko .................... G06F 3/041
2019/0028904 A1* 1/2019 Carpenter ............... G08G 5/76
2019/0047462 A1* 2/2019 Vijayaraghavan .... B60W 30/00
2019/0051192 A1* 2/2019 Schick ................... G08G 5/80
2019/0055018 A1* 2/2019 Bei ....................... B64U 70/92
2019/0100108 A1* 4/2019 Davis .................... B64U 80/84
2019/0100313 A1* 4/2019 Campbell ............. B64U 10/14
2019/0100330 A1* 4/2019 Cheng ................... B64U 80/25
2019/0106224 A1* 4/2019 Nishikawa ............ B64U 50/37
2019/0108472 A1* 4/2019 Sweeney ............... B64U 70/90
2019/0135403 A1* 5/2019 Perry .................... B64U 10/25
2019/0135433 A1* 5/2019 Goovaerts ............. A47G 29/14
2019/0152326 A1* 5/2019 Nishikawa ............ B64U 50/19
2019/0161190 A1* 5/2019 Gil ........................ H04L 67/55
2019/0172358 A1* 6/2019 Zhou ..................... G06V 20/17
2019/0185157 A1* 6/2019 Blake .................... B60L 53/67
2019/0193952 A1* 6/2019 Zevenbergen .......... B60L 53/12
2019/0217952 A1* 7/2019 Zawadzki ............... B64D 1/02
2019/0217968 A1* 7/2019 Schmidt ................. B64F 1/007
2019/0233103 A1* 8/2019 High ..................... A47G 29/141
2019/0233107 A1* 8/2019 Tian ...................... B64C 39/12
2019/0245365 A1* 8/2019 Farrahi Moghaddam .................. B64U 10/14
2019/0256201 A1* 8/2019 Plekhanov ............ B64U 20/40
2019/0256202 A1* 8/2019 Resnick ................ B64U 10/13
2019/0256207 A1* 8/2019 Nohmi ................. G05D 1/0866
2019/0258910 A1* 8/2019 Stoman ........... G06K 19/06028
2019/0263519 A1* 8/2019 Argus ................... B64D 31/06
2019/0270526 A1* 9/2019 Hehn ..................... B60L 53/18
2019/0283871 A1* 9/2019 Wieczorek ............ B64U 10/60
2019/0291961 A1* 9/2019 Urban ................... G06Q 50/40
2019/0308724 A1* 10/2019 Cooper ................. B64U 80/25
2019/0315235 A1* 10/2019 Kung ..................... B60L 53/36
2019/0315463 A1* 10/2019 Chen ...................... F24H 15/25
2019/0337407 A1* 11/2019 Wang ..................... B60L 53/31
2019/0348862 A1* 11/2019 Obayashi .............. B64U 30/21
2019/0375504 A1* 12/2019 Schmalzried .......... B64U 10/13
2019/0382134 A1* 12/2019 Baklycki ................. B64F 1/36
2019/0383052 A1* 12/2019 Blake ..................... B60L 53/30
2020/0003529 A1* 1/2020 Benezra ................ B64U 80/70
2020/0010214 A1* 1/2020 Newcomb .............. B60L 53/51
2020/0017218 A1* 1/2020 Ahmad ................... B64D 9/00
2020/0017237 A1* 1/2020 Walker .................... G08G 5/54
2020/0031466 A1* 1/2020 Anderson ............. B64U 30/26
2020/0031471 A1 1/2020 Datta Gupta et al.
2020/0036243 A1* 1/2020 Zhao ...................... H02K 1/145
2020/0044463 A1* 2/2020 Kim ....................... B64U 10/14
2020/0055613 A1* 2/2020 Miller ................. G05D 1/0676
2020/0062373 A1* 2/2020 Liao ....................... B64U 10/16
2020/0094957 A1* 3/2020 Sohmshetty ............. B60P 3/11
2020/0108930 A1* 4/2020 Foley ..................... B64U 80/00
2020/0113167 A1* 4/2020 Bouten ................ A01C 23/008
2020/0148322 A1* 5/2020 Pekrul ...................... B63H 5/02
2020/0165008 A1* 5/2020 Krauss ................ G05D 1/0676
2020/0180940 A1* 6/2020 Rainville .................. B64F 1/28
2020/0189731 A1* 6/2020 Mistry ................. B64C 39/022
2020/0198803 A1* 6/2020 Zhou ...................... B64U 70/30
2020/0207484 A1* 7/2020 Foggia .................. B64U 70/90
2020/0207485 A1* 7/2020 Foggia .................. B64U 70/90
2020/0218287 A1* 7/2020 Wang ..................... B64U 50/34
2020/0218288 A1* 7/2020 Johnson ................ B64U 30/26
2020/0225684 A1* 7/2020 Anderson ............. B64U 70/95
2020/0231054 A1* 7/2020 Resnick .................. G08G 5/74
2020/0239160 A1* 7/2020 Cheng ................... B64U 70/99
2020/0247540 A1* 8/2020 Jones ...................... B64D 7/08
2020/0262583 A1* 8/2020 Ducharme ............ B64U 70/30
2020/0272144 A1* 8/2020 Yang ..................... B64U 10/14
2020/0284883 A1* 9/2020 Ferreira ............... G01S 7/4815
2020/0290752 A1* 9/2020 Kolosiuk .............. B64U 70/95
2020/0301445 A1* 9/2020 Jourdan ........... G06K 19/06037
2020/0307829 A1* 10/2020 Smith .................... B64C 25/06
2020/0309489 A1* 10/2020 Kadavanich .............. F41J 9/08
2020/0310465 A1* 10/2020 Carthew ................ B64U 70/92
2020/0324898 A1* 10/2020 Youmans ............ G06V 20/176
2020/0346736 A1* 11/2020 Krasnoff ................ B64G 1/413
2020/0346743 A1* 11/2020 Bernard ................. B64C 25/18
2020/0349852 A1* 11/2020 DiCosola ................ G08G 5/55
2020/0369384 A1* 11/2020 Kelly ...................... G08G 5/32
2020/0369408 A1* 11/2020 Dolata .................... B60L 53/16
2020/0398999 A1* 12/2020 Ortiz ................. G07C 9/00563
2020/0406773 A1* 12/2020 Lacaze ................... B60L 53/35
2020/0407078 A1* 12/2020 Shimamoto ............ B64F 1/222
2021/0016696 A1* 1/2021 Kelly ....................... F16B 2/22
2021/0031947 A1* 2/2021 Wankewycz ........... B60L 53/51
2021/0045564 A1* 2/2021 Duckers ................. E06B 3/483
2021/0047055 A1* 2/2021 Lee .......................... B64F 1/22
2021/0053677 A1* 2/2021 Passley ................. B64U 70/95
2021/0070468 A1* 3/2021 Svirsky ................. B64U 80/25
2021/0074170 A1* 3/2021 Barker ...................... B64F 1/28
2021/0086913 A1* 3/2021 Friedman ............... B60L 53/30
2021/0089055 A1* 3/2021 Tran .................... G06N 3/0495
2021/0094686 A1* 4/2021 Metzner ............ G08B 13/1965
2021/0107682 A1* 4/2021 Kozlenko ............. B64U 80/25
2021/0107684 A1* 4/2021 Le Lann .................. B64F 1/26
2021/0114729 A1* 4/2021 Ragan ...................... B64D 9/00
2021/0122495 A1* 4/2021 Rezvani ................. B64F 1/007
2021/0125503 A1* 4/2021 Henry ................. G06V 20/176
2021/0127658 A1* 5/2021 Luebke .................. F16C 11/04
2021/0179290 A1 6/2021 Falk-Petersen
2021/0197983 A1* 7/2021 Wang .................... B64U 80/10
2021/0214068 A1* 7/2021 Bry ..................... B64U 30/293
2021/0214102 A1* 7/2021 Geng .................... B64U 70/97
2021/0224739 A1* 7/2021 Sweeny ................ B64U 80/25
2021/0229805 A1* 7/2021 Getman ................. B64C 27/52
2021/0237694 A1* 8/2021 Hirschvogel .............. B60J 7/16
2021/0237899 A1* 8/2021 Warwick .............. B64C 39/024
2021/0253242 A1* 8/2021 Falk-Petersen ........ B64U 80/40
2021/0276735 A1* 9/2021 Raptopoulos ........ A47G 29/141
2021/0284335 A1* 9/2021 Mclaughlin ............ B64F 1/362
2021/0284356 A1* 9/2021 Jourdan .................... B64F 1/18
2021/0300591 A1* 9/2021 Tian ....................... B64F 1/007
2021/0309388 A1* 10/2021 Ratajczak ............. B64U 50/30
2021/0339842 A1* 11/2021 Sauer .................. B64D 27/402
2021/0347500 A1* 11/2021 Hagan ................... B64U 10/13
2021/0349456 A1* 11/2021 Pham .................. G05D 1/0676
2021/0354820 A1* 11/2021 Hiller ..................... B60L 53/12
2021/0371128 A1* 12/2021 Rodriguez ........... A47G 29/141
2021/0394930 A1* 12/2021 O'Toole ............... A47G 29/141
2021/0405655 A1* 12/2021 Yi ......................... B64U 70/90
2022/0009647 A1* 1/2022 Johannesson .......... B64U 20/96
2022/0019247 A1* 1/2022 Dayan .................... G05D 1/104
2022/0024577 A1* 1/2022 Stamatovski ............. B64F 3/00
2022/0041279 A1* 2/2022 Rowse .................. G05D 1/104
2022/0041299 A1* 2/2022 Wankewycz ........... B64D 37/30
2022/0055745 A1* 2/2022 Walker .................. H02G 11/02
2022/0055770 A1* 2/2022 O'Toole ............... B65G 69/003
2022/0063798 A1* 3/2022 Johnson ................. B64C 37/02
2022/0073214 A1* 3/2022 Liske ........................ B64F 1/22
2022/0106125 A1* 4/2022 Ragan ....................... F16G 3/10
2022/0119105 A1* 4/2022 Schmalzried .......... B64U 10/20
2022/0162001 A1* 5/2022 Gherardi ............. G05D 1/0088
2022/0163980 A1* 5/2022 Beer ...................... G05D 1/228
2022/0169400 A1* 6/2022 Seeley ...................... B64C 1/20
2022/0169401 A1* 6/2022 Di Cosola .............. B60L 53/51
2022/0171388 A1* 6/2022 Yanagihashi .......... B65G 43/00
2022/0177124 A1* 6/2022 Marshall ............... B64U 10/20
2022/0177125 A1* 6/2022 Abdellatif .............. B64U 10/13
2022/0185501 A1* 6/2022 Kempley ............... B64U 70/70
2022/0234757 A1* 7/2022 Dayan ................... B64U 70/97
2022/0242589 A1* 8/2022 Pham .................. G09F 27/005
2022/0250491 A1 8/2022 Fuehrer
2022/0289376 A1* 9/2022 Hayakawa ............ G05D 1/101
2022/0306320 A1* 9/2022 Howe ..................... B60L 53/00
2022/0315248 A1* 10/2022 Castellano Aldave ... B60L 3/00
2022/0380063 A1* 12/2022 Shah ..................... B64U 70/92
2022/0396373 A1* 12/2022 Wang .................. B64C 39/024
2022/0396421 A1* 12/2022 Tian .................... B62D 63/061
2023/0017530 A1* 1/2023 Lowe ................... H01M 10/613
2023/0023246 A1* 1/2023 McLaughlin ........ G05D 1/0088
2023/0031028 A1* 2/2023 Ehasoo .................. B64F 1/222
2023/0044050 A1* 2/2023 Cevacins .............. B64U 70/99
2023/0045483 A1* 2/2023 Ahn ....................... G05D 1/689
2023/0045691 A1* 2/2023 Cevacins .............. B64U 60/00

(56) References Cited

U.S. PATENT DOCUMENTS

2023/0046127 A1* 2/2023 Guerra Johansson . H04N 7/183
2023/0049325 A1* 2/2023 Kwon ................. H01F 27/2804
2023/0063715 A1* 3/2023 Bell ..................... G05D 1/0246
2023/0065140 A1* 3/2023 Blevins .................. B64U 20/40
2023/0074715 A1* 3/2023 Kwon ..................... F04D 25/08
2023/0088830 A1* 3/2023 Kim ....................... B64U 50/32 244/221
2023/0096139 A1* 3/2023 Ubaldi ................... B65G 23/44 198/844.1
2023/0100169 A1* 3/2023 Laczak ................... B64F 1/125 232/1 R
2023/0131957 A1* 4/2023 Lowenberg ............ B64U 80/86 244/137.1
2023/0133068 A1* 5/2023 Wiegman ................ B60L 53/62 320/109
2023/0140387 A1* 5/2023 Infanti ................... B64U 60/50 244/114 R
2023/0159192 A1* 5/2023 Gil ......................... B64U 80/40 244/137.1
2023/0202680 A1* 6/2023 Yehya .................... B64U 70/30 244/110 E
2023/0202682 A1* 6/2023 Kiyokami .............. B64U 70/90 244/114 R
2023/0202691 A1* 6/2023 Kiyokami .............. B64U 70/93 244/114 R
2023/0244249 A1* 8/2023 Smith ................... G01S 13/933 701/11
2023/0249851 A1* 8/2023 Tian ....................... B64U 80/10 414/787
2023/0257139 A1* 8/2023 Straus .................... B64U 10/13 244/114 R
2023/0298268 A1* 9/2023 Oleynikova ........ B60W 60/001
2023/0303272 A1* 9/2023 Passley .................. B64U 20/50
2023/0347765 A1* 11/2023 Lowe ..................... B64U 70/92
2023/0348099 A1* 11/2023 Woo ................... H05K 7/20145
2023/0348100 A1* 11/2023 Altenhofen ............... B64F 1/22
2023/0348103 A1* 11/2023 Lowe ..................... B64U 80/70
2023/0348104 A1* 11/2023 Lowe ................. H05K 7/20154
2023/0348105 A1* 11/2023 Grasberger ........ H05K 7/20209
2023/0348106 A1* 11/2023 Berthelet ............... B64U 70/97
2023/0348122 A1* 11/2023 Fehler ....................... B64F 1/32
2023/0349146 A1* 11/2023 Vasconi .................... B66B 9/00
2023/0373626 A1* 11/2023 Kiyokami ................ B64D 1/22
2023/0373668 A1* 11/2023 Kozlenko ............ G05D 1/0055
2023/0399132 A1* 12/2023 Kiyokami ............. B64C 39/024
2024/0002080 A1* 1/2024 Shi .......................... B64F 1/362
2024/0010368 A1* 1/2024 Liao ....................... B64U 80/10
2024/0067371 A1* 2/2024 Turner ................... B64U 50/37
2024/0076067 A1* 3/2024 Takahashi .............. B64U 10/60
2024/0076072 A1* 3/2024 Arii ........................ B64U 30/20
2024/0101286 A1* 3/2024 Regev .................. G05D 1/0866
2024/0101287 A1* 3/2024 Takahashi .............. B64U 80/86
2024/0101288 A1* 3/2024 Takahashi .............. B64U 70/92
2024/0109656 A1* 4/2024 Stege ................... G06Q 10/083
2024/0111310 A1* 4/2024 Ehasoo .................. B64U 70/20
2024/0132238 A1* 4/2024 Qiu ........................ B64U 70/92
2024/0140228 A1* 5/2024 Lowe ................. H05K 7/20154
2024/0140630 A1* 5/2024 Lee ........................ B64U 80/40
2024/0158112 A1* 5/2024 Le Lann ............. H01M 50/262
2024/0176367 A1* 5/2024 Zhou ........................ G08G 5/22
2024/0190593 A1* 6/2024 Shah ....................... B60L 53/14
2024/0239531 A1* 7/2024 Bitar ...................... B64U 50/19
2024/0239533 A1* 7/2024 Li .......................... B64U 70/99
2024/0262545 A1* 8/2024 Fu .......................... B64U 80/20
2024/0278946 A1* 8/2024 Roberts .................. B64U 70/92
2024/0300677 A1* 9/2024 Sercel .................... B64G 1/623
2024/0329664 A1* 10/2024 Randolph .............. B64U 10/13
2024/0336378 A1* 10/2024 Neate ..................... B64U 10/60
2024/0343420 A1* 10/2024 Yao ........................ B64U 10/14
2024/0343426 A1* 10/2024 Cornew ................ B64U 80/25
2024/0384587 A1* 11/2024 Anderson .............. B64U 70/90
2024/0391616 A1* 11/2024 Dayan .................... B64U 70/90
2024/0425199 A1* 12/2024 Li .......................... G05D 1/042
2025/0002185 A1* 1/2025 Liu ........................ B64U 80/70
2025/0026509 A1* 1/2025 Infanti ................... B64U 70/50
2025/0074632 A1* 3/2025 DiCosola .............. G07F 15/006
2025/0108943 A1* 4/2025 Sekiguchi .............. B64U 70/95
2025/0121966 A1* 4/2025 Gronstedt .............. B64U 80/70
2025/0128638 A1* 4/2025 Scheler ................... B60L 53/30
2025/0145314 A1* 5/2025 Gronstedt .............. B64U 70/99
2025/0206463 A1* 6/2025 Aralis ..................... B64F 1/362
2025/0223061 A1* 7/2025 Merdin .................. B64U 80/25
2025/0242706 A1 7/2025 Ding et al.
2025/0246921 A1 7/2025 Ding et al.
2025/0250006 A1* 8/2025 Burgess ............... G05D 1/0094
2026/0048875 A1 2/2026 Guo et al.
2026/0048876 A1 2/2026 Guo et al.

FOREIGN PATENT DOCUMENTS

CN 116552862 A 8/2023
CN 118665752 A 9/2024
WO 2022045459 A1 3/2022

* cited by examiner 144
110
24
416
382
418
150
400
254
146
α6
172
R2
α8
α7

144
110
24
418
416
382
150
146
254
402

REPOSITIONABLE CHARGING HUBS IN BASE STATIONS FOR UNMANNED AERIAL VEHICLES

CROSS-REFERENCE TO RELATED APPLICATION(S)

This application claims the benefit of and priority to U.S. Provisional Patent Application Ser. No. 63/683,498, filed on Aug. 15, 2024, the entire content of which is hereby incorporated by reference.

TECHNICAL FIELD

The present disclosure relates to a base station (dock) for an unmanned aerial vehicle (UAV) (e.g., a drone) and, more specifically, to a base station that includes a repositionable charging hub.

BACKGROUND

Base stations are utilized to service and accommodate UAVs during use and storage. During landing, the UAV is received by a landing surface that is often configured for electrical connection to the UAV in order to charge the UAV Increasing the landing envelope (i.e., the space or the surface area available to the UAV during landing, docking, and takeoff) reduces the precision required during docking, allowing for greater margins of error, which results in more successful landings and facilitates charging of the UAV.

To that end, the present disclosure provides a base station with a charging hub that is repositionable between a retracted position, in which the charging hub is concealed within the base station, and an extended position, in which the charging hub is exposed, thereby improving the overall capabilities of the base station and the docking procedure.

SUMMARY

In one aspect of the present disclosure, a base station for a UAV is disclosed that includes: a body; a landing platform that is supported by the body and which is configured to receive the UAV; and a charging hub that is configured for electrical connection to the UAV to facilitate charging thereof. The charging hub is repositionable between a retracted position, in which the charging hub is concealed by the landing platform, and an extended position, in which the charging hub is exposed from the landing platform.

In certain embodiments, the charging hub may extend through the landing platform in the extended position.

In certain embodiments, the landing platform may define a window that is configured to receive the charging hub such that the charging hub is movable through the window during repositioning between the retracted position and the extended position.

In certain embodiments, the charging hub may include: a drive mechanism; a drive member that is in engagement with the drive mechanism such that, upon actuation, the drive mechanism moves axially along the drive member; and a mounting bracket that is connected to the drive mechanism such that the mounting bracket moves concomitantly therewith.

In certain embodiments, the charging hub may further include a retainer that is connected to the mounting bracket and which is configured for engagement with the UAV to inhibit movement thereof during repositioning of the charging hub between the retracted position and the extended position.

In certain embodiments, the retainer may include a frame and a bail that is movably connected to the frame such that the retainer is repositionable between a disengaged position, in which the bail is disengaged from the UAV, and an engaged position, in which the bail engages the UAV In certain embodiments, the charging hub may further include a slide bracket, which is connected to the retainer, and a charger subassembly, which is supported by the slide bracket.

In certain embodiments, the charger subassembly and the UAV may include corresponding electrical contacts.

In certain embodiments, the slide bracket may include a first leg and a second leg that extends in generally orthogonal relation to the first leg.

In certain embodiments, the second leg may support the charger subassembly.

In certain embodiments, the charging hub may further include a guide mechanism that is connected to the mounting bracket and the slide bracket.

In certain embodiments, the guide mechanism may include a rail and a carriage that is movable in relation to the rail.

In certain embodiments, the carriage may be connected to the mounting bracket such that the carriage moves concomitantly therewith, whereby the guide mechanism generally confines the charging hub to linear motion during repositioning between the retracted position and the extended position.

In another aspect of the present disclosure, a method of docking a UAV with a base station is disclosed that includes: receiving the UAV on a landing platform of the base station; performing a first stage of alignment, in which the UAV is generally centered on the landing platform and is generally aligned with a charging hub of the base station; performing a second stage of alignment, in which the charging hub is repositioned from a retracted position, in which the charging hub is concealed by the landing platform, towards an extended position, in which the charging hub is exposed from the landing platform; and performing a third stage of alignment, in which the charging hub is moved into the extended position and corresponding electrical contacts on the charging hub and the UAV are brought into engagement.

In certain embodiments, performing the first stage of alignment may include repositioning alignment members on the landing platform from an extended position into a retracted position, during which, the alignment members engage and reposition the UAV In certain embodiments, performing the second stage of alignment may include inserting at least one alignment pin on the charging hub into the UAV.

In certain embodiments, performing the second stage of alignment may include generally aligning corresponding electrical contacts on the charging hub and the UAV In certain embodiments, performing the third stage of alignment may include establishing a magnetic connection between the charging hub and the UAV In another aspect of the present disclosure, a base station for a UAV is disclosed that includes: a body; a landing platform that is supported by the body and which is configured to receive the UAV; and a charging hub that is configured for connection to the UAV The charging hub is repositionable between an extended position, in which the charging hub is exposed from the landing platform, and a retracted position, in which the charging hub is concealed by the landing platform to thereby increase available landing space for the UAV on the landing platform.

In certain embodiments, the charging hub may be repositionable along an axis of movement that extends in generally parallel relation to a landing direction of the UAV.

In certain embodiments, the charging hub may be vertically repositionable between the retracted position and the extended position.

In certain embodiments, the landing platform may define a window that is configured to receive the charging hub such that the charging hub is movable through the window during repositioning between the retracted position and the extended position.

In certain embodiments, the window may be positioned such that the UAV is generally centered on the landing platform upon connection of the charging hub to the UAV.

In certain embodiments, the charging hub may be connected to an underside of the landing platform.

In certain embodiments, the charging hub may be configured to receive the UAV such that the UAV extends into the charging hub.

In certain embodiments, the charging hub may be configured to mechanically interface with the UAV to facilitate alignment of the UAV with the charging hub.

In certain embodiments, the charging hub may include first alignment members that are configured for engagement with an external surface of the UAV and at least one second alignment member that is configured for insertion into the UAV In certain embodiments, the first alignment members may be positioned laterally outward of the at least one second alignment member.

In another aspect of the present disclosure, a base station for a UAV is disclosed that includes a landing platform and a charging hub that is movable though the landing platform during repositioning of the charging hub between a first position and a second position.

In certain embodiments, the charging hub may be repositionable along an axis of movement that extends in generally parallel relation a landing direction of the UAV In certain embodiments, the charging hub may be concealed by the landing platform in the first position.

In certain embodiments, the charging hub may be exposed from the landing platform in the second position.

In certain embodiments, the charging hub may be configured to mechanically interface with the UAV to reposition the UAV on the landing platform.

In certain embodiments, the charging hub may include first alignment members that are configured for engagement with an external surface of the UAV and second alignment members that are configured for insertion into the UAV.

In another aspect of the present disclosure, a method of docking a UAV with a base station is disclosed that includes landing the UAV on a landing platform of the base station and exposing a charging hub of the base station via movement of the charging hub through the landing platform.

In certain embodiments, exposing the charging hub may include electrically connecting the charging hub to the UAV.

In certain embodiments, exposing the charging hub may include extending the charging hub through a window that is defined by the landing platform.

In certain embodiments, exposing the charging hub may include moving the charging hub along a generally vertical axis.

In certain embodiments, exposing the charging hub may include moving the charging hub along an axis of movement that extends in generally parallel relation to a landing direction of the UAV.

In another aspect of the present disclosure, a charging hub for a base station is disclosed that is configured to receive a UAV during docking. The charging hub includes: a charging base; a registration member that is connected to the charging base and which is configured for engagement with the UAV; and a charging head that is configured for electrical connection to the UAV. The charging head is repositionable in relation to the charging base and the registration member between a normal position and a deflected position to facilitate alignment between first electrical contacts on the UAV and second electrical contacts on the charging head.

In certain embodiments, the registration member may define a window that receives the charging head such that the charging head is movable within the window during repositioning between the normal position and the deflected position.

In certain embodiments, the registration member may include first alignment members that are configured for engagement with an external surface of the UAV.

In certain embodiments, the charging head may include second alignment members that are configured for insertion into the UAV In certain embodiments, the second alignment members may be positioned between the first alignment members.

In certain embodiments, the charging head may include an umbrella and a printed circuit board (PCB) assembly that is connected to the umbrella.

In certain embodiments, the PCB assembly may be positioned between the charging base and the registration member such that the charging head is captive to the registration member.

In certain embodiments, the PCB assembly may be slidable and rotatable in relation to the charging base.

In certain embodiments, the charging head may include first magnetic members.

In certain embodiments, the charging base may include second magnetic members that are generally aligned with the first magnetic members to thereby bias the charging head towards the normal position.

In certain embodiments, the PCB assembly may include the second magnetic members and the second electrical contacts.

In certain embodiments, the second electrical contacts may extend through the umbrella.

In another aspect of the present disclosure, a charging hub for a base station is disclosed that is configured to receive a UAV during docking. The charging hub includes a charging head that is configured for electrical connection to the UAV The charging head includes an umbrella and a PCB assembly that is connected to the umbrella. The PCB assembly includes at least one alignment member that is configured for insertion into the UAV and first electrical contacts that are configured for engagement with second electrical contacts on the UAV, wherein the at least one alignment member and the first electrical contacts extend through the umbrella.

In certain embodiments, the PCB assembly may include a PCB mount and a PCB subassembly that is connected to the PCB mount.

In certain embodiments, the PCB mount may include the at least one alignment member.

In certain embodiments, the PCB subassembly may include the first electrical contacts.

In certain embodiments, the charging hub may further include a charging base that supports the charging head and which defines a channel that is configured to receive the PCB assembly such that the PCB assembly extends into the charging base.

In certain embodiments, the charging head may be repositionable in relation to the charging base between a normal position and a deflected position to facilitate alignment of the first electrical contacts and the second electrical contacts.

In certain embodiments, the charging head may be slidable and rotatable in relation to the charging base.

In certain embodiments, the charging head may include first magnetic members.

In certain embodiments, the charging base may include second magnetic members that are generally aligned with the first magnetic members to bias the charging head towards the normal position.

In certain embodiments, the second magnetic members may be embedded within the PCB assembly.

In another aspect of the present disclosure, a charging hub for a base station is disclosed that is configured to receive a UAV during docking. The charging hub includes a charging base and a charging head that is configured for electrical connection to the UAV and which is repositionable in relation to the charging base between a normal position and a deflected position, wherein the charging head is biased towards the normal position.

In certain embodiments, the charging base and the charging head may include corresponding biasing members.

In certain embodiments, the corresponding biasing members may be magnetic.

In another aspect of the present disclosure, a landing platform for a base station is disclosed that is configured to dock with a UAV The landing platform includes: a stage that defines landing areas, which are configured to receive the UAV during docking; alignment members that are configured to engage and reposition the UAV during a first stage of alignment; and a charging hub that is configured for electrical connection to the UAV. The charging hub includes a registration member, which is configured to mechanically interface with and reposition the UAV on the landing platform during a second stage of alignment, and a charging head that is repositionable in relation to the registration member from a normal position into a deflected position during a third stage of alignment to facilitate engagement of corresponding electrical contacts on the UAV and the charging head.

In certain embodiments, the alignment members may be repositionable from an extended position into a retracted position during the first stage of alignment to thereby generally center the UAV on the landing platform.

In certain embodiments, the alignment members may be repositionable along an axis that extends in generally orthogonal relation to a landing direction of the UAV In certain embodiments, the alignment members may be positioned laterally outward of the landing areas in the extended position.

In certain embodiments, the alignment members may be generally aligned with the landing areas in the retracted position.

In certain embodiments, the registration member may be configured to receive the UAV during the second stage of alignment such that the UAV extends into the charging hub.

In certain embodiments, the registration member may include first alignment members that are configured for engagement with an external surface of the UAV during the second stage of alignment.

In certain embodiments, the charging head may include at least one second alignment member that is configured for insertion into the UAV during the third stage of alignment.

In certain embodiments, the charging head may be slidable and rotatable in relation to the registration member during repositioning from the normal position into the deflected position.

In certain embodiments, the charging hub may further include first magnetic members and second magnetic members that are generally aligned with the first magnetic members.

In certain embodiments, the first magnetic members and the second magnetic members may bias the charging head towards the normal position such that, upon disengagement of the UAV and the charging hub, the charging head is automatically returned to the normal position.

In another aspect of the present disclosure, a landing platform for a base station is disclosed that is configured to dock with a UAV The landing platform includes alignment members, which are configured to generally center the UAV on the landing platform during a first stage of alignment, and a charging hub, which is repositionable between a retracted position and an extended position. The charging hub includes a registration member, which is configured to reposition the UAV on the landing platform during a second stage of alignment, and a charging head, which is repositionable from a normal position into a deflected position during a third stage of alignment to facilitate electrical connection of the charging head to the UAV In certain embodiments, the charging hub may be vertically repositionable between the retracted position and the extended position.

In certain embodiments, the registration member may be configured for engagement with an external surface of the UAV during repositioning of the charging hub from the retracted position into the extended position.

In certain embodiments, the charging head may be configured for insertion into the UAV during repositioning of the charging hub from the retracted position into the extended position.

In certain embodiments, the charging head may be configured for linear and rotatable movement during repositioning between the normal position and the deflected position.

In certain embodiments, the charging hub may include biasing members that are configured to bias the charging head towards the normal position such that the charging head is automatically returned to the normal position during repositioning of the charging hub from the extended position into the retracted position.

In certain embodiments, the biasing members may be configured to apply a magnetic biasing force to the charging head.

In another aspect of the present disclosure, a landing platform for a base station is disclosed that is configured to dock with a UAV The landing platform includes: a stage that defines landing areas, which are configured to receive the UAV during docking; a charging hub that is positioned between the landing areas; and alignment members that are movable in relation to the stage, wherein the alignment members are configured to generally align the UAV with the charging hub during a first stage of alignment, the charging hub is configured to reposition the UAV on the landing platform during a second stage of alignment, and the charging hub is deflected in relation to the UAV during a third stage of alignment to facilitate electrical connection of the charging hub to the UAV In certain embodiments, the charging hub may be configured for engagement with an external surface of the UAV during the second stage of alignment.

In certain embodiments, the charging hub may be configured for insertion into the UAV during the third stage of alignment.

In another aspect of the present disclosure, a method of docking a UAV with a base station is disclosed that includes: landing the UAV on a landing platform of the base station; generally aligning the UAV with a charging hub of the base station; repositioning the UAV on the landing platform via engagement with the charging hub; and deflecting the charging hub to generally align electrical contacts on the UAV with corresponding electrical contacts on the charging hub.

In certain embodiments, generally aligning the UAV with the charging hub may include retracting alignment members on the landing platform.

In certain embodiments, retracting the alignment members may include repositioning the alignment members along a first axis.

In certain embodiments, repositioning the UAV on the landing platform may include extending the charging hub from the landing platform.

In certain embodiments, extending the charging hub may include extending the charging hub along a second axis that is generally orthogonal in relation to the first axis.

In certain embodiments, extending the charging hub from the landing platform may include engaging an outer surface of the UAV with first alignment members on the charging hub.

In certain embodiments, extending the charging hub from the landing platform may include inserting at least one second alignment member on the charging hub into the UAV.

In certain embodiments, deflecting the charging hub may include overcoming an internal biasing force within the charging hub.

In certain embodiments, overcoming the internal biasing force may include overcoming a magnetic biasing force that is applied by first and second magnetic members.

In certain embodiments, overcoming the magnetic biasing force may include moving the first and second magnetic members out of alignment.

In another aspect of the present disclosure, a method of docking a UAV with a base station is disclosed that includes: landing the UAV on a landing platform of the base station; performing a first stage of alignment in which the UAV is generally aligned with a charging hub of the base station; and performing a second stage of alignment in which the UAV is repositioned on the landing platform via engagement with the charging hub.

In certain embodiments, performing the first stage of alignment may include reconfiguring the landing platform.

In certain embodiments, reconfiguring the landing platform may include retracting alignment members into engagement with the UAV.

In certain embodiments, performing the second stage of alignment may include extending the charging hub such that the charging hub is exposed from the landing platform.

In certain embodiments, extending the charging hub may include engaging an external surface of the UAV with first alignment members on the charging hub.

In certain embodiments, extending the charging hub may include inserting at least one second alignment member on the charging hub into the UAV.

In certain embodiments, the method may further include performing a third stage of alignment in which the charging hub is deflected to thereby align corresponding electrical contacts on the UAV and the charging hub.

In another aspect of the present disclosure, a method of docking a UAV with a base station is disclosed that includes: reconfiguring a landing platform of the base station during a first stage of alignment; repositioning the UAV on the landing platform during a second stage of alignment via engagement with a charging hub of the base station; and deflecting the charging hub during a third stage of alignment to facilitate electrical connection of the UAV to the charging hub.

In certain embodiments, repositioning the UAV during the second stage of alignment may include engaging an external surface of the UAV with the charging hub.

In certain embodiments, deflecting the charging hub during the third stage of alignment may include inserting the charging hub into the UAV to generally align corresponding electrical contacts on the UAV and the charging hub.

In another aspect of the present disclosure, a charging hub for a base station is disclosed that is configured to receive a UAV during docking. The charging hub includes a first bracket and a second bracket that is operatively connected to the first bracket such that the second bracket is movable in relation thereto along a vertical axis of movement, wherein movement of the second bracket repositions the charging hub from a retracted position into an extended position to thereby facilitate electrical connection of the charging hub to the UAV In certain embodiments, the first bracket may be fixedly positioned within the base station.

In certain embodiments, the charging hub may further include a guide mechanism that extends between and connects the first bracket and the second bracket.

In certain embodiments, the guide mechanism may include a carriage that is connected to the first bracket.

In certain embodiments, the guide mechanism may further include a rail that is connected to the second bracket and which engages the carriage to facilitate relative linear movement between the carriage and the rail.

In certain embodiments, the carriage may be positioned within the rail.

In certain embodiments, the carriage may include a chassis and flanges that extend outwardly from the chassis in generally orthogonal relation to the vertical axis of movement.

In certain embodiments, the chassis may be connected to the first bracket.

In certain embodiments, the rail may define channels that are configured to receive the flanges such that carriage moves through the channels during movement of the second bracket.

In certain embodiments, the charging hub may further include a sensor that is connected to the first bracket and a magnet that is connected to the second bracket and which is configured to interface with the sensor to determine a position of the charging hub.

In another aspect of the present disclosure, a charging hub for a base station is disclosed that is configured to receive a UAV during docking. The charging hub includes: a fixed bracket; a motor assembly that is connected to the fixed bracket; a drive member that engages the motor assembly such that actuation of the motor assembly causes linear movement of the drive member, wherein the drive member includes a first end and a second end; a movable bracket that is connected to the drive member such that linear movement of the drive member causes corresponding movement of the movable bracket; a guide mechanism that extends between and connects the fixed bracket and the movable bracket; and a charger subassembly that is connected to the movable bracket such that linear movement of the movable bracket causes corresponding movement of the charger subassembly during repositioning of the charging hub between retracted and extended positions, wherein the charger subassembly is configured for electrical connection to the UAV. The guide mechanism includes a carriage, which is connected to the fixed bracket, and a rail, which is connected to the movable bracket and engages the carriage to facilitate relative linear movement between the carriage and the rail.

In certain embodiments, the fixed bracket includes: a first body panel that is connected to the carriage; a first mount that extends from the first body panel and which is connected to the motor assembly; and first side panels that extend from the first body panel.

In certain embodiments, the first mount may define an aperture that is configured to receive the motor assembly and the drive member such that the motor assembly and the drive member extend into the first mount.

In certain embodiments, the movable bracket may include: a second body panel that is connected to the rail; a second mount that extends from the second body panel and which is connected to the charger subassembly; and second side panels that extend from the second body panel.

In certain embodiments, the first mount and the second mount may extend in a first direction, and the first side panels and the second side panels may extend in a second direction that is generally opposite to the first direction.

In certain embodiments, the second mount may include an aperture that is configured to receive the second end of the drive member so as to inhibit relative rotation between the drive member and the second mount.

In certain embodiments, the aperture and the second end of the drive member may include corresponding non-circular cross-sectional configurations.

In another aspect of the present disclosure, a charging hub for a base station is disclosed that is configured to receive a UAV during docking. The charging hub includes: a mounting bracket; a guide mechanism that is connected to the mounting bracket; a slide bracket that is connected to the guide mechanism such that the guide mechanism facilitates movement of the slide bracket in relation to the mounting bracket; and a charger subassembly that is connected to the slide bracket such that movement of the slide bracket causes corresponding movement of the charger subassembly to thereby facilitate electrical connection of the charger subassembly to the UAV In certain embodiments, the guide mechanism may include a carriage, which is connected to the mounting bracket, and a rail, which is connected to the slide bracket.

In certain embodiments, the rail may engage the carriage so as to facilitate relative linear movement therebetween.

In certain embodiments, the carriage and the rail may be configured such that the rail is slidable in relation to the carriage along a generally vertical axis of movement during movement of the slide bracket in relation to the mounting bracket.

In another aspect of the present disclosure, a charging hub for a base station is disclosed that is configured to receive a UAV during docking. The charging hub includes electrical contacts, which are configured for electrical connection to the UAV, and a wick, which is configured to draw water away from the electrical contacts.

In certain embodiments, the wick may include a hydrophilic material.

In certain embodiments, the wick may be generally centered on the charging hub.

In certain embodiments, the wick may extend along an external surface of the charging hub.

In certain embodiments, the wick may include a first section and a second section that extends transversely from the first section.

In certain embodiments, the second section may extend from the first section at a first obtuse angle.

In certain embodiments, the first section may extend in a generally horizontal orientation.

In certain embodiments, the wick may further include a third section that extends transversely from the second section.

In certain embodiments, the third section may extend from the second section at a second obtuse angle.

In certain embodiments, the third section may extend in a generally vertical orientation, thereby creating a syphoning effect.

In another aspect of the present disclosure, a charging hub for a base station is disclosed that is configured to receive a UAV during docking. The charging hub includes electrical contacts, which are configured for electrical connection to the UAV and are generally aligned along a reference axis, and troughs, which extend in generally orthogonal in relation to the reference axis and are configured to collect and draw water away from the electrical contacts.

In certain embodiments, the troughs may include first sections, which extend in a generally horizontal orientation, and second sections, which extend in non-parallel relation to the first sections.

In certain embodiments, the first sections and the second sections may subtend obtuse angles therebetween.

In certain embodiments, the electrical contacts may include: a first group of electrical contacts; a second group of electrical contacts that are spaced from the first group along the reference axis; and a third group of electrical contacts that are spaced from the second group along the reference axis.

In certain embodiments, the first group of electrical contacts may be configured to facilitate power delivery to the UAV.

In certain embodiments, the second group of electrical contacts may be configured to facilitate data transmission between the UAV and the charging hub.

In certain embodiments, the third group of electrical contacts may be configured to facilitate grounding of the charging hub.

In certain embodiments, the troughs may include a first trough, which is positioned between the first group of electrical contacts and the second group of electrical contacts, and a second trough, which is positioned between the second group of electrical contacts and the third group of electrical contacts.

In certain embodiments, the charging hub may further include a sealing member that extends about the electrical contacts.

In certain embodiments, the troughs may include first ends, which are positioned adjacent to the sealing member, and second ends.

In another aspect of the present disclosure, a charging hub for a base station is disclosed that is configured to receive a UAV during docking. The charging hub includes: first electrical contacts that are configured to facilitate power delivery to the UAV; second electrical contacts that are configured to facilitate data transmission between the UAV and the charging hub; third electrical contacts that are configured to facilitate grounding of the charging hub, wherein the first electrical contacts, the second electrical contacts, and the third electrical contacts are configured for electrical connection to the UAV; a first trough that is positioned between the first electrical contacts and the second electrical contacts; a second trough that is positioned between the second electrical contacts and the third electrical contacts; and a wick that is positioned between the first trough and the second trough, wherein the wick is configured to draw water away from the first electrical contacts, the second electrical contacts, and the third electrical contacts.

In certain embodiments, the wick may include a first section that extends in a generally horizontal orientation and a second section that extends transversely from the first section.

In certain embodiments, the wick may further include a third section that extends transversely from the second section.

In certain embodiments, the third section may extend in a generally vertical orientation to thereby create a syphoning effect.

In another aspect of the present disclosure, a method of inhibiting corrosion on a charging hub for a base station is disclosed that is configured to receive a UAV during docking. The method includes drawing water away from electrical contacts on the charging hub via at least one trough and wicking water away from the electrical contacts.

In certain embodiments, drawing the water away may include drawing the water away via a plurality of troughs.

In certain embodiments, drawing the water away may include drawing the water away from first electrical contacts, second electrical contacts, and third electrical contacts.

In certain embodiments, drawing the water away may include drawing the water away via a first trough, which is positioned between the first electrical contacts and the second electrical contacts, and drawing the water away via a second trough, which is positioned between the second electrical contacts and the third electrical contacts.

In certain embodiments, drawing the water away may include drawing the water away via a first trough and drawing the water away via a second trough that is spaced laterally from the first trough.

In certain embodiments, wicking the water away may include wicking the water away along an external surface of the charging hub.

In certain embodiments, wicking the water away may include collecting the water in a first section of a wick and syphoning the water away from the electrical contacts via a second section of the wick.

In certain embodiments, wicking the water away may include collecting the water in a first section of a wick and syphoning the water away from the electrical contacts via a second section of the wick that extends in generally orthogonal relation to the first section.

In certain embodiments, wicking the water away may include collecting the water in a first section of a wick, which extends in a generally horizontal orientation, and syphoning the water away from the electrical contacts via a second section of the wick, which extends in a generally vertical orientation.

In certain embodiments, wicking the water away may include collecting and syphoning the water away from the electrical contacts via a first wicking portion and collecting and syphoning the water away from the first wicking portion via a second wicking portion that is positioned adjacent to the first wicking portion.

In another aspect of the present disclosure, a method of inhibiting corrosion on a charging hub for a base station is disclosed that is configured to receive a UAV during docking. The method includes drawing water away from electrical contacts on the charging hub via at least one trough that is positioned between the electrical contacts.

In certain embodiments, drawing the water away may include drawing the water away from first electrical contacts and away from second electrical contacts via a first trough that is positioned therebetween.

In certain embodiments, drawing the water away may further include drawing the water away from the second electrical contacts and away from third electrical contacts via a second trough that is positioned therebetween.

In certain embodiments, drawing the water away may include collecting the water in a first section of the at least one trough and draining the water from the first section of the at least one trough via a second section of the at least one trough that extends transversely from the first section of the at least one trough.

In certain embodiments, drawing the water away may include collecting the water in a first section of the at least one trough and draining the water from the first section of the at least one trough via a second section of the at least one trough that extends from the first section of the at least one trough at an obtuse angle.

In another aspect of the present disclosure, a method of inhibiting corrosion on a charging hub for a base station is disclosed that is configured to receive a UAV during docking. The method includes syphoning water away from electrical contacts on the charging hub via a wick.

In certain embodiments, syphoning the water may include collecting the water in a first section of the wick.

In certain embodiments, syphoning the water may include flowing the water from the first section of the wick into a second section of the wick that extends in generally orthogonal relation to first section of the wick.

In certain embodiments, syphoning the water may include collecting the water in a generally horizontal section of the wick.

In certain embodiments, syphoning the water may further include flowing the water from the generally horizontal section of the wick into a generally vertical section of the wick.

In another aspect of the present disclosure, a charging hub for a base station is disclosed that is configured to receive a UAV during docking. The charging hub is repositionable between a retracted position and an extended position and includes a charger subassembly, which is configured for electrical connection to the UAV, and a locking mechanism, which is repositionable in relation to the charger subassembly between a passive position and an active position. In the passive position, the locking mechanism is disengaged from the UAV, and in the active position, the locking mechanism engages the UAV to thereby secure the charging hub to the UAV The locking mechanism is configured such that repositioning of the charging hub from the retracted position into the extended position repositions the locking mechanism from the passive position into the active position and such that repositioning of the charging hub from the extended position into the retracted position repositions the locking mechanism from the active position into the passive position to thereby permit separation of the UAV and the charging hub.

In certain embodiments, the locking mechanism may be pivotable between the active position and the passive position.

In certain embodiments, the locking mechanism may be pivotable through a range of motion that lies substantially within the range of approximately 30 degrees to approximately 60 degrees.

In certain embodiments, the locking mechanism may include limiters that are configured to confine the locking mechanism to the range of motion.

In certain embodiments, the locking mechanism may be biased towards the passive position when the charging hub is in the retracted position.

In certain embodiments, the locking mechanism may be biased towards the active position when the charging hub is in the extended position.

In certain embodiments, the locking mechanism may include: a bail having a bail body with a first lateral end and a second lateral end; bail supports that receive the bail body; and biasing members that are connected to and which extend between the bail supports and the charger subassembly.

In certain embodiments, the bail may be captive to the bail supports.

In certain embodiments, the bail may include a first anchor, which is defined by the first lateral end, and a second anchor, which is defined by the second lateral end.

In certain embodiments, the first anchor and the second anchor may extend from the bail body and into the bail supports in generally opposite directions.

In certain embodiments, the bail supports may include a first bail support that is connected to the first lateral end and a second bail support that is connected to the second lateral end.

In certain embodiments, the first bail support may include a first configuration, and the second bail support may include a second configuration that mirrors the first configuration.

In certain embodiments, the bail supports may include upper feet, which are configured for engagement with the charger subassembly during movement of the charging hub towards the extended position to thereby facilitate repositioning of the locking mechanism from the passive position into the active position, and lower feet, which are configured for engagement with the charger subassembly during movement of the charging hub towards the retracted position to thereby facilitate repositioning of the locking mechanism from the active position into the passive position.

In another aspect of the present disclosure, a charging hub for a base station is disclosed that is configured to receive a UAV during docking. The charging hub is repositionable between a retracted position and an extended position and includes a charger subassembly, which is configured for electrical connection to the UAV, and a locking mechanism, which is pivotable in relation to the charger subassembly between a passive position and an active position, wherein the locking mechanism is configured for engagement with the UAV to thereby secure the charging hub to the UAV in the active position.

In certain embodiments, the locking mechanism may be pivotable through a range of motion that lies substantially within the range of approximately 30 degrees to approximately 60 degrees.

In certain embodiments, the locking mechanism may include limiters that are configured to confine the locking mechanism to the range of motion.

In certain embodiments, the locking mechanism may be biased towards the passive position when the charging hub is in the retracted position.

In certain embodiments, the locking mechanism may include upper feet that are configured for engagement with the charger subassembly during movement of the charging hub towards the extended position to thereby facilitate repositioning of the locking mechanism from the passive position into the active position.

In certain embodiments, the locking mechanism may be biased towards the active position when the charging hub is in the extended position.

In certain embodiments, the locking mechanism may further include lower feet that are configured for engagement with the charger subassembly during movement of the charging hub towards the retracted position to thereby facilitate repositioning of the locking mechanism from the active position into the passive position.

In another aspect of the present disclosure, a charging hub for a base station is disclosed that is configured to receive a UAV during docking. The charging hub is repositionable between a retracted position and an extended position and includes a charger subassembly, which is configured for electrical connection to the UAV, and a locking mechanism, which is repositionable in relation to the charger subassembly from a passive position into an active position to thereby secure the charging hub to the UAV The locking mechanism includes: a bail having a bail body with a first lateral end that defines a first anchor and a second lateral end that defines a second anchor, wherein the first anchor and the second anchor extend from the bail body in generally orthogonal relation thereto and in generally opposite directions; a first bail support that is connected to the first anchor and which includes a first configuration; a second bail support that is connected to the second anchor and which includes a second configuration that mirrors the first configuration; a first biasing member that is connected to and which extends between the first bail support and the charger subassembly; and a second biasing member that is connected to and which extends between the second bail support and the charger subassembly.

In certain embodiments, the first biasing member and the second biasing member may be configured such that repositioning of the charging hub from the retracted position into the extended position automatically repositions the locking mechanism from the passive position into the active position, and such that repositioning of the charging hub from the extended position into the retracted position automatically repositions the locking mechanism from the active position into the passive position.

In certain embodiments, the first bail support and the second bail support may each include upper feet, which are configured for engagement with the charger subassembly to facilitate repositioning of the locking mechanism from the passive position into the active position, and lower feet, which are configured for engagement with the charger subassembly to facilitate repositioning of the locking mechanism from the active position into the passive position.

In another aspect of the present disclosure, a method of docking a UAV with a base station is disclosed. The method includes: landing the UAV on a landing platform of the base station; generally aligning the UAV with a charging hub of the base station; extending the charging hub; and repositioning a locking mechanism on the charging hub from an unlocked position into a locked position to thereby secure the charging hub to the UAV.

In certain embodiments, extending the charging hub may automatically reposition the locking mechanism from the unlocked position into the locked position.

In certain embodiments, repositioning the locking mechanism from the unlocked position into the locked position may include pivoting the locking mechanism between the locked position and the unlocked position.

In certain embodiments, pivoting the locking mechanism may include moving the locking mechanism through a range of motion that lies substantially within the range of approximately 30 degrees to approximately 60 degrees.

In certain embodiments, repositioning the locking mechanism from the unlocked position into the locked position may include overcoming a biasing force that biases the locking mechanism towards the unlocked position.

In certain embodiments, extending the charging hub may include repositioning biasing members on the locking mechanism such that first ends of the biasing members are positioned vertically below second ends of the biasing members.

In certain embodiments, the method may further include retracting the charging hub and repositioning the locking mechanism from the locked position into the unlocked position to thereby release the charging hub.

In certain embodiments, retracting the charging hub may automatically reposition the locking mechanism from the locked position into the unlocked position.

In certain embodiments, repositioning the locking mechanism from the locked position into the unlocked position may include overcoming a biasing force that biases the locking mechanism towards the locked position.

In certain embodiments, retracting the charging hub may include repositioning the biasing members such that the first ends of the biasing members are positioned vertically above the second ends of the biasing members.

In another aspect of the present disclosure, a method of docking a UAV with a base station is disclosed. The method includes landing the UAV on a landing platform of the base station and extending a charging hub of the base station to thereby pivot a locking mechanism on the charging hub into engagement with the UAV and secure the charging hub to the UAV.

In certain embodiments, extending the charging hub may include engaging first electrical contacts on the UAV with second electrical contacts on a charger subassembly of the charging hub.

In certain embodiments, extending the charging hub may further include causing first feet on the locking mechanism to engage the charger subassembly and thereby pivot the locking mechanism from an unlocked position into a locked position.

In certain embodiments, pivoting the locking mechanism from the unlocked position into the locked position may include overcoming a biasing force that biases the locking mechanism toward the unlocked position.

In certain embodiments, the method may further include retracting the charging hub to thereby pivot the locking mechanism out of engagement with the UAV.

In certain embodiments, retracting the charging hub may include disengaging the first electrical contacts from the second electrical contacts and causing second feet on the locking mechanism to engage the charger subassembly and thereby pivot the locking mechanism from the locked position into the unlocked position.

In certain embodiments, pivoting the locking mechanism from the locked position into the unlocked position may include overcoming a biasing force that biases the locking mechanism toward the locked position.

In another aspect of the present disclosure, a method of docking a UAV with a base station is disclosed. The method includes: landing the UAV on a landing platform of the base station; extending a charging hub of the base station into engagement with the UAV to automatically lock the charging hub to the UAV; and retracting the charging hub out of engagement with the UAV to automatically unlock the charging hub from the UAV.

In certain embodiments, extending the charging hub may include overcoming a biasing force that biases a locking mechanism of the charging hub towards an unlocked position thereof.

In certain embodiments, retracting the charging hub may include overcoming a biasing force that biases the locking mechanism towards a locked position thereof.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure describes a base station for an unmanned aerial vehicle (UAV) as well as methods of docking the UAV with the base station. The base station includes a landing platform, which is configured to receive the UAV, and a repositionable charging hub, which is configured for electrical connection to the UAV to facilitate charging thereof. More specifically, the charging hub is repositionable between a retracted position, in which the charging hub is concealed by the landing platform to thereby increase the landing envelope for the UAV (i.e., the space or the surface area on the landing platform that is available to the UAV during landing, docking, and takeoff), and an extended position, in which the charging hub is exposed from the landing platform to facilitate electrical connection to the UAV During docking of the UAV with the base station, the UAV is received on the landing platform, after which, the UAV is subjected to a multi-stage alignment procedure that includes: a first (coarse) stage of alignment; a second (intermediate) stage of alignment; and a third (fine) stage of alignment, wherein the first and second stages of alignment include repositioning of the UAV in relation to the base station (e.g., the landing platform), and the third stage of alignment includes repositioning of the charging hub in relation to the UAV In the first stage of alignment, the landing platform is reconfigured in order to generally center the UAV on the landing platform and generally align the UAV with the charging hub.

In the second stage of alignment, the charging hub is repositioned from the retracted position towards the extended position in order to expose the charging hub from the landing platform, during which, the charging hub engages (contacts) and receives the UAV (e.g., such that the UAV extends into the charging hub) in order to reposition the UAV on the landing platform and increase alignment between the UAV and the charging hub.

In the third stage of alignment, the charging hub is moved into the extended position and is inserted into the UAV, during which, the charging hub is repositioned from a normal position into a deflected position to thereby increase alignment between corresponding electrical contacts on the charging hub and the UAV and facilitate electrical connection of the UAV to the base station.

Figure 1:
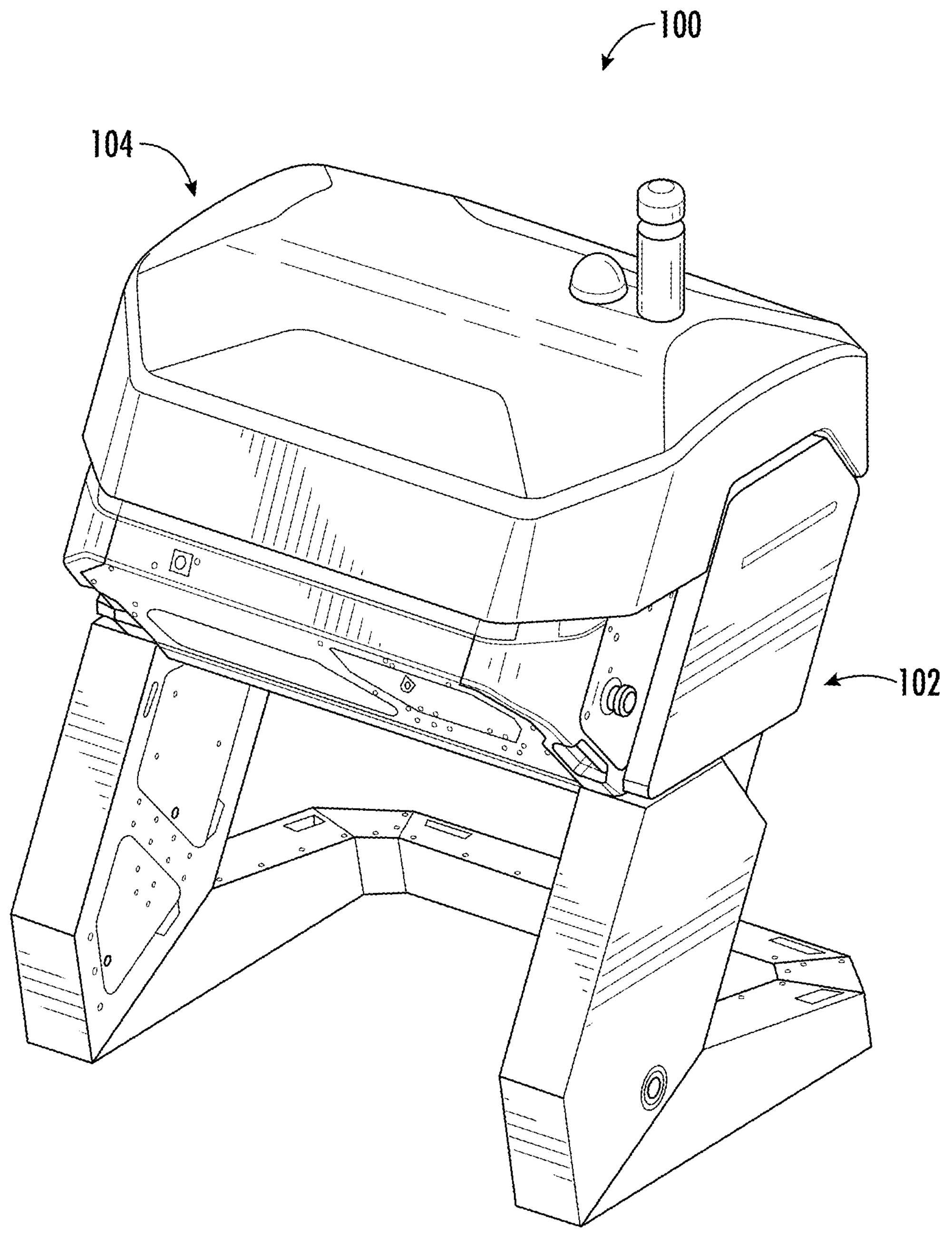
FIG. 1 is a front, perspective view of a base station according to the principles of the present disclosure shown in a closed position.
Figure 2:
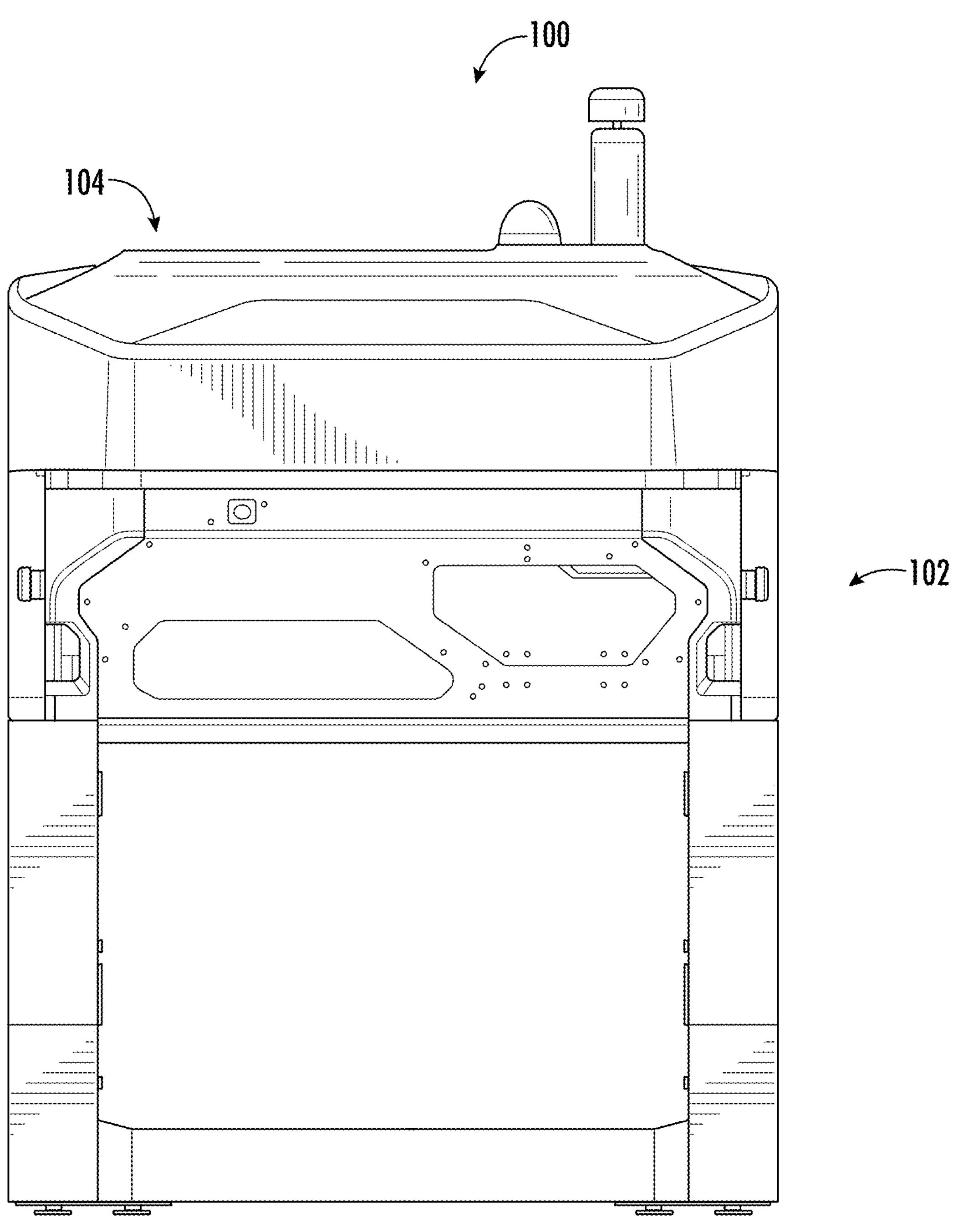
FIG. 2 is a front, plan view of the base station.
Figure 3:
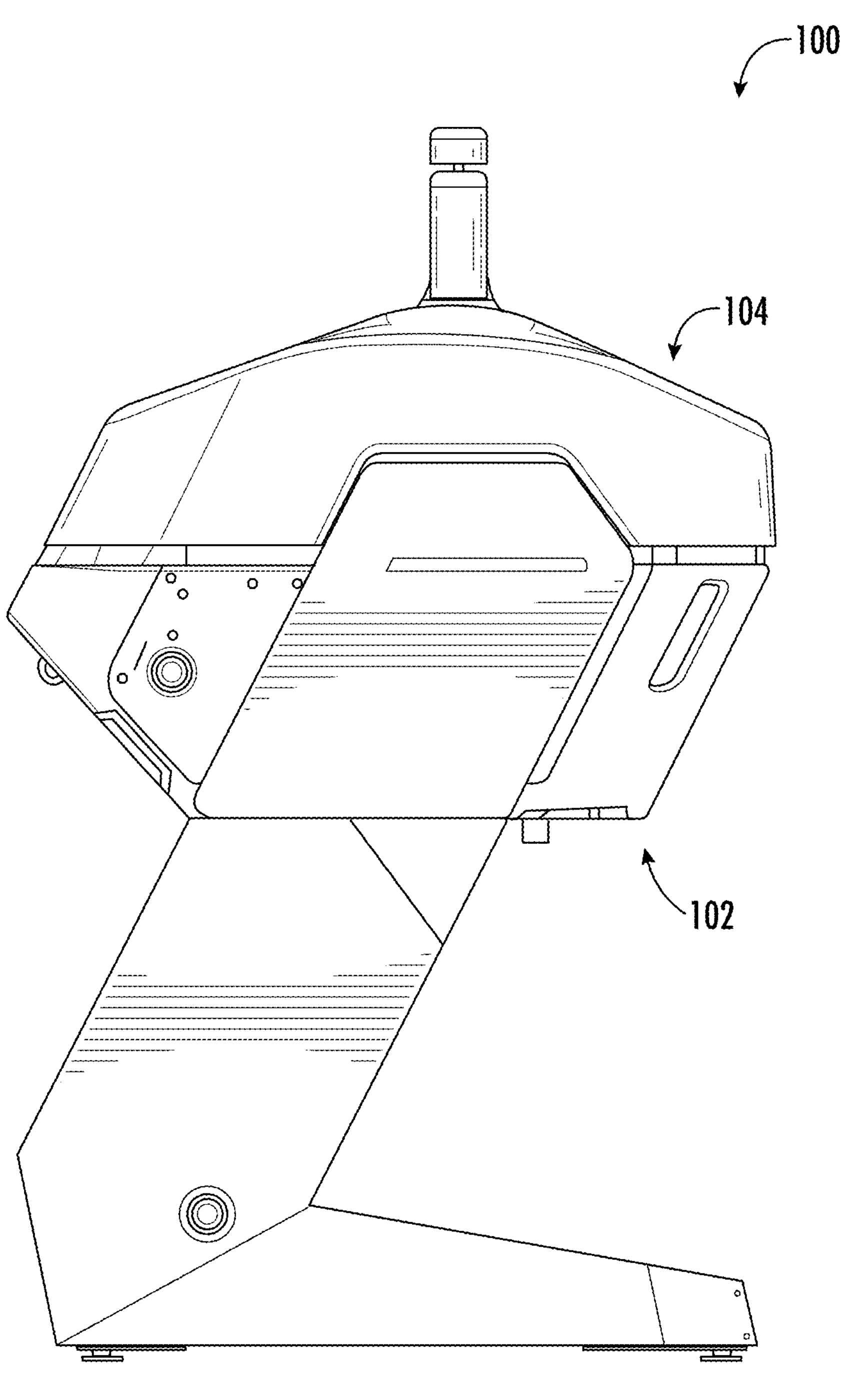
FIG. 3 is a side, plan view of the base station.
Figure 4:
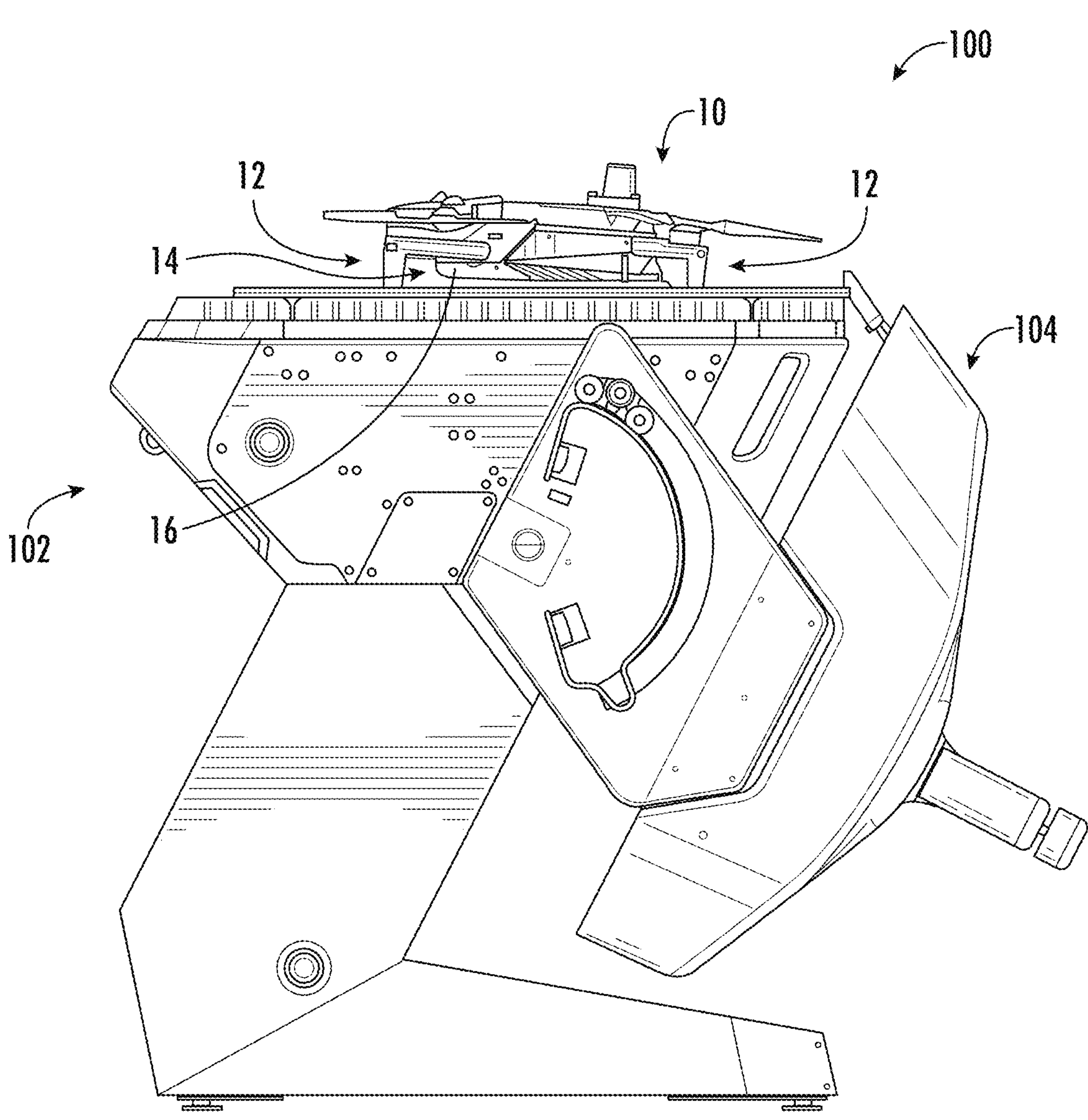
FIG. 4 is a side, plan view of the base station shown in an open position.
Figure 5:
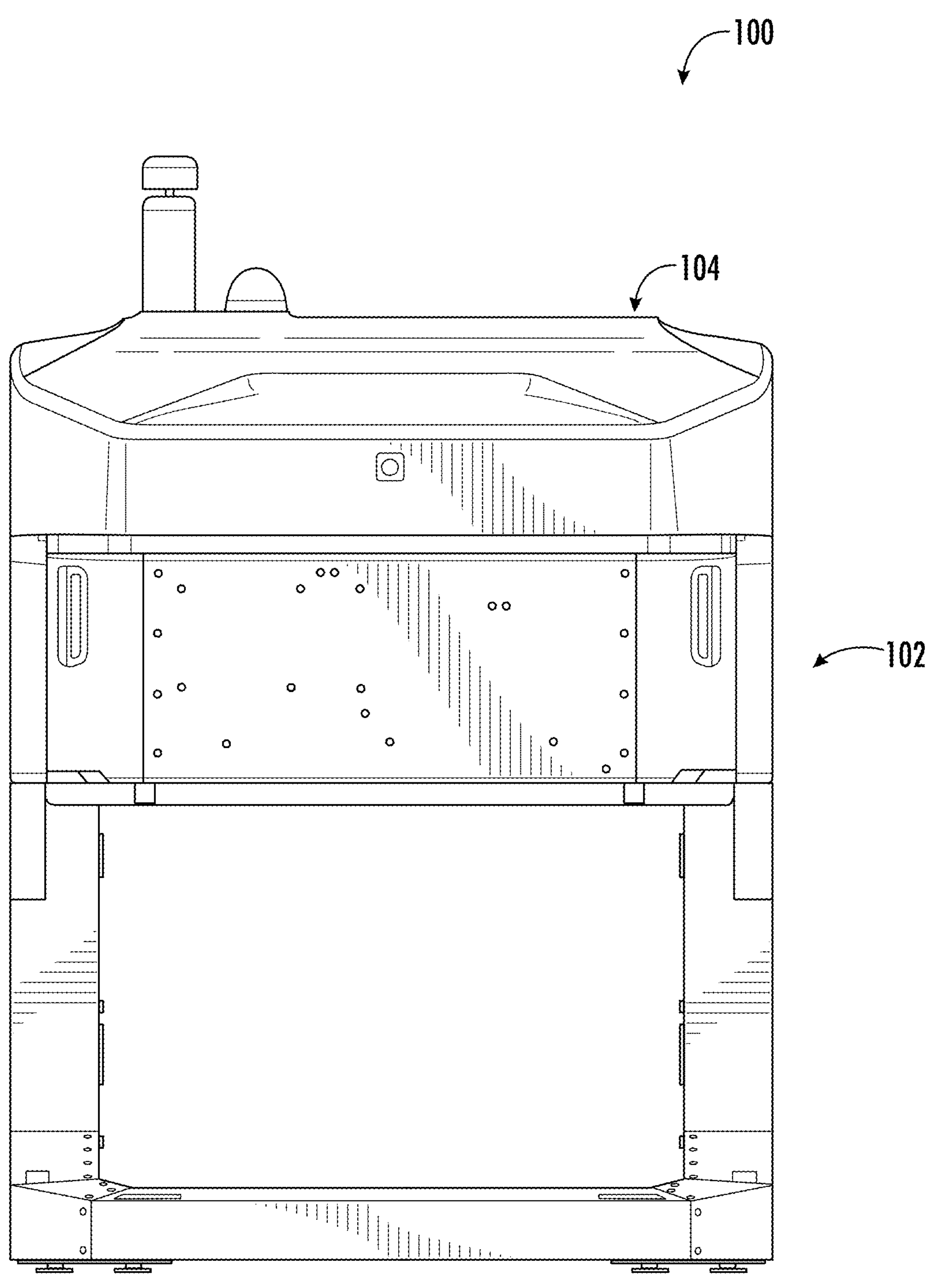
FIG. 5 is a rear, plan view of the base station.
Figure 6:
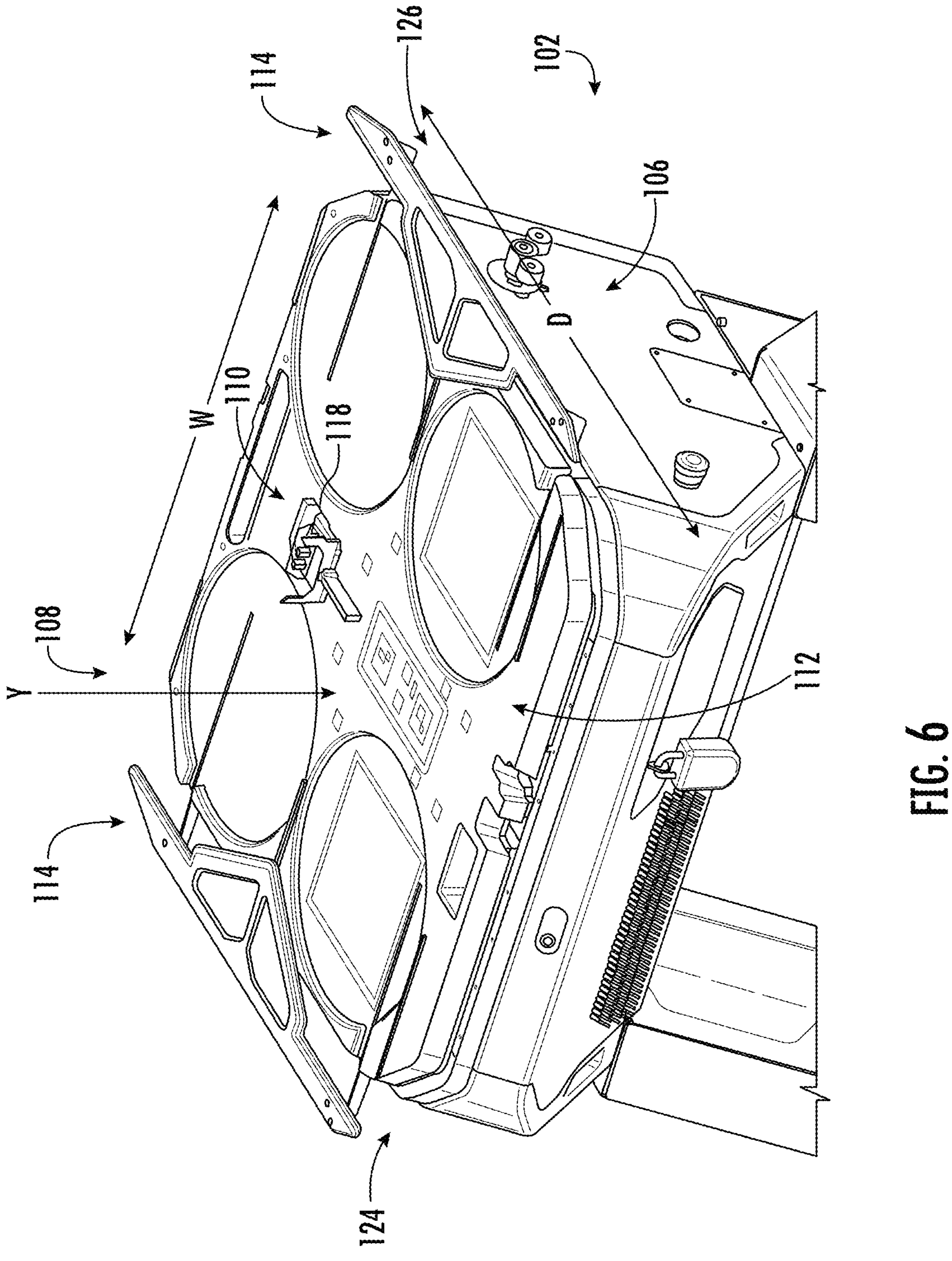
FIG. 6 is a partial, top, perspective view of the base station illustrating a landing platform thereof, which includes repositionable alignment members.

Referring now to the drawings, FIGS. 1-5 illustrate a base station (dock) 100 that is configured for automated servicing (e.g., storage, charging, operation, etc.) and accommodation of a UAV 10 (FIG. 4). While a single base station 100 and a single UAV 10 are shown and described herein, in certain embodiments of the disclosure, it is envisioned that a plurality of base stations 100 and UAVs 10 may be utilized depending, for example, upon the particular intended use of the UAVs 10.

To support autonomous landing and docking of the UAV 10 with the base station 100, it is envisioned that the UAV 10 may follow any suitable process or procedure and may include any suitable electrical and/or logic components, as described in U.S. Pat. No. 11,873,116, the entire contents of which are hereby incorporated by reference.

The base station 100 includes a base 102 and a roof 104, which is supported by the base 102 such that the roof 104 and the base station 100 are repositionable between a closed position (FIGS. 1-3, 5), in which the base 102 and the roof 104 collectively define an enclosure that conceals the UAV 10 therein, and an open position (FIG. 4), which facilitates takeoff and landing of the UAV 10.

With reference now to FIGS. 6-13 as well, the base 102 includes a body 106, which is the main structural member of the base 102 and supports various internal and external components of the base station 100; a (reconfigurable) landing platform 108; and a repositionable charging hub 110.

Figure 12:
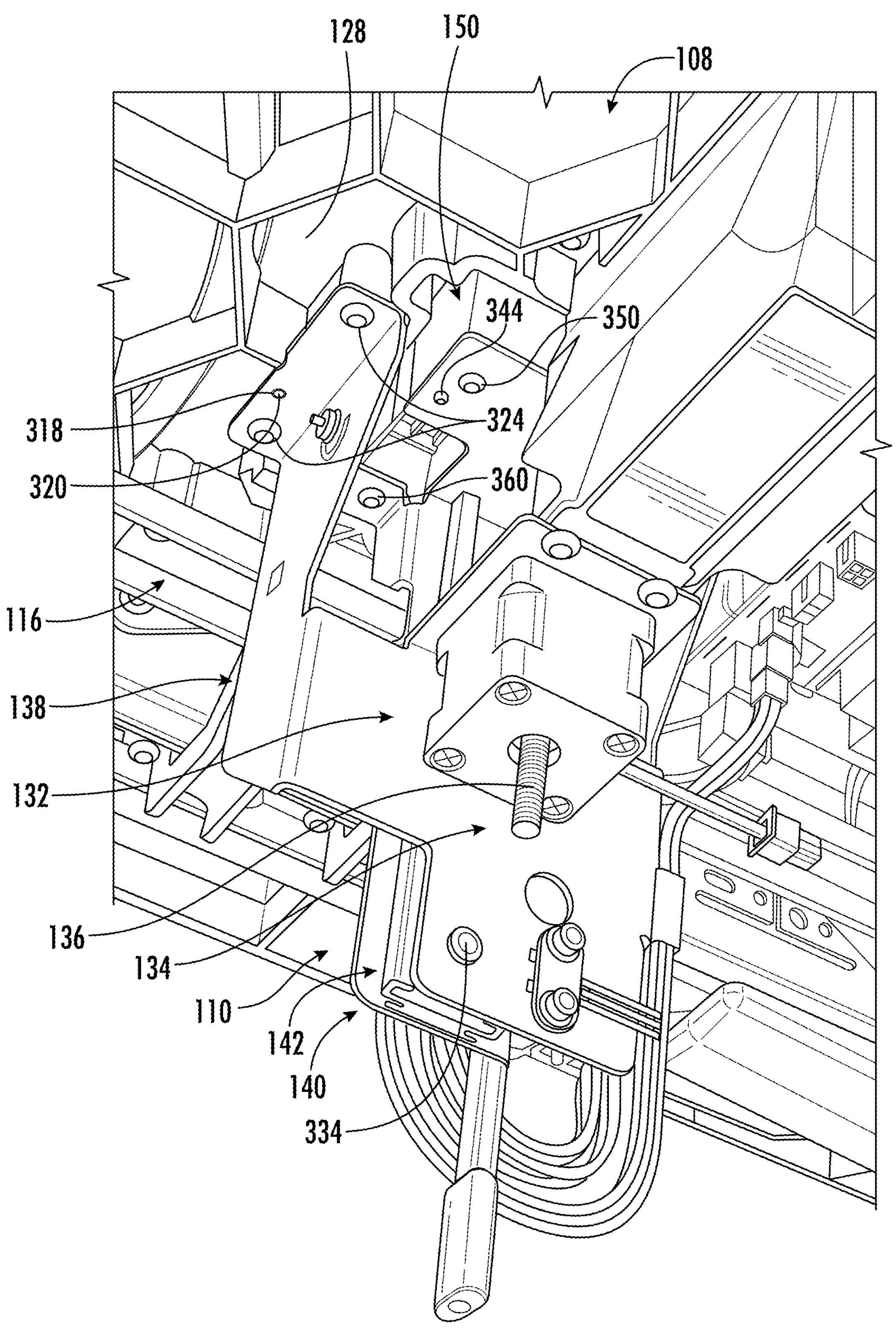
FIG. 12 is a partial, bottom, perspective view of the landing platform and the charging hub.
Figure 13:
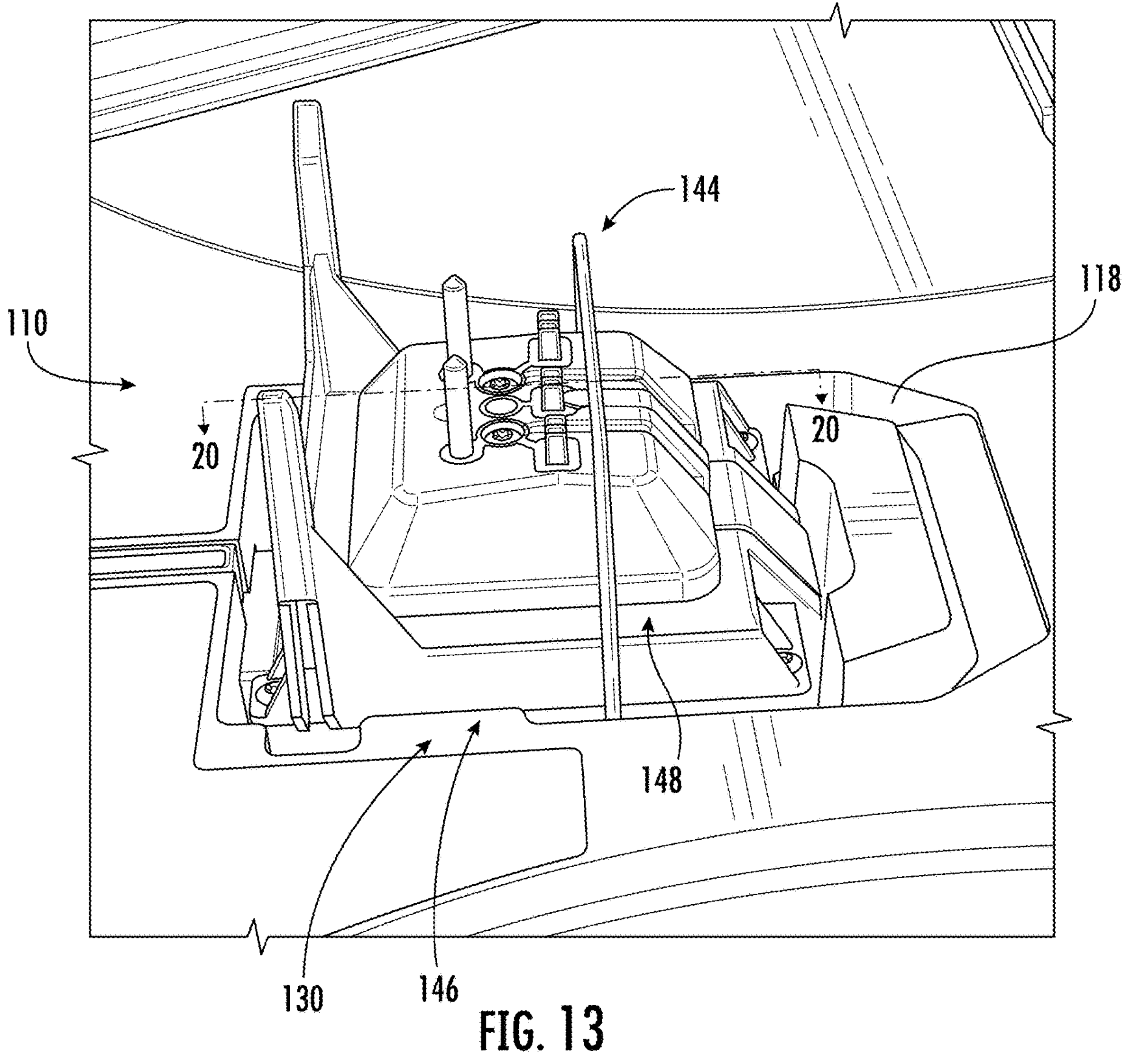
FIG. 13 is a partial, top, perspective view of the landing platform and the charging hub, which is shown in the extended position.
Figure 14:
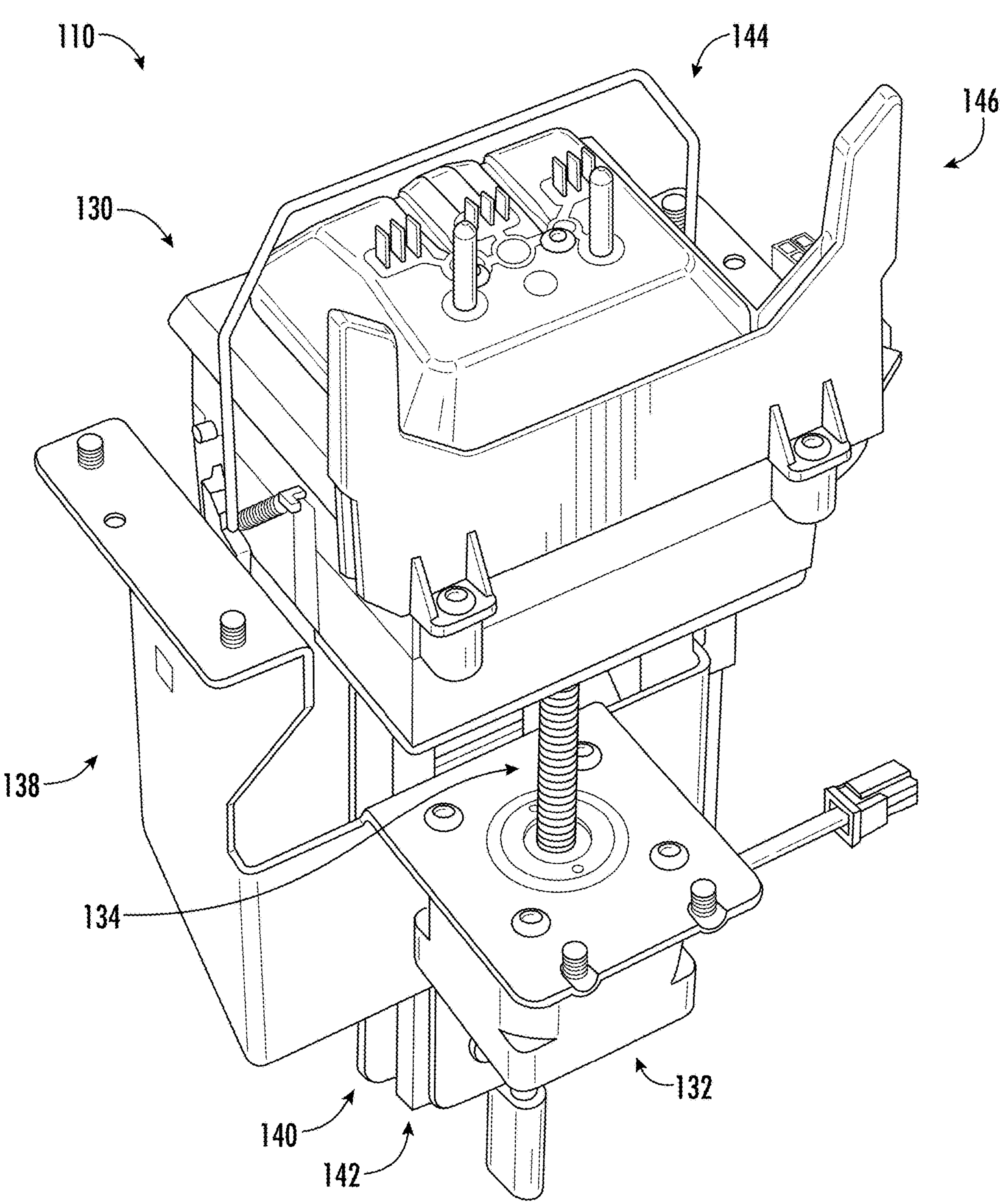
FIG. 14 is a top, perspective view of the charging hub.

The landing platform 108 is supported by (e.g., connected (secured) to the body 106 and is configured to receive the UAV 10 during docking. The landing platform 108 defines a (lateral) width W (FIG. 6) and a depth D, which extend in generally orthogonal (perpendicular) relation to each other and in generally orthogonal (perpendicular) relation to a generally vertical landing direction Y of the UAV 10 when docking with the base station 100. The landing platform 108 includes: a stage 112, which is configured to receive the UAV 10; a pair of (first and second) alignment members 114; and a drive mechanism 116 (FIG. 12).

The stage 112 defines a window 118 (FIGS. 6, 10, 11, 13), which extends through the landing platform 108, and a plurality of landing areas 120 (FIG. 7), which define the landing envelope for the UAV 10 (i.e., the space or the surface area on the landing platform 108 that is available to the UAV 10 during landing, docking, and takeoff).

The window 118 is generally aligned with the charging hub 110 (i.e., along the width W and the depth D of the landing platform 108) and is configured to receive the charging hub 110 such that the charging hub 110 moves through the landing platform 108 via the window 118 during repositioning between the retracted and extended positions. More specifically, the window 118 is positioned such that the UAV 10 is generally centered on the landing platform 108 upon connection of the charging hub 110 to the UAV 10, as described in further detail below.

Although shown as being generally rectangular in configuration, it is envisioned that the window 118 may include any suitable configuration (i.e., depending upon the particular configuration of the charging hub 110, the UAV 10, etc.).

The landing areas 120 (FIG. 7) receive and constrain the UAV 10 during docking with the base station 100. More specifically, the landing areas 120 are configured to receive legs 12 (FIGS. 4, 7-11) of the UAV 10 during docking and correspond in number thereto. As such, in the illustrated embodiment, the landing platform 108 includes four landing areas 120*i*, 120*ii*, 120*iii*, 120*iv*. It is envisioned, however, that the specific number of landing areas 120 may be increased or decreased in alternate embodiments (e.g., depending on the particular configuration of the UAV 10) without departing from the scope of the present disclosure.

The landing areas 120 define depressions 122 that extend vertically into the stage 112 and which are configured to receive the legs 12 of the UAV 10. The depressions 122 not only facilitate landing of the UAV 10 with greater tolerance (i.e., by increasing the margin for error), but control the position of the UAV 10 and inhibit unintended movement of the UAV 10 in relation to the landing platform 108 (e.g., in windy conditions).

The alignment members 114 are positioned (located) at opposite lateral ends 124, 126 of the landing platform 108 and are configured for engagement (contact) with the UAV 10 (i.e., the legs 12). The alignment members 114 are movable (repositionable) in relation to the stage 112 between an extended position (FIGS. 6, 7) and a retracted position (FIGS. 8, 9), which facilitates reconfiguration of the landing platform 108 between a first (landing) configuration and a second (charging) configuration, respectively. More specifically, during reconfiguration of the landing platform 108 between the first and second configurations, the alignment members 114 are movable (repositionable) along a generally horizontal axis of movement M1 (FIG. 7) that extends in generally parallel relation to the width W (FIG. 6) of the landing platform 108 and in generally orthogonal (perpendicular) relation to the landing direction Y of the UAV 10.

When the landing platform 108 is in the first configuration, the alignment members 114 are in the extended position and are positioned laterally outward of the landing areas 120 (i.e., along the width W of the landing platform 108), which facilitates docking of the UAV 10 with the base station 100. When the landing platform 108 is in the second configuration, the alignment members 114 are in retracted position and are generally aligned with and are positioned vertically above the landing areas 120. During reconfiguration of the landing platform from the first configuration into the second configuration (i.e., during repositioning of the alignment members 114 from the extended position into the retracted position), the alignment members 114 are movable laterally inward (i.e., towards each other) along the axis of movement M1 (FIG. 7) and engage (contact) the UAV 10 (e.g., the legs 12 thereof) in order to reposition (e.g., generally center) the UAV 10 on the landing platform 108 during a first (coarse) stage of alignment. Centering of the UAV 10 on the landing platform 108 during the first stage of alignment generally aligns a power source 14 (e.g., a battery) on the UAV 10 with the charging hub 110, thereby facilitating charging of the UAV 10, and facilitates proper closure of the roof 104 by inhibiting (if not entirely preventing) contact with the UAV 10 and, thus, damage to the UAV 10 and/or the base station 100.

The drive mechanism 116 (FIG. 12) is positioned within the base 102 (i.e., the body 106) and is supported by the landing platform 108 such that the drive mechanism 116 is concealed by the landing platform 108 when the landing platform 108 is in the closed position. More specifically, the drive mechanism 116 is connected (secured) to an underside 128 of the landing platform 108 and to the alignment members 114 to facilitate repositioning thereof between the extended and retracted positions, further details of which are provided in U.S. application Ser. No. 19/090,828, the entire contents of which are hereby incorporated by reference.

Figure 7:
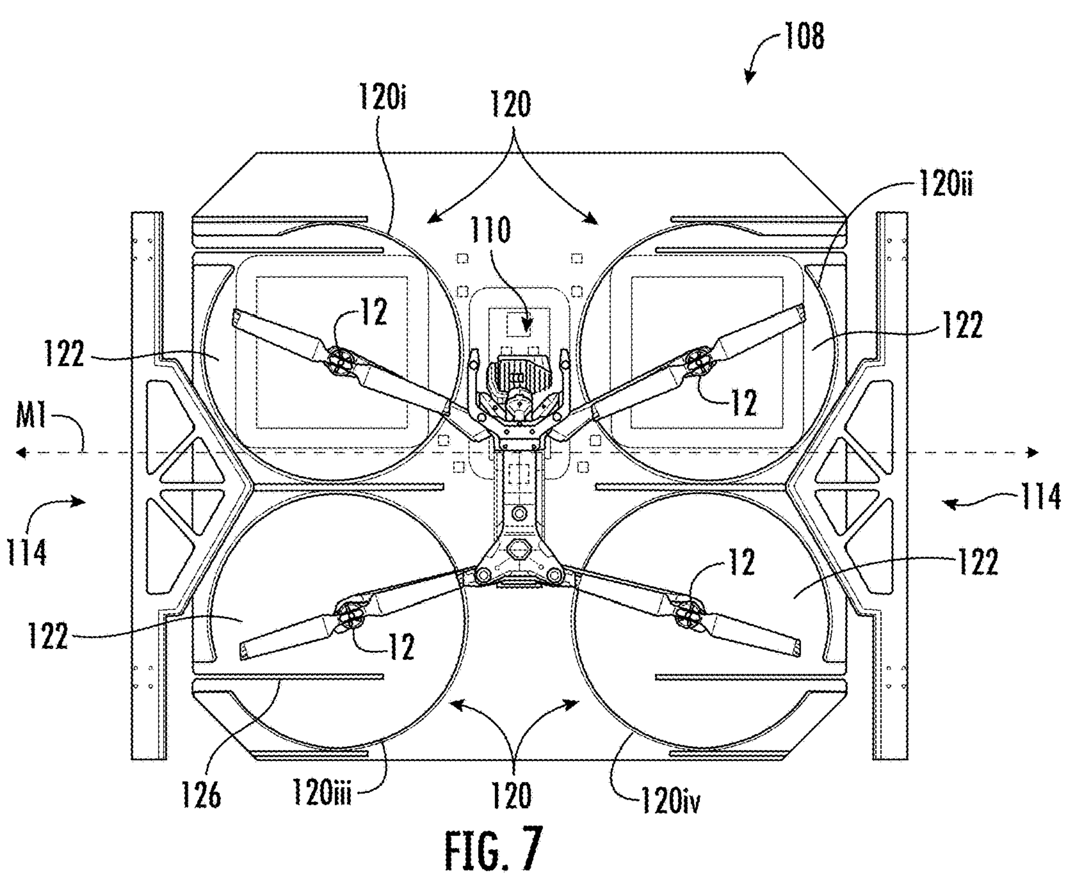
FIG. 7 is a top, plan view of the landing platform and the UAV with the alignment members shown in an extended position.
Figure 8:
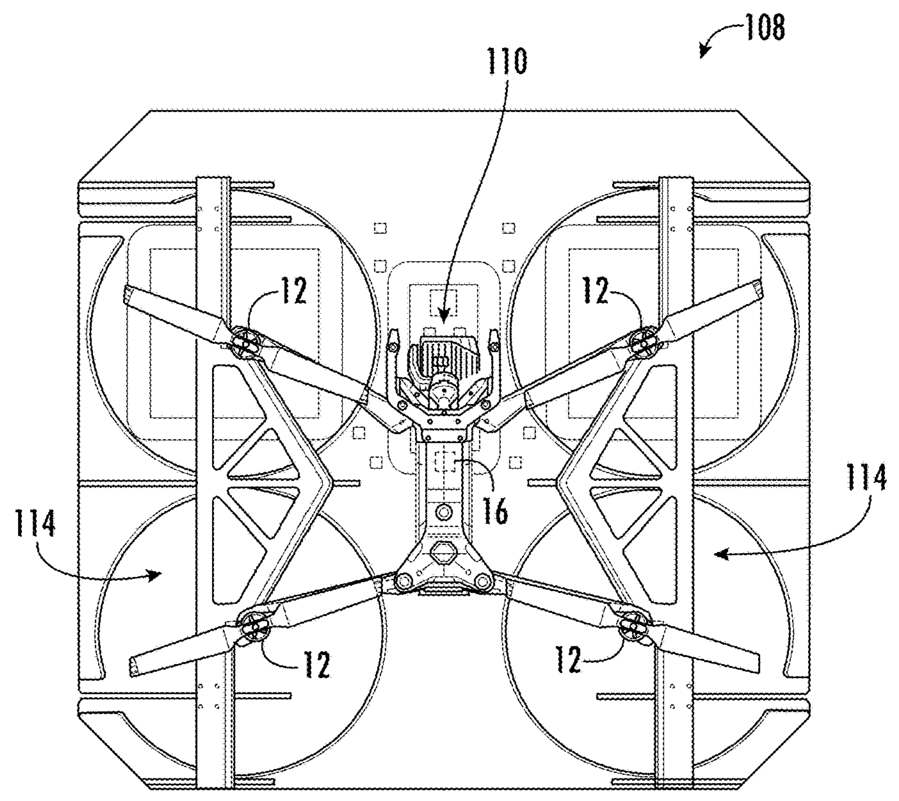
FIG. 8 is a top, plan view of the landing platform and the UAV with the alignment members shown in a retracted position.
Figure 9:
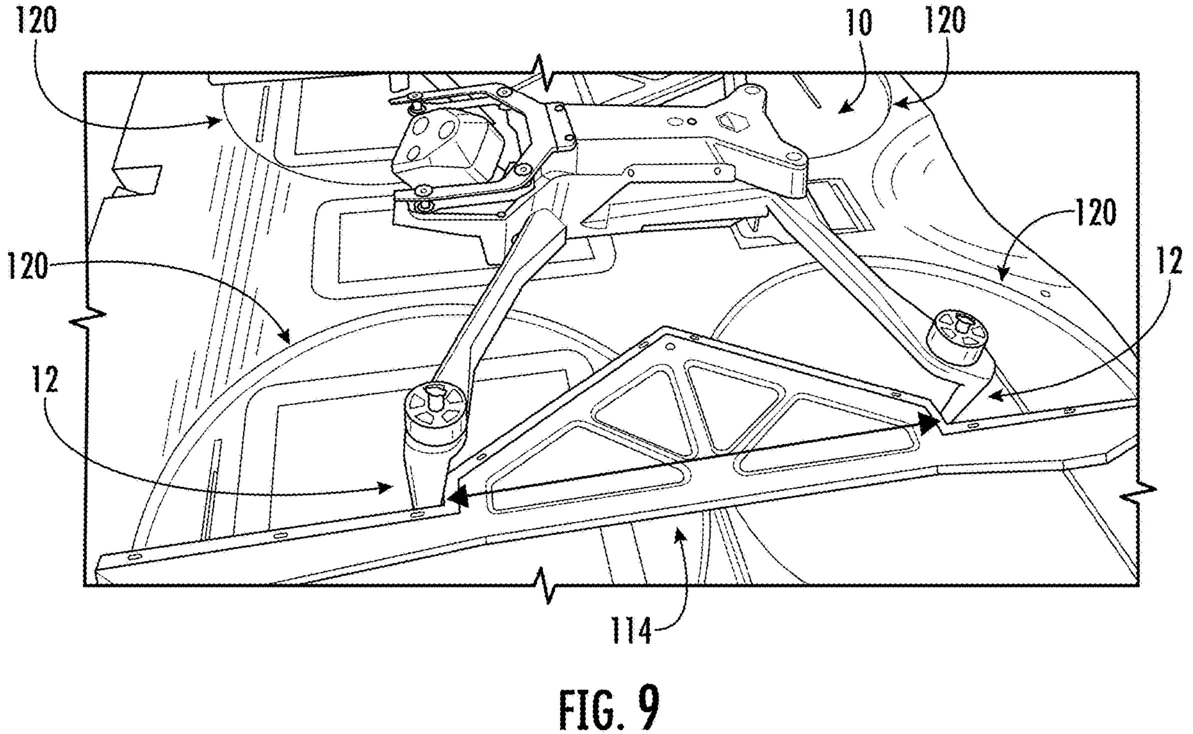
FIG. 9 is a partial, top, perspective view of the landing platform and the UAV with the alignment members shown in the retracted position.
Figure 10:
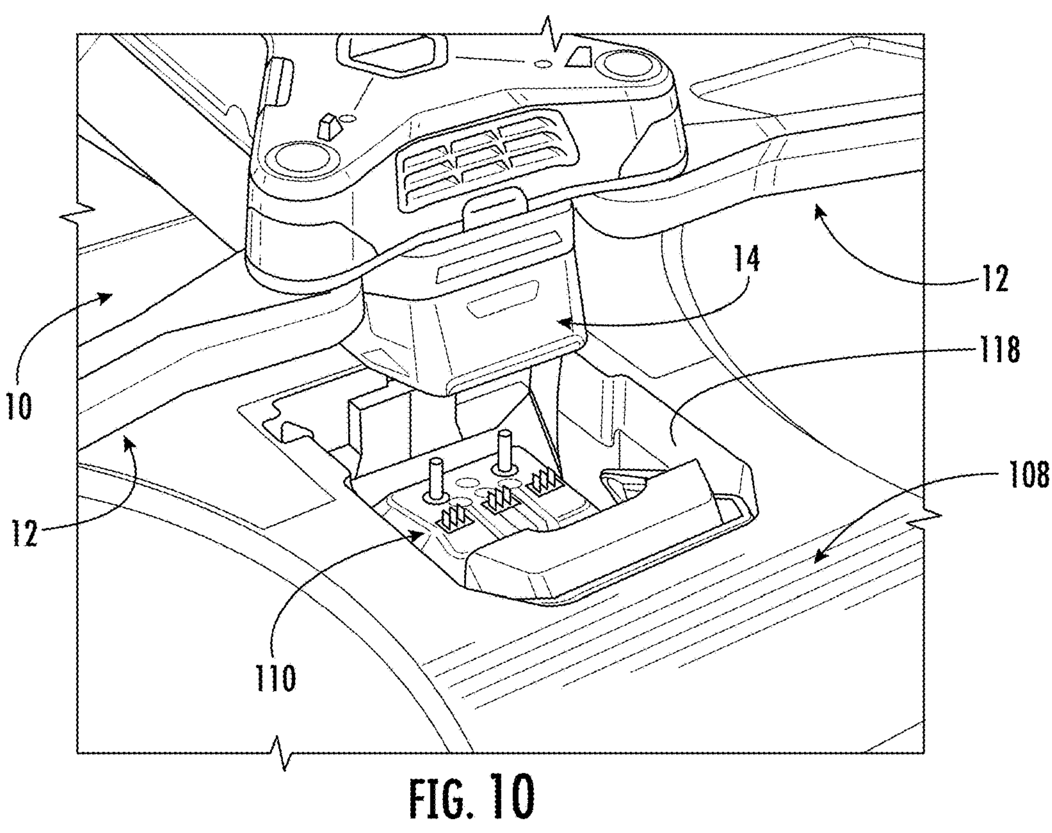
FIG. 10 is a partial, top, perspective view of the landing platform, the UAV, and a charging hub of the base station, which is shown in a retracted position.

With reference now to FIGS. 14-33 as well, the charging hub 110 will be discussed. The charging hub 110 is configured for engagement (contact) with and electrical connection to the power source 14 on the UAV 10, and may draw power from any suitable source, whether internal to the base station 100 (e.g., the main PCB in the base station 100) or external. The charging hub 110 is vertically repositionable between a (first) retracted position (FIGS. 10, 17, 18) and a (second) extended position (FIGS. 11, 13, 15) along a generally vertical axis of movement M2 (FIG. 11) that extends in generally parallel relation to the landing direction Y (FIG. 6) of the UAV 10 and in generally orthogonal (perpendicular) relation to the axis of movement M1 (FIG. 7).

Prior to landing of the UAV 10, the charging hub 110 is maintained in the retracted position, in which the charging hub 110 is concealed by the landing platform 108. Concealing the charging hub 110 within the landing platform 108 facilitates docking of the UAV 10 by increasing the landing envelope, thereby reducing the precision required during landing and increasing the margin for error in order to increase the number of successful landings. Subsequent to landing and general alignment of the UAV 10 with the charging hub 110, which is discussed below, however, the charging hub 110 is repositioned into the extended position, in which the charging hub 110 is exposed from and extends vertically through the landing platform 108 (e.g., the window 118) to facilitate connection to and charging of the UAV 10.

The charging hub 110 is connected (secured) to the underside 128 of the landing platform 108, as seen in FIG. 12, and is generally positioned (located) between the landing areas 120. The charging hub 110 is configured to mechanically interface with the UAV 10 to thereby reposition the UAV 10 on the landing platform 108 and increase alignment therewith, as described in further detail below. The charging hub 110 includes: a charger subassembly 130; a motor assembly (drive mechanism) 132; a drive member 134 (e.g., a threaded lead screw 136); a (first, fixed, static) mounting bracket 138; a (second, movable) slide bracket 140; a guide mechanism 142; and a locking mechanism 144.

The charger subassembly 130 (FIGS. 13-15, 17-19) includes: a registration member 146; a charging head 148; a charging base 150; and a wick 152.

The registration member 146 is configured for engagement (contact) with the UAV 10 and further facilitates and increases alignment between the UAV 10 and the charging hub 110, as described in further detail below. The registration member 146 is connected (secured) to the charging base

150 such that the charging head 148 is captive to the registration member 146 and includes: a body 154 and (first) alignment members 156.

The body 154 defines an internal cavity 158 (FIG. 20) and a window 160 and includes: openings 162; a lip 164; and a flange 166.

The window 160 receives the charging head 148 such that the charging head 148 extends through the window 160 and is movable therein during repositioning of the charging head 148, which is discussed in further detail below. The window 160 thus defines the range of motion for the charging head 148 in multiple degrees of freedom.

The openings 162 receives fastener(s) 168 (FIGS. 20, 21) such that the fastener(s) 168 extend into the charging base 150 to thereby fixedly (e.g., non-movably) connect (secure) the registration member 146 to the charging base 150.

The lip 164 extends about (circumscribes) the window 160 and extends upwardly into the charging head 148. The charging head 148 and the lip 164 collectively define a tortuous entry path P (FIG. 21), which extends beneath the charging head 148 and over the lip 164, in order to inhibit (if not entirely prevent) water, dust, debris, etc., from entering the charging hub 110.

The flange 166 supports the wick 152 and extends downwardly from the body 154 in a generally vertical orientation. The flange 166 and, thus, the wick 152, is generally centered on the charging hub 110 and includes a (first) segment 170, which extends from an upper (top) surface 172 of the body 154 in generally transverse relation thereto, and a (second) segment 174, which intersects and extends from the segment 170 and along the charging base 150 in a generally vertical orientation (e.g., in generally orthogonal (perpendicular) relation to the upper surface 172). More specifically, in the illustrated embodiment, the flange 166 is configured such that the segment 170 extends from the upper surface 172 at a (first) obtuse angle $\alpha 1$ that lies substantially within the range of approximately 120 degrees to approximately 150 degrees and such that the segment 174 extends from the segment 170 at a (second) obtuse angle $\alpha 2$ that lies substantially within the range of approximately 120 degrees to approximately 150 degrees. The configuration of the flange 166 (e.g., the orientations of the segments 170, 174) directs water outwardly and downwardly through the wick 152 under the influence of gravity via a syphoning effect in order to facilitate the drainage of water from both the wick 152 and the charger subassembly 130.

The alignment members 156 are configured as horns 176 that extend upwardly from the body 154 in generally vertical orientations (e.g., such that the flange 166 and the horns 176 extend in generally opposite directions). The horns 176 are positioned (located) at (adjacent to) a rear end 178 of the body 154 and are configured to mechanically interface with (e.g., engage (contact)) an external surface 16 of the UAV 10 (e.g., the power source 14).

The horns 176 define a cradle 180 therebetween that is configured in correspondence with the UAV 10 (e.g., the power source 14). The cradle 180 is configured to receive the UAV 10 during a second (medium, moderate) stage of alignment as the charging hub 110 is repositioned from the retracted position into the extended position such that, in the extended position, the UAV 10 extends into the charging hub 110.

The horns 176 include ends 182 that define bearing surfaces 184, which are configured for engagement (contact) with the UAV 10 (e.g., the power source 14) and are angled (beveled, chamfered) in configuration. The angled configurations of the bearing surfaces 184 guide and funnel the UAV 10 into the cradle 180 during extension of the charging hub 110, which repositions the UAV 10 on the landing platform 108 in order to further align the power source 14 with the charging hub 110 during the second stage of alignment.

Figure 19:
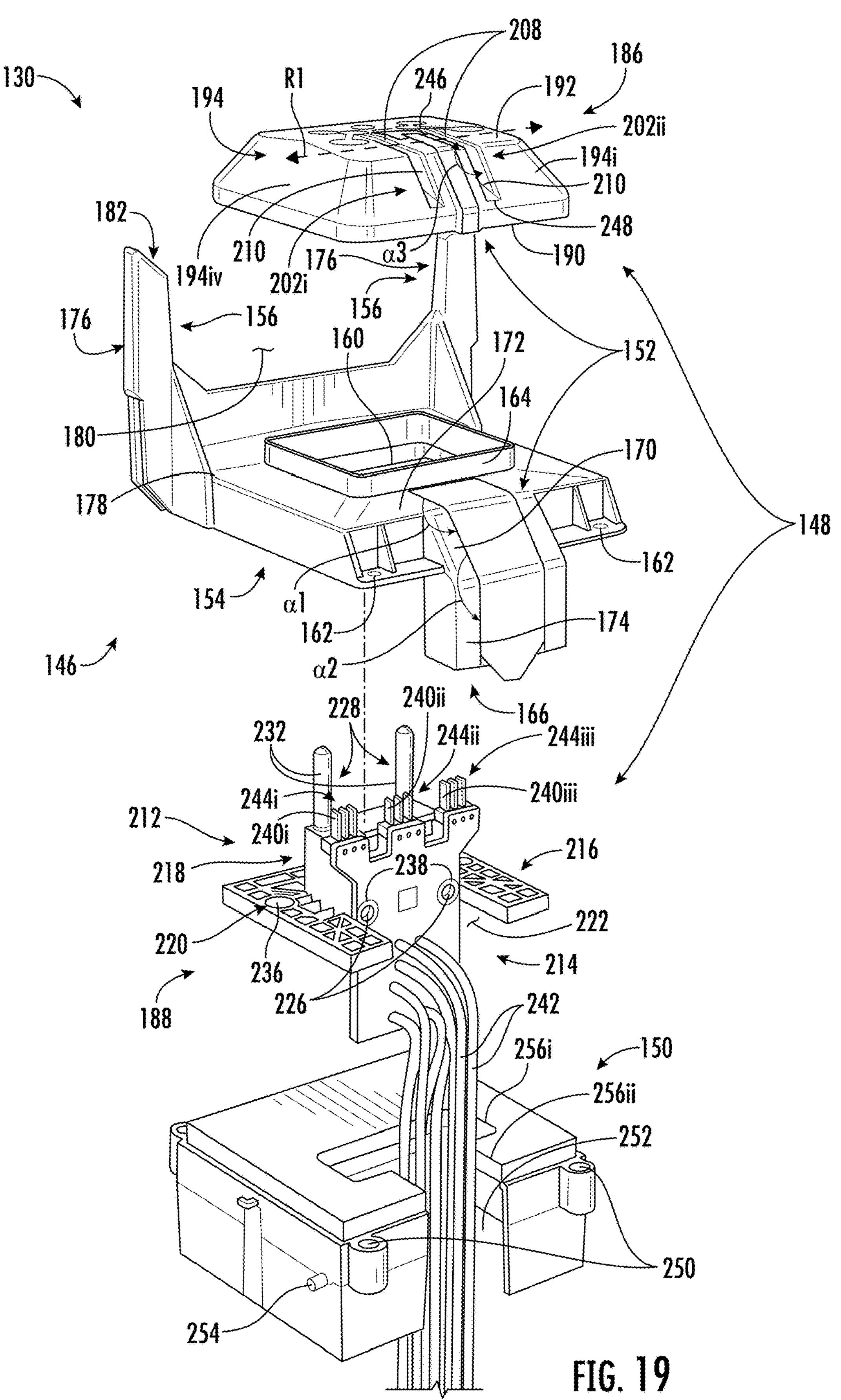
FIG. 19 is a top, perspective view of a charger subassembly of the charging hub shown with parts separated.

With reference to FIG. 19 in particular, the charging head 148 will be discussed. As described in further detail below, the charging head 148 is configured for electrical connection to the UAV 10 to facilitate the transmission of power and data between the UAV 10 and the base station 100, further facilitates and increases alignment between the UAV 10 and the charging hub 110, and facilitates drainage by shedding water from the charging hub 110.

The charging head 148 is movable (repositionable) in relation to the registration member 146 and the charging base 150 (e.g., within the window 160) between normal and deflected positions, as described in further detail below, and includes an umbrella 186 and a printed circuit board (PCB) assembly 188.

The umbrella 186 engages (contacts) and overlies the registration member 146 such that the lip 164 on the body 154 of the registration member 146 extends into the umbrella 186, thereby establishing the aforementioned tortuous path P (FIG. 21), and (partially) covers the PCB assembly 188 so as to shield (protect) the PCB assembly 188 from water, dust, debris, etc. The umbrella 186 includes a generally frustum configuration that defines: a (lower) bottom surface 190, which receives the registration member 146 (e.g., the lip 164); an (upper) top surface 192, which is generally planar and extends in generally parallel relation to the bottom surface 190; and side surfaces 194, which extend between and connect the bottom surface 190 and the top surface 192. More specifically, the side surfaces 194 include: a (first, front) side surface **194*i* (FIGS. 19, 20), which extends in generally parallel relation to the segment 170 of the flange 166 on the registration member 146; a (second, rear) side surface 194*ii* (FIG. 20); and (third, fourth) side surfaces 194*iii*, 194*iv* (FIGS. 19, 20), which extend between and connect the side surfaces 194*i*, 194*ii*. The side surfaces 194 are sloped (angled) in configuration, which facilitates (promotes) runoff and, thus, the drainage of water outwardly and away from the umbrella 186 and the charging hub 110**.

Figure 17:
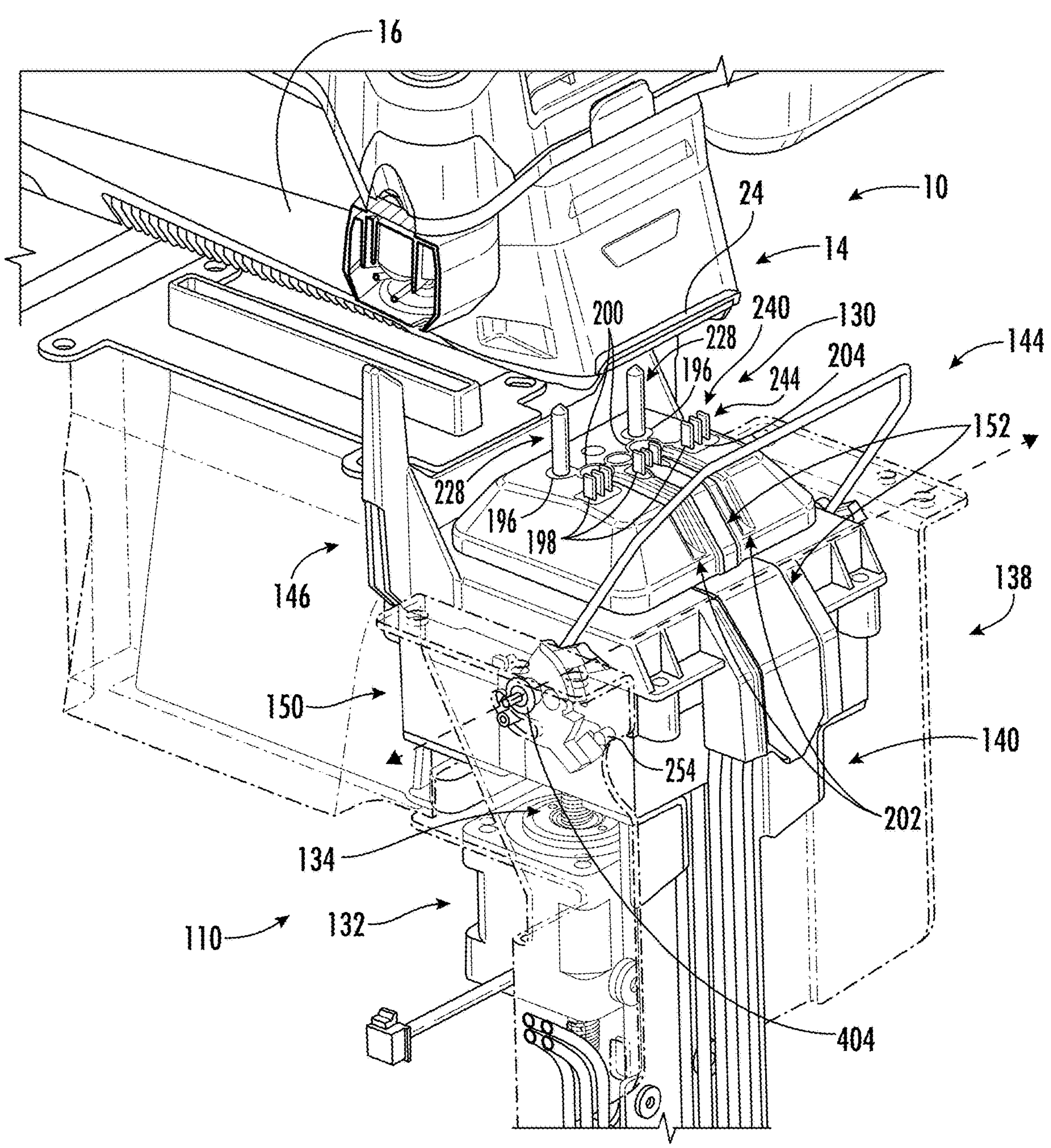
FIG. 17 is a partial, perspective view of the UAV and the charging hub, which is shown in the retracted position.
Figure 18:
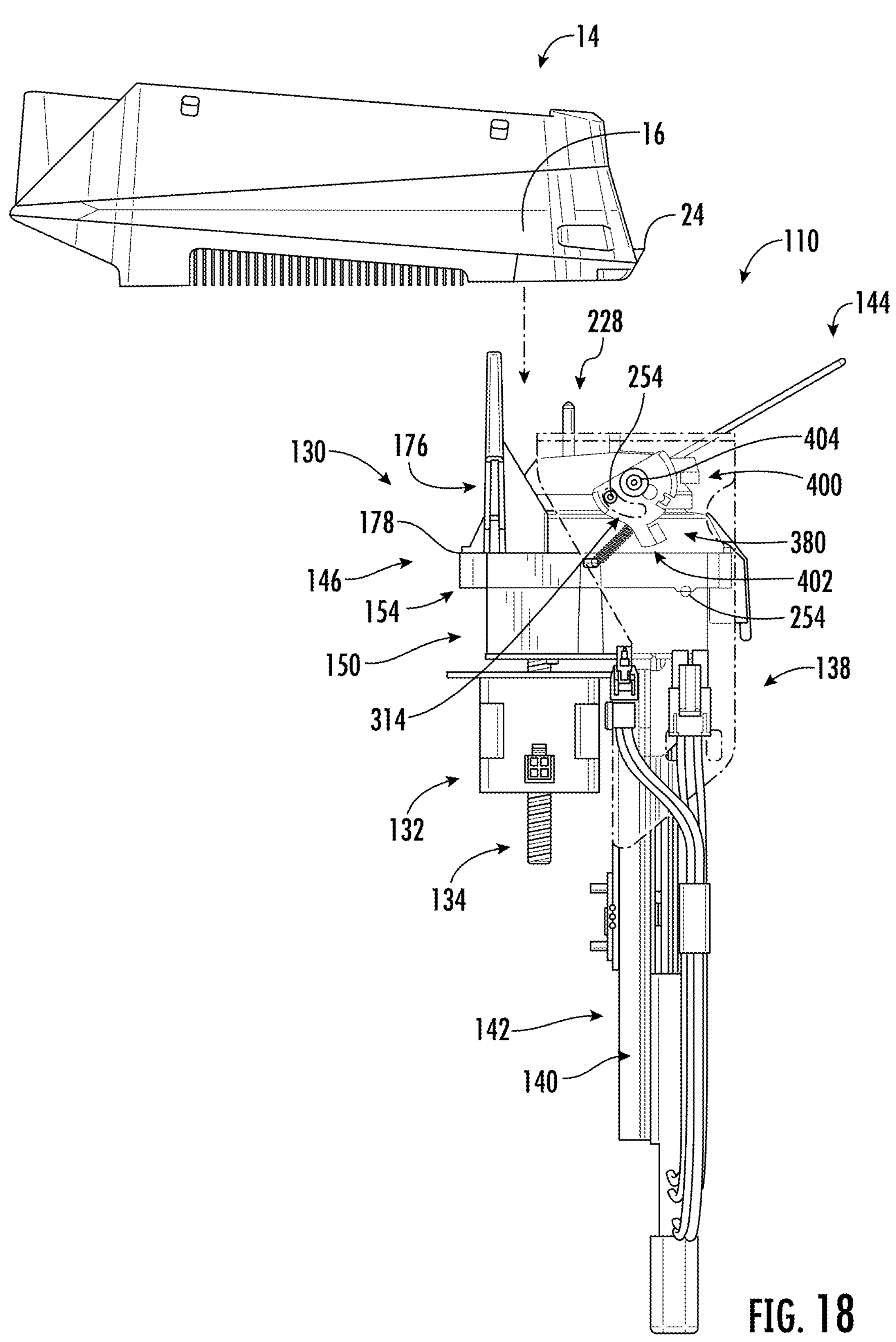
FIG. 18 is a partial, side, plan view of the UAV and the charging hub, which is shown in the retracted position.

The umbrella 186 includes: openings 196, 198, 200 (FIG. 17); (one or more) at least one trough (drainage channel) 202; and a sealing member 204.

The openings 196, 198, 200 are formed in the top surface 192 and extend therethrough. The openings 196, 198 receive the PCB assembly 188 such that the PCB assembly 188 extends through the umbrella 186, as described in further detail below, and the openings 200 receive fasteners 206 (FIGS. 21, 22) that extend into the PCB assembly 188 to thereby fixedly (e.g., non-movably) connect (secure) the umbrella 186 to the PCB assembly 188.

The trough(s) 202 extend into the umbrella 186 and receive, collect, and direct water away from the PCB assembly 188. More specifically, the trough(s) 202 are defined by (are formed in) and extend between the top surface 192 and the side surface **194*i***.

In the illustrated embodiment, the umbrella 186 includes a plurality of troughs 202 that are spaced laterally along a reference axis R1. More specifically, the umbrella 186 includes a (first) trough **202*i* and a (second) trough 202*ii*. It envisioned, however, that the particular number of troughs 202 included on the umbrella 186 may be increased or decreased in alternate embodiments (e.g., depending upon the particular configuration of the PCB assembly 188, the power and/or data requirements of the charging hub 110, etc.). For example, an embodiment of the charging hub 110 in which the umbrella 186 includes a single trough 202** is also envisioned herein, however.

The trough(s) 202 include (first) sections 208 and (second) sections 210, which extend in non-parallel relation to the sections 208. As seen in FIG. 19, each of the sections 208 extends in a generally horizontal orientation, which allows the sections 208 to collect water, and the sections 210 intersect and extend transversely from the sections 208 such that each of the sections 210 extends in a non-horizontal orientation, which allows the sections 210 to direct and drain water outwardly and downwardly from the sections 208 under the influence of gravity in order to facilitate the drainage of water from the umbrella 186.

In the illustrated embodiment, the sections 210 extend from the sections 208 at obtuse angles $\alpha 3$ that lie substantially within the range of approximately 120 degrees to approximately 150 degrees, which are dictated by the sloped configuration of the side surface 194*i*. Embodiments in which the sections 210 may extend in generally orthogonal (perpendicular) relation to the sections 208 (e.g., such that the sections 210 each extend in a generally vertical orientation) are also envisioned herein, however.

The PCB assembly 188 is positioned (located) between the registration member 146 and the charging base 150 and extends through the registration member 146 and the umbrella 186, as described in further detail below. The PCB assembly 188 includes a PCB mount 212 and a PCB subassembly 214.

The PCB mount 212 includes: a plate 216; a tower 218; and (one or more) at least one biasing member 220.

The plate 216 is positioned (located) between the registration member 146 and the charging base 150 and defines at least one dimension (e.g., a length and/or a width) that is larger than the corresponding dimension defined by the window 160, which renders the charging head 148 captive to the registration member 146, as indicated above. The plate 216 is positioned within the (extends into) the internal cavity 158 (FIG. 20) in the body 154 of the registration member 146 and engages (contacts) the charging base 150 such that plate 216 is movable in relation thereto, which facilitates movement of the PCB assembly 188 in relation to both the charging base 150 and the registration member 146 during repositioning of the charging head 148 between a normal position, in which the charging head 148 is generally centered within the window 160, and a deflected position. In order to facilitate such movement and, thus, repositioning of the charging head 148, it is envisioned that a lubricant may be provided between the plate 216 and the charging base 150.

The plate 216 is generally U-shaped in configuration and defines a receiving space 222. The receiving space 222 is configured to receive the PCB subassembly 214 such that the PCB subassembly 214 extends into and through the PCB mount 212.

Figure 20:
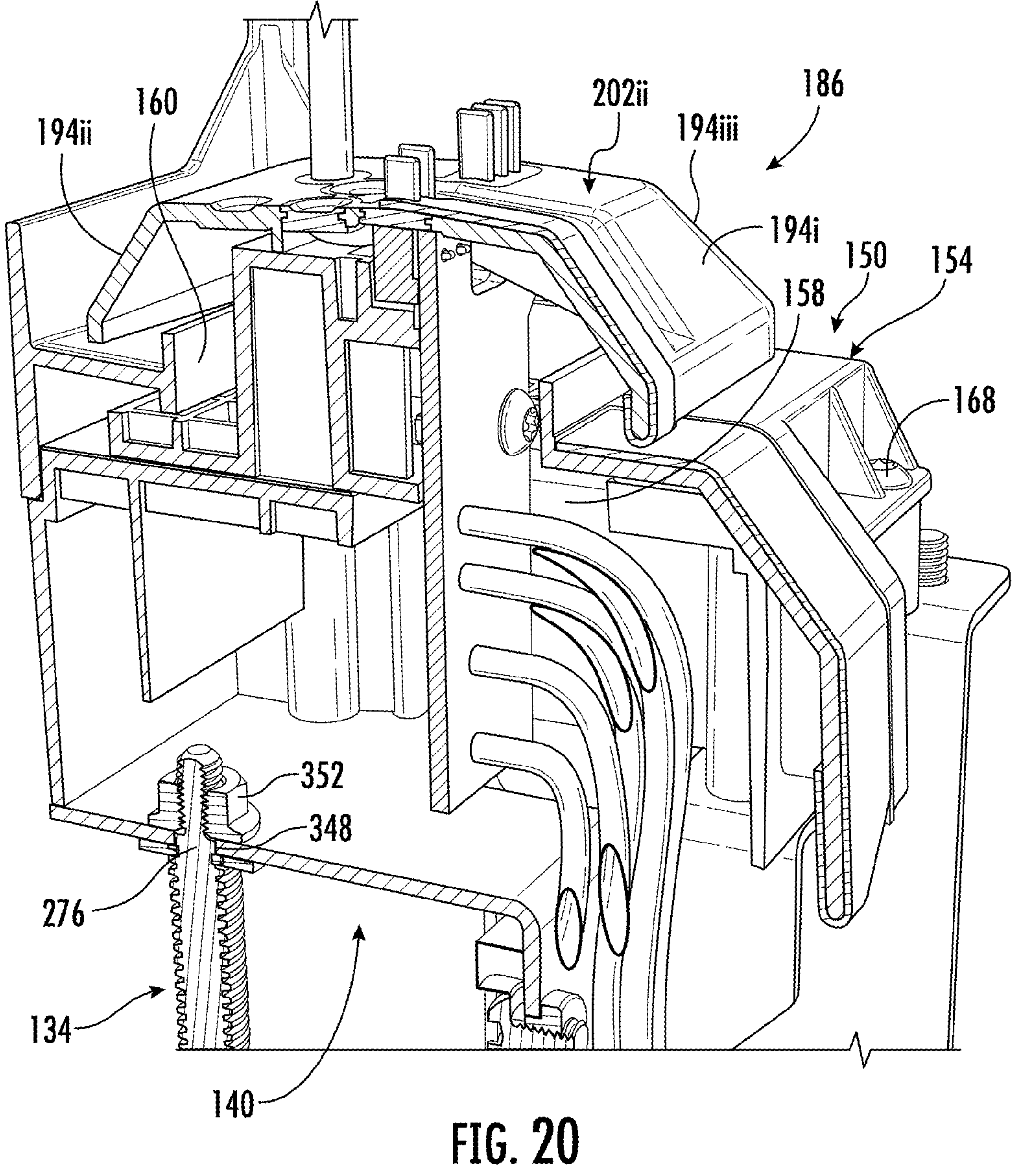
FIG. 20 is a partial, cross-sectional view of the charging hub taken along line 20-20 in FIG. 13.

The tower 218 is connected (secured) to the plate 216 and extends therefrom in a generally vertical orientation. More specifically, as seen in FIG. 20, the tower 218 extends through (e.g., is positioned (located) within) the window 160 defined by the body 154 of the registration member 146. The tower 218 defines opening 224, 226 and includes alignment members 228.

The openings 224 receive the fasteners 206 to thereby fixedly (e.g., non-movably) connect (secure) the PCB assembly 188 (e.g., the PCB mount 212) to the umbrella 186.

The opening(s) 226 receive (one or more) at least one fastener 230 that extends into the tower 218 to thereby fixedly (e.g., non-movably) connect (secure) the PCB subassembly 214 to the PCB mount 212.

The alignment members 228 are configured as pins 232 and extend from the tower 218 in a generally vertically orientation. The alignment member 228 are positioned (located) laterally inward of and between the horns 176 (e.g., such that the alignment members 156 are positioned (located) laterally outward of the alignment members 228 along the width W of the landing platform 108). The alignment member 228 extend through the openings 196 (FIG. 17) in the umbrella 186 and are configured for insertion into corresponding openings 18 (FIG. 24) in the UAV 10 (e.g., the power source 14) during a third (fine) stage of alignment as the charging hub 110 is repositioned from the retracted position into the extended position. During the third stage of alignment, as the charging hub 110 is extended and the alignment member 228 are inserted into the openings 18, the charging head 148 is deflected (e.g., from the normal position) within the window 160 to the extent necessary to further facilitate and increase alignment between the power source 14 and the charging hub 110 in order to establish an electrical connection between the UAV 10 and the base station 100, which is described in further detail below.

In the illustrated embodiment, the tower 218 includes a pair of alignment members 228 and the UAV 10 includes a pair of openings 18. It envisioned, however, that the particular number of alignment members 228 and openings 18 may be increased or decreased in alternate embodiments.

The biasing member(s) 220 interface with corresponding biasing member(s) 234 (FIG. 23) on the charging base 150 such that the biasing members 220, 234 collectively apply an internal biasing force to the charging head 148 that biases the charging head 148 towards the normal position.

In the illustrated embodiment, the biasing members 220, 234 include magnetic members 236 that are embedded within (or otherwise supported by or connected (secured) to) the PCB assembly 188 (e.g., the plate 216 and/or the tower 218) and the charging base 150. The biasing members 220, 234 (magnetically) bias the charging head 148 towards the normal position such that, upon retraction of the charging hub 110 and disengagement from the UAV 10, the charging head 148 is automatically returned to the normal position. Embodiments in which the particular configurations of the biasing members 220, 234 may be varied are also envisioned herein. For example, embodiments in which the biasing members 220, 234 include springs (or the like) that are configured to mechanically bias the charging head 148 towards the normal position are also envisioned herein.

The PCB subassembly 214 extends through (e.g., is positioned (located) within) the window 160 defined by the body 154 of the registration member 146. The PCB subassembly 214 defines (one or more) at least one opening 238 and includes electrical contacts 240.

The opening(s) 238 receives the fastener(s) 230 such that the fastener(s) 230 extend into the openings 226 in the tower 218 to thereby fixedly (e.g., non-movably) connect (secure) the PCB subassembly 214 to the PCB mount 212, as indicated above.

The electrical contacts 240 extend though the umbrella 186 via the openings 198 (FIG. 17) and are generally aligned along the reference axis R1 (FIG. 19). The electrical contacts 240 are configured for engagement (contact) with corresponding electrical contacts 20 (FIG. 24) on the UAV 10, which are positioned (located) within openings 22, and are brought into general alignment therewith during the third (fine) stage of alignment in order to facilitate the communication of power and/or data to the UAV 10 or between the base station 100 (e.g., the landing platform 108) and the UAV 10 (e.g., via wires 242 or other such transmission members).

In the illustrated embodiment, the charging hub 110 includes: a (first) group 244*i* of electrical contacts 240*i*, which facilitate the delivery of power to the UAV 10; a (second) group 244*ii* of electrical contacts 240*ii*, which are spaced from the group 244*i* along the reference axis R1 and facilitate the transmission of data to the UAV 10 or between the UAV 10 and the base station 100 (e.g., the charging hub 110); and a (third) group 244*iii* of electrical contacts 240*iii*, which are spaced from the group 244*ii* along the reference axis R1 and ground the charging hub 110. It envisioned, however, that the particular number of electrical contacts 240 and/or the particular number of groups 244 of electrical contacts 240 included on the charging hub 110 may be increased or decreased in alternate embodiments (e.g., depending upon the electrical requirements of the UAV 10 and/or the base station 100).

The PCB subassembly 214 and the umbrella 186 are configured such that the troughs 202 extend in generally orthogonal (perpendicular) relation to the reference axis R1 (FIG. 19) and direct water away from the electrical contacts 240 in order to inhibit (if not entirely prevent) not only corrosion thereof, but the flow of energy therebetween. More specifically, the trough 202*i* is positioned (located) between the groups 244*i*, 244*ii* of electrical contacts 240*i*, 240*ii*, and the trough 202*ii* is positioned (located) between the groups 244*ii*, 244*iii* of electrical contacts 240*ii*, 240*iii*, wherein each of the troughs 202 includes a first end 246 that is positioned adjacent to the sealing member 204 (FIG. 17), which extends about the electrical contacts 240 and the openings 196, 198, 200 in order to inhibit (if not entirely prevent) the entry of water, dust, debris, etc., into the charging hub 110, and a second end 248.

The charging base 150 is the main structural support for the charging head 148 and includes: openings 250, which receive the fasteners 168 (FIGS. 20, 21) to thereby fixedly (e.g., non-movably) connect (secure) the registration member 146 to the charging base 150; the aforementioned biasing member(s) 234 (FIG. 23); a channel 252; and posts 254, which extend laterally outward from the charging base 150 and are configured for engagement (contact) with the locking mechanism 144, as described in further detail below.

The charging base 150 is in engagement (contact) with the plate 216, whereby the charging base 150 supports the charging head 148 (e.g., the PCB mount 212) and facilitates repositioning of the charging head 148 between the normal and deflected positions. More specifically, the engagement (contact) between the charging base 150 and the plate 216 allows for both slidable and torsional movement (e.g., rotation, twisting) of the charging head 148 such that the charging head 148 is movable within the window 160 in relation to the registration member 146 and the charging base 150 in multiple degrees of freedom. The repositionability of the charging head 148 further facilitates docking of the UAV 10 by further reducing the requisite precision during landing and further increasing the margin for error.

The biasing member(s) 234 (FIG. 23) interface and are generally aligned with the biasing member(s) 220 on the PCB mount 212 to thereby apply the aforementioned internal (magnetic) biasing force to the charging head 148, as indicated above. During the third stage of alignment, however, the biasing force is overcome as the charging head 148 is deflected within the window 160, which moves the biasing members 220, 234 out of the alignment, to the extent necessary to bring the electrical contacts 20 (FIG. 24), 240 (FIG. 17) into general alignment and facilitate engagement (contact) thereof. Upon retraction of the charging hub 110, as the alignment members 228 are withdrawn from the UAV 10 (e.g., the power source 14), the biasing force applied by the biasing members 220, 234 restores the normal position of the charging head 148, thereby resulting in repeatable and predictable positioning of the charging head 148.

The channel 252 is configured to receive the PCB assembly 188 (e.g., the PCB subassembly 214) and the wires 242 such that the PCB assembly 188 and the wires 242 extend into the charging base 150. The channel 252 includes a generally T-shaped cross-sectional configuration that defines a (first) channel portion 256*i*, which receives the PCB subassembly 214, and a (second) channel portion 256*ii*, which extends from the channel portion 256*i* in generally orthogonal (perpendicular) relation and receives the wires 242.

Figure 21:
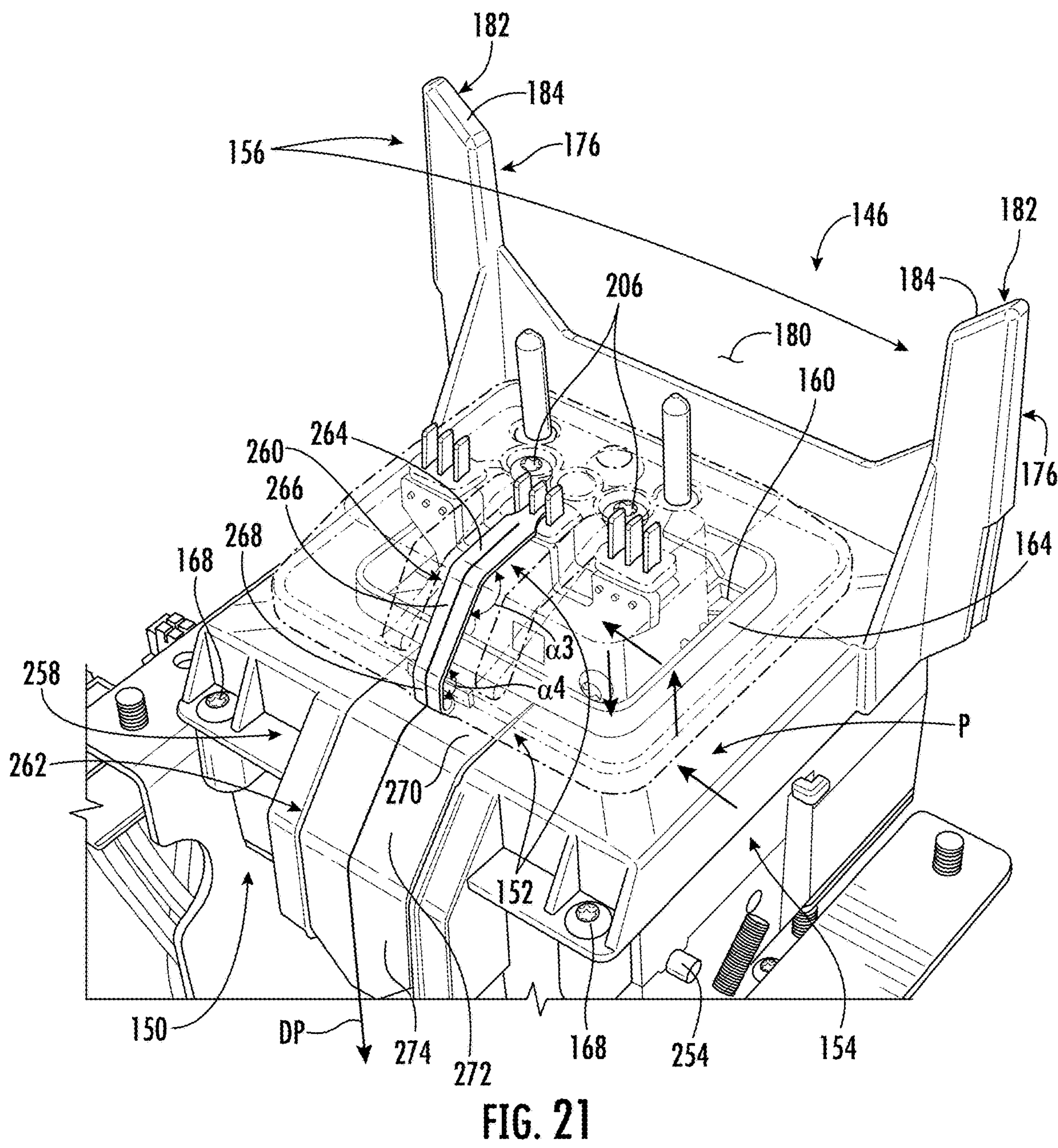
FIGS. 21-23 are partial, top, perspective views of the charging hub with various components thereof shown in phantom.
Figure 22:
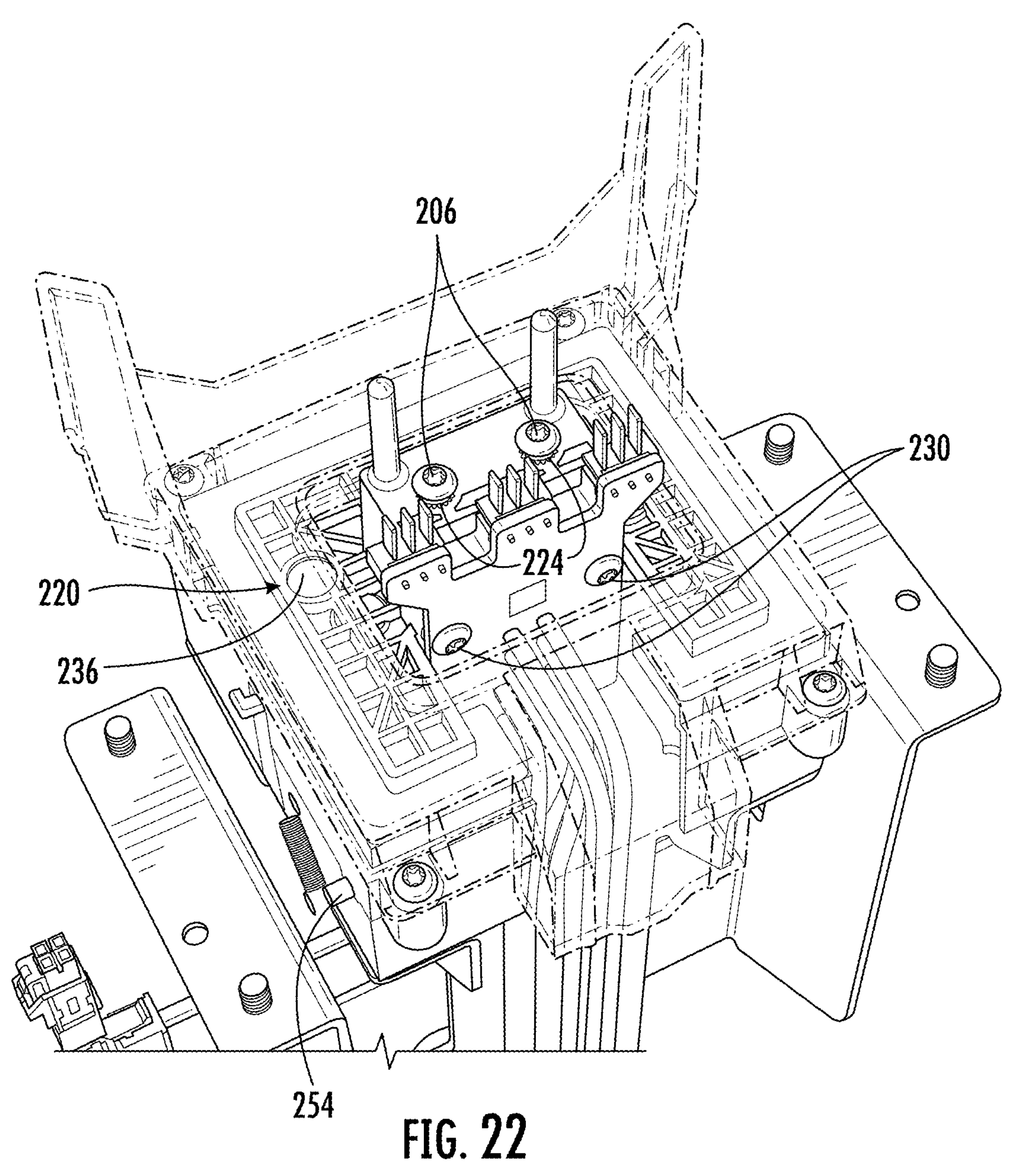
Figure 23:
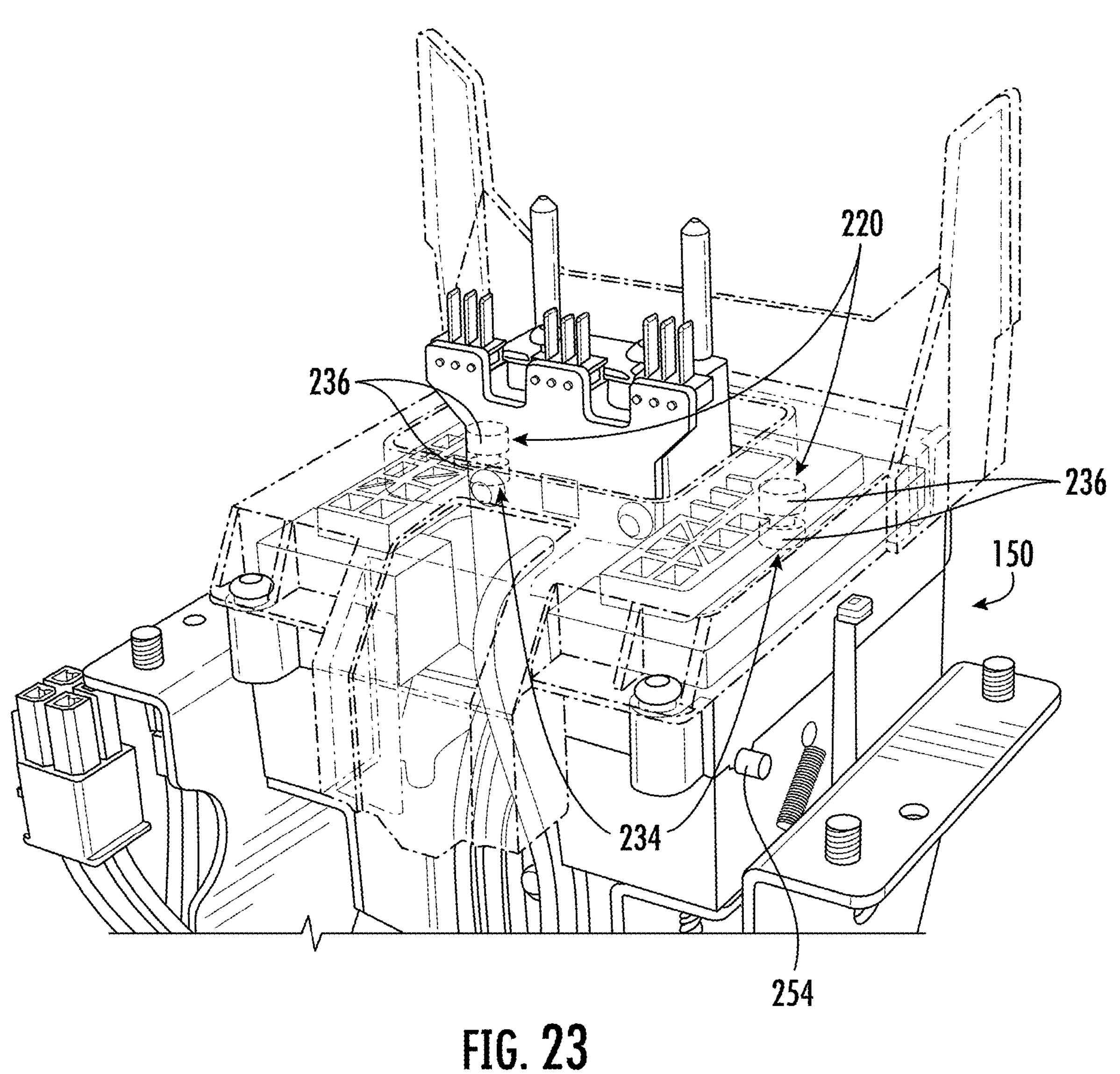
Figure 24:
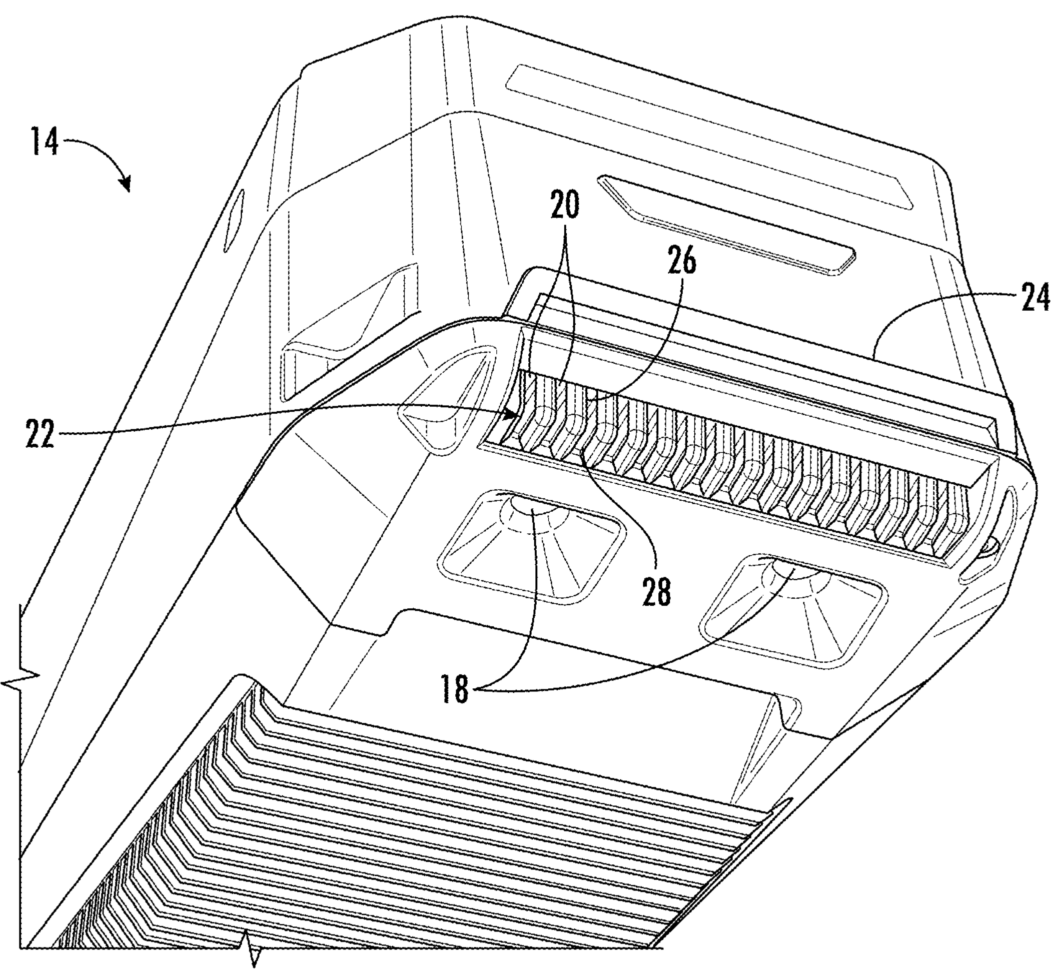
FIG. 24 is a partial, bottom, perspective view of a power source of the UAV.

With reference now to FIGS. 19 and 21, the wick 152 will be discussed. The wick 152 interrupts the surface tension of water that may otherwise extend between the electrical contacts 240 (e.g., between the groups 244*i*, 244*ii* (FIG. 19) and/or the groups 244*ii*, 244*iii*) and further facilitates the drainage of water away from the electrical contacts 240 along a drip path DP in order to further inhibit (if not entirely prevent) not only corrosion of the electrical contacts 240, but the flow of energy therebetween. The drip path DP extends in generally orthogonal (perpendicular) relation to the reference axis R1 along an outer surface 258 of the charging hub 110 that is defined by the umbrella 186 and the registration member 146, which facilitates the drainage of water outwardly and downwardly under the influence of gravity via the aforementioned syphoning effect.

The wick 152 spans the outer surface 258, extending across the umbrella 186 (e.g., the surfaces 192, 194*i*) and the registration member 146 (e.g., the flange 166) and mirroring (approximating) the configurations thereof. The wick 152 is formed from a hydrophilic, non-woven material that draws water away from the electrical contacts 240 and includes a (first, upper) wicking portion 260, which is connected (secured) to the surfaces 192, 194*i* of the umbrella 186 and is positioned (located) between the troughs 202*i*, 200*ii*, and a (second, lower) wicking portion 262, which is connected (secured) to the flange 166 such that the wicking portion 260 extends across the registration member 146 and the charging base 150.

In the illustrated embodiment, the wick 152 is adhesively connected (secured) to the umbrella 186 and the flange 166. It is envisioned, however, that the wick 152 may be connected (secured) to the umbrella 186 and the registration member 146 in any suitable manner.

The wicking portion 260 includes (first and second) sections 264, 266, which mirror (approximate) the configurations of the sections 208, 210 of the troughs 202, respectively, and a (third) section 268. The section 264 extends in a generally horizontal orientation, which allows the section 264 to collect water, the section 266 intersects and extends transversely from the section 264 in a non-horizontal orientation (e.g., at the aforementioned (first) obtuse angle $\alpha$3) such that water flows from the section 264 into the section 266, and the section 268 intersects and extends transversely from the section 266 at a (second) obtuse $\alpha$4 that lies substantially within the range of approximately 120 degrees to approximately 150 degrees such that water flows from the section 266 into the section 268. The section 268 extends in a generally vertical orientation (e.g., such that the section 268 extends in generally orthogonal (perpendicular) relation to the section 264), which facilitates the syphoning of water outwardly and downwardly through the wicking portion 260 under the influence of gravity, as discussed above.

The wicking portion 262 is positioned (located) vertically below the wicking portion 260 and includes: a (first) section 270; a (second) section 272; and a (third) section 274, wherein the sections 272, 274 mirror (approximate) the configuration of the segments 170, 174 of the flange 166, respectively. The section 270 extends in a generally horizontal orientation along the upper surface 172 of the body 154 of the registration member 146 and is positioned adjacent to the section 268 of the wicking portion 260 such that water syphoned from the wicking portion 260 collects in the section 270, the section 272 extends from the section 270 in transverse relation thereto such that water flows from the section 270 into the section 272, and the section 274 intersects and extends transversely from the section 272 such that water flows from the section 271 into the section 274. The section 274 extends in a generally vertical orientation (e.g., such that the section 274 extends in generally orthogonal (perpendicular) relation to the section 270), which facilitates the syphoning of water outwardly and downwardly through the wicking portion 262 and away from the wicking portion 260 under the influence of gravity, as discussed above. The water syphoned away from the charging hub 110 is ultimately collected in the base 102 (FIGS. 1-5) (e.g., the body 106) and drained from the base station 100 via drain holes.

The motor assembly 132 (FIGS. 14-18) is connected (secured) to the mounting bracket 138 and drives the charging hub 110 during repositioning between the retracted and extended positions.

The drive member 134 (FIGS. 14-18) extends into (through) and engages the motor assembly 132 such that actuation of the motor assembly 132 causes linear, vertical movement (translation) of the drive member 134. The drive member 134 includes a (first, upper) end 276 (FIGS. 15, 20), which is fixedly (e.g., non-movably) connected to the slide bracket 140 and includes a non-circular transverse (e.g., horizontal) cross-sectional configuration, and a (second, lower, free) end 278.

With reference now to FIGS. 12, 14-18, and 25, the mounting bracket 138 will be discussed. The mounting bracket 138 is a static component of the charging hub 110 and is fixedly (e.g., non-movably) connected to the landing platform 108 within the base station 100 (e.g., the body 106), as discussed in further detail below. The mounting bracket 138 includes: a body panel 280; a motor assembly mount 282, which supports the motor assembly 132; and side panels 284.

The body panel 280 includes: openings 286, which receive fasteners 288 (FIGS. 15, 16) that extend into the guide mechanism 142 to thereby connect the mounting bracket 138 and the guide mechanism 142, as described in further detail below; an aperture 290, which provides access to the slide bracket 140, as described in further detail below; a window 292; and (one or more) at least one mount 294.

The window 292 receives (accommodates) (one or more) at least one Hall sensor 296 (FIG. 16), which are supported by the mount(s) 294 such that the Hall sensor(s) 296 are connected to the mounting bracket 138. The Hall sensor(s) 296 are configured and utilized to determine the position of the charging hub 110 within the base station 100 (e.g., whether the charging hub 110 is in the retracted position, the extended position, or an intermediate position therebetween) and are electrically connected to the landing platform 108 (e.g., via wires 298 or other such transmission members) in order to facilitate processing of the positional information (data). The Hall sensor(s) 296 thus facilitate control over and actuation of the motor assembly 132.

The motor assembly mount 282 extends rearwardly from the body panel 280 in generally orthogonal (perpendicular) relation thereto and supports the motor assembly 132. The motor assembly mount 282 includes: a (central) aperture 300, which receives the motor assembly 132 and the drive member 134 such that the motor assembly 132 and the drive member 134 extend into (through) the mounting bracket 138 via the aperture 300; openings 302, which receive fasteners 304 (FIG. 16) that extend into the motor assembly 132 to thereby fixedly (e.g., non-movably) connect the motor assembly 132 to the mounting bracket 138 via the motor assembly mount 282; and grooves 306, which receive fasteners that connect the mounting bracket 138 to internal ducting (not shown) within the base station 100.

The side panels 284 extend forwardly from an (upper) end 308 of the body panel 280 in generally orthogonal (perpendicular) relation thereto such that the motor assembly mount 282 and the side panels 284 extend in generally opposite directions. The side panels 284 include: cutouts 310, which receive (accommodate) a wiring harness (not show) such that the wiring harness is connected to (or otherwise supported by) the mounting bracket 138; apertures 312 and (one or more) at least one arcuate opening 314, each of which interfaces with the locking mechanism 144, as described in further detail below; and flanges 316.

The flanges 316 extend laterally outward from the side panels 284 in generally orthogonal (perpendicular) relation thereto and in generally parallel relation to the motor assembly mount 282. The flanges 316 include (first) openings 318, which receive alignment members 320 (e.g., pins) (FIG. 12) on the landing platform 108, and (second) openings 322, which receive fasteners 324 that extend into the underside 128 of the landing platform 108 to thereby fixedly (e.g., non-movably) connect (secure) the mounting bracket 138 to the landing platform 108, as indicated above.

With reference now to FIGS. 12, 14-18, and 26, the slide bracket 140 will be discussed. In contrast to the mounting bracket 138, the slide bracket 140 is a dynamic (e.g., movable) component of the charging hub 110 and is fixedly (e.g., non-movably) connected to the charger subassembly 130, as discussed in further detail below. The slide bracket 140 includes: a body panel 326; a charger subassembly mount 328, which supports the charger subassembly 130 (e.g., the charging base 150); and side panels 330.

The body panel 326 includes: openings 332, which receive fasteners 334 (FIGS. 12, 26) that extend into the guide mechanism 142 to thereby fixedly (e.g., non-movably) connect the slide bracket 140 and the guide mechanism 142, as described in further detail below; a routing channel 336 for wires (or other such transmission members); and a mount 338.

The mount 338 is connected (secured) to (or otherwise supports) (one or more) at least one magnetic member 340 such that the magnetic member(s) 340 are connected to the slide bracket 140. The magnetic member(s) 340 interface with the Hall sensor(s) 296 (FIG. 16) to determine the position of the charging hub 110 within the base station 100, as discussed above. Access to the magnetic member(s) 340 is provided via the aperture 290 (FIG. 25) in the mounting bracket 138.

The charger subassembly mount 328 extends rearwardly from the body panel 326 in generally orthogonal (perpendicular) relation thereto and in generally parallel relation to the motor assembly mount 282. The charger subassembly mount 328 includes: (first) openings 342, which receive alignment members 344 (e.g., pins) (FIG. 12) on the charger subassembly 130 (e.g., the charging base 150); (second) openings 346; and an aperture 348.

The openings 346 receive fasteners 350 (FIG. 12) that extend into charger subassembly 130 (e.g., the charging base 150) to thereby fixedly (e.g., non-movably) connect the charger subassembly 130 to the charger subassembly mount 328 such that linear movement of the slide bracket 140 causes corresponding movement of the charger subassembly 130 during repositioning of the charging hub 110 between the retracted and extended positions.

The aperture 348 receives the end 276 (FIGS. 15, 20) of the drive member 134, which is fixedly (non-movably) connected to the slide bracket 140 such that linear movement of the drive member 134 causes corresponding movement of the slide bracket 140. For example, in the illustrated embodiment, the end 276 of the drive member 134 is connected to the slide bracket 140 via a nut 352 (FIGS. 16, 20). The aperture 348 includes a non-circular transverse (e.g., horizontal) cross-sectional configuration corresponding to that defined by the end 276 of the drive member 134 so as to inhibit (if not entirely prevent) relative rotation therebetween during the linear movement of the drive member 134 that occurs as the charging hub 110 is extended and retracted.

In the illustrated embodiment, the end 276 of the drive member 134 and the aperture 348 each include a generally D-shaped transverse (e.g., horizontal) cross-sectional configuration. It is envisioned, however, that the end 276 of the drive member 134 and the aperture 348 may be configured in any manner suitable for the intended purpose of inhibiting (if not entirely preventing) relative rotation between the drive member 134 and the slide bracket 140. For example, embodiments in which the end 276 of the drive member 134 and the aperture 348 may include corresponding polygonal transverse (e.g., horizontal) cross-sectional configurations are also envisioned herein.

The side panels 330 extend forwardly from an (upper) end 354 of the body panel 326 in generally orthogonal (perpendicular) relation thereto and in generally parallel relation to the side panels 284 on the mounting bracket 138 such that the charger subassembly mount 328 and the side panels 330 extend in generally opposite directions. The motor assembly mount 282 and the charger subassembly mount 328 thus each extend in a first (e.g., rearward) direction, and the side panels 284, 330 thus each extend in a second (e.g., forward) direction that is generally opposite to the first direction.

The side panels 330 include flanges 356, which extend laterally outward therefrom and support the charger subassembly 130 (e.g., the charging base 150). More specifically, the flanges 356 extend in generally orthogonal (perpendicular) relation to the side panels 330 and in generally parallel relation to the motor assembly mount 282, the charger subassembly mount 328, and the flanges 316 on the mounting bracket 138. The flanges 356 include openings 358, which receive fasteners 360 (FIG. 12) that extend into the charger subassembly 130 (e.g., the charging base 150) to thereby further fixedly (e.g., non-movably) connect the charger subassembly 130 to the slide bracket 140 via the flanges 356.

With reference now to FIGS. 12, 14, 15, 16, 18, 27, and 28, the guide mechanism 142 will be discussed. The guide mechanism 142 extends between and connects the mounting bracket 138 and the slide bracket 140 such that the slide bracket 140 is operatively (e.g., indirectly) connected to the mounting bracket 138 via the guide mechanism 142. The guide mechanism 142 facilitates movement of the slide bracket 140 in relation to the mounting bracket 138 along the axis of movement M2 in order to reposition the charging hub 110 between the retracted and extended positions. The guide mechanism 142 includes a carriage 362 and a rail 364, which is generally linear in configuration and engages the carriage 362 so as to facilitate relative linear, vertical movement therebetween during extension and retraction of the charging hub 110.

Figure 11:
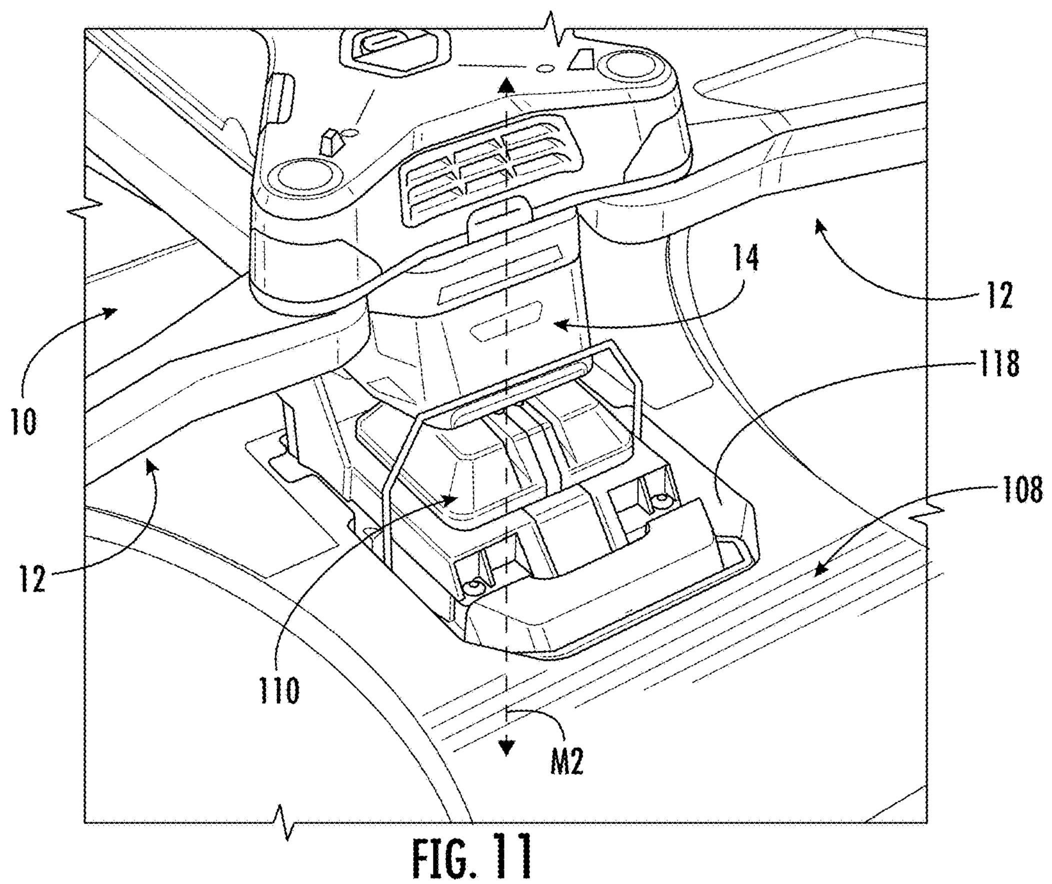
FIG. 11 is a partial, top, perspective view of the landing platform, the UAV, and the charging hub, which is shown in an extended position.

The carriage 362 is a static component of the charging hub 110 and is (mechanically) connected (secured) to the mounting bracket 138. The carriage 362 includes a chassis 366, which defines openings 368 that receive the fasteners 288 (FIGS. 15, 16) such that the fasteners 288 fixedly (e.g., non-movably) connect the carriage 362 (e.g., the chassis 366) to the body panel 280 (FIG. 25) of the mounting bracket 138, and flanges 370, which extend laterally outward from the chassis 366 in generally orthogonal (perpendicular) relation to the axis of movement M2 (FIG. 11).

In the illustrated embodiment, the carriage 362 is integrally (unitarily, monolithically) formed from a single piece of (metallic) material. Embodiments in which the carriage 362 may include a plurality of discrete components that are connected (secured) together are also envisioned herein, however.

The rail 364 is a dynamic (e.g., movable) component of the charging hub 110 and interfaces with the slide bracket 140 and the carriage 362. More specifically, the rail 364 is (mechanically) connected (secured) to slide bracket 140 such that the rail 364 moves concomitantly therewith during extension and retraction of the charging hub 110.

The rail 364 includes openings 372, which receive the fasteners 334 (FIGS. 12, 26) such that the fasteners 334 fixedly (e.g., non-movably) connect the rail 364 to the body panel 326 of the slide bracket 140, and channels 374, which receive the flanges 370 such that the flanges 370 extend into (are positioned within) the rail 364. Reception of the flanges 370 within the channels 374 facilitates linear, slidable movement of the rail 364 in relation to the carriage 362 during movement of the slide bracket 140. More specifically, during movement of the slide bracket 140, the rail 364 moves (slides) about the carriage 362, during which, the flanges 370 move through the channels 374. The guide mechanism 142 thus generally confines the charging hub 110 to linear motion during repositioning between the retracted and extended positions.

Figures 27, 28:
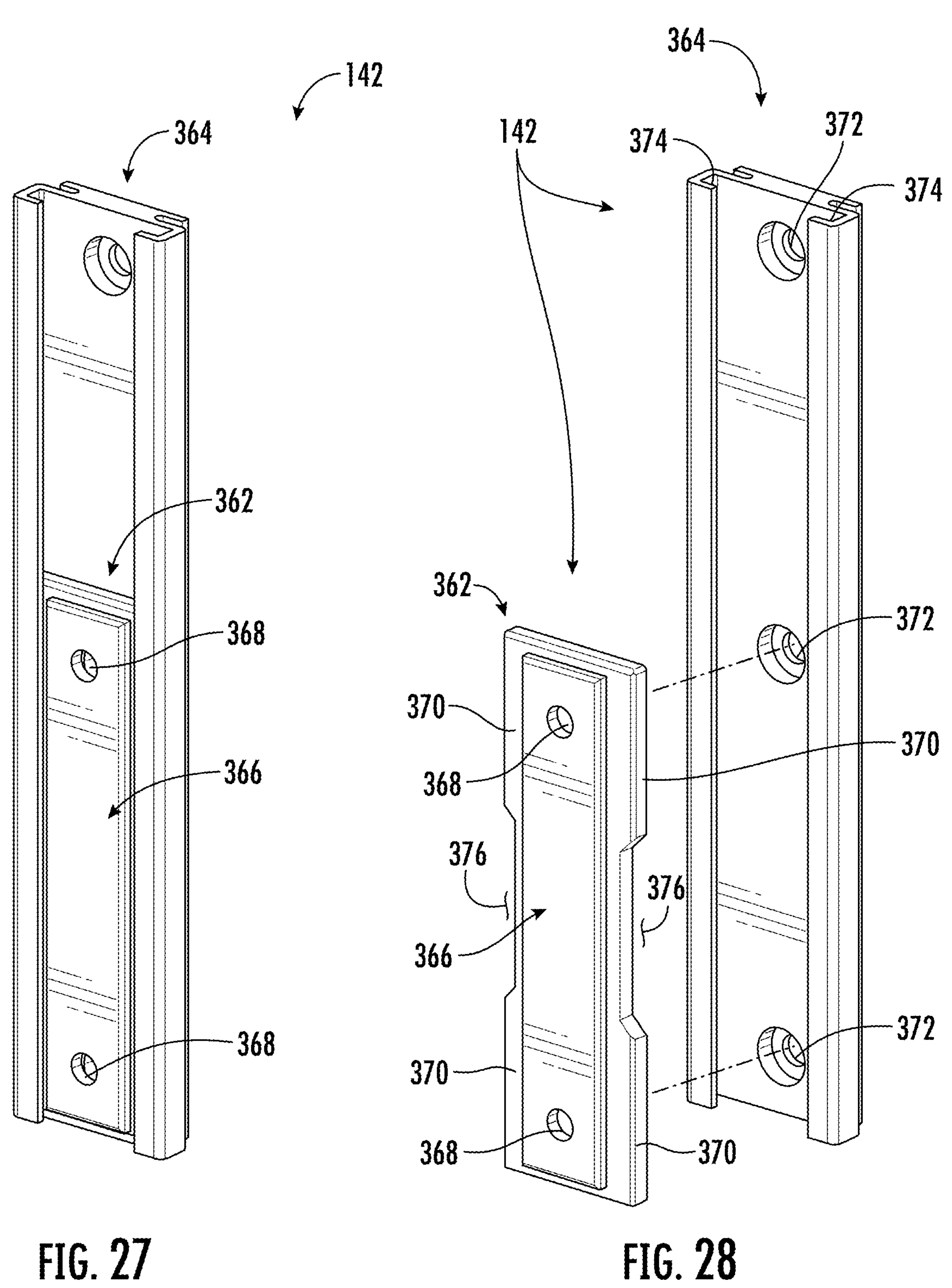
FIG. 27 is a top, perspective view of a guide mechanism of the charging hub.
FIG. 28 is a top, perspective view of the guide mechanism shown with parts separated.
Figure 29:
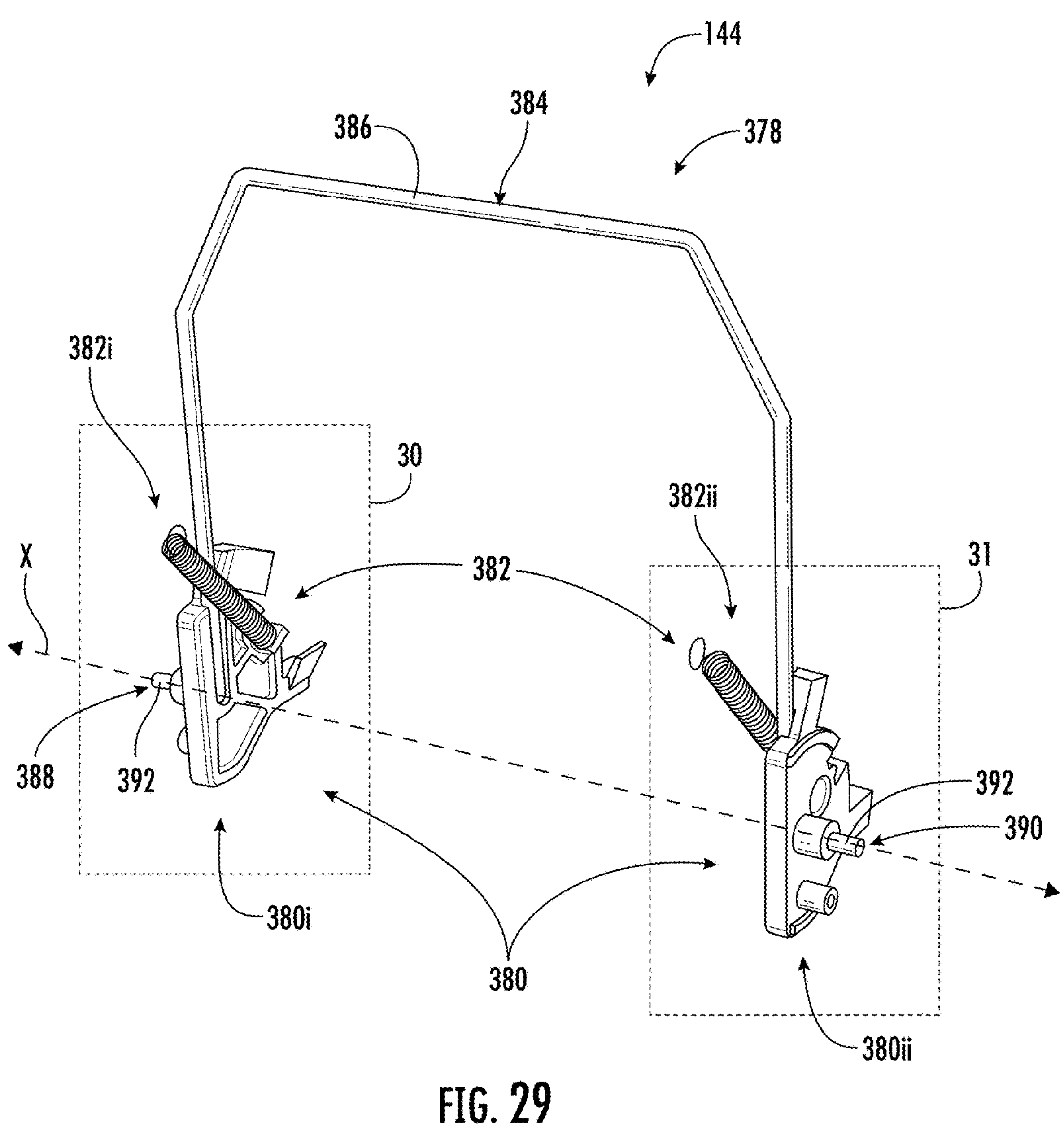
FIG. 29 is a top, perspective view of a locking mechanism of the charging hub.
Figures 30, 31:
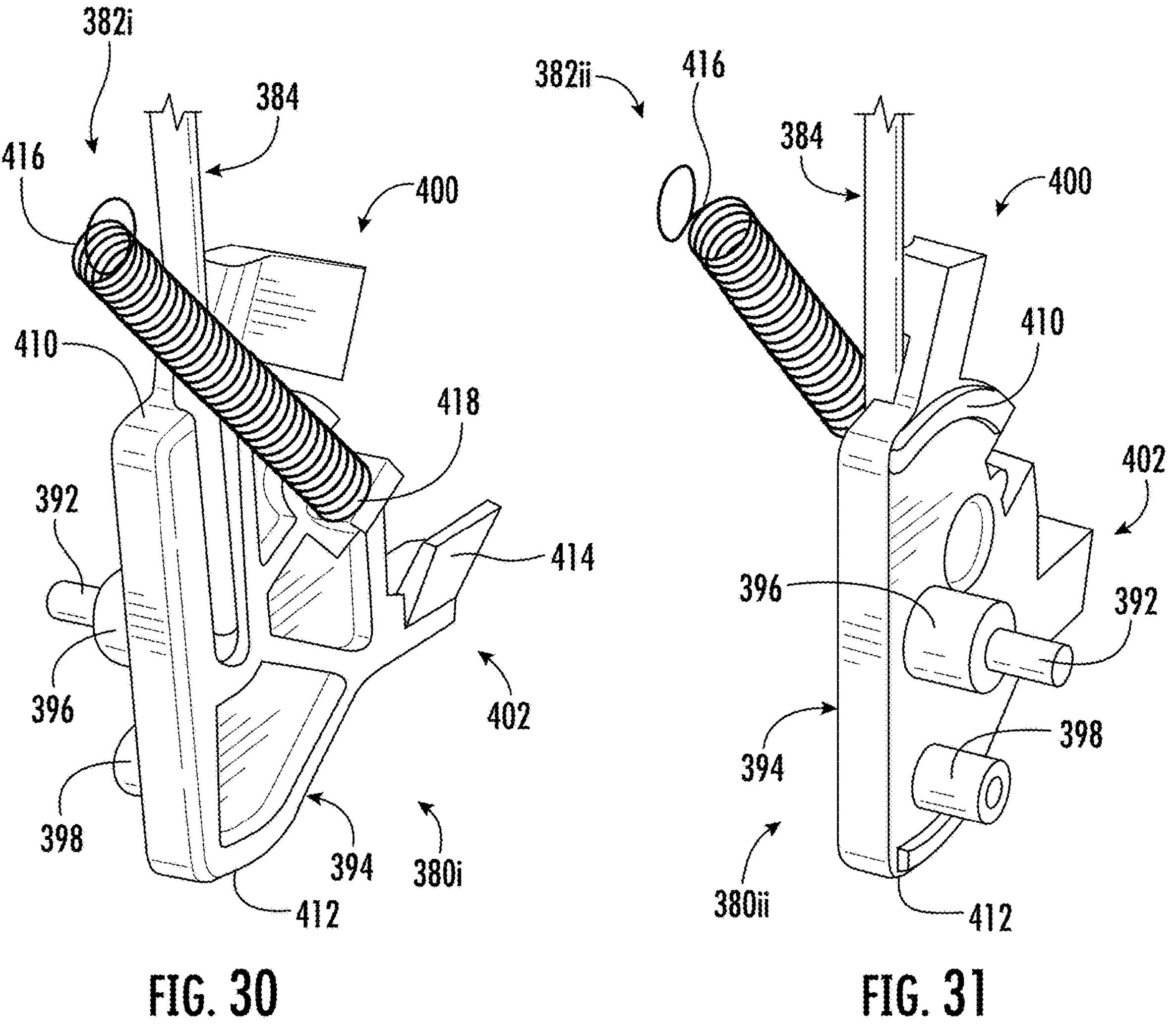
FIGS. 30 and 31 are enlargements of the areas of detail indicated in FIG. 29.

As seen in FIG. 28, the flanges 370 on the carriage 362 defines notches (cutouts) 376, which define two areas of contact between the carriage and the rail 364 that are separated vertically and which provide relief along the contact surface therebetween. Separating the areas of contact between the carriage 362 and the rail 364 creates a wider support base that stabilizes the guide mechanism 142 and inhibits (if not entirely prevents) rocking, rattle, etc.

In the illustrated embodiment, the rail 364 is integrally (unitarily, monolithically) formed from a single piece of (metallic) material. Embodiments in which the rail 364 may include a plurality of discrete components that are connected (secured) together are also envisioned herein, however.

In certain embodiments, it is envisioned that the guide mechanism 142 may be configured such that the carriage 362 is captive to (e.g., non-removable from) the rail 364. Alternatively, it is envisioned that the guide mechanism 142 may be configured such that the carriage 362 is separable from the rail 364 (e.g., in order to facilitate assembly, disassembly, repair, maintenance, etc., of the charging hub 110).

Figure 15:
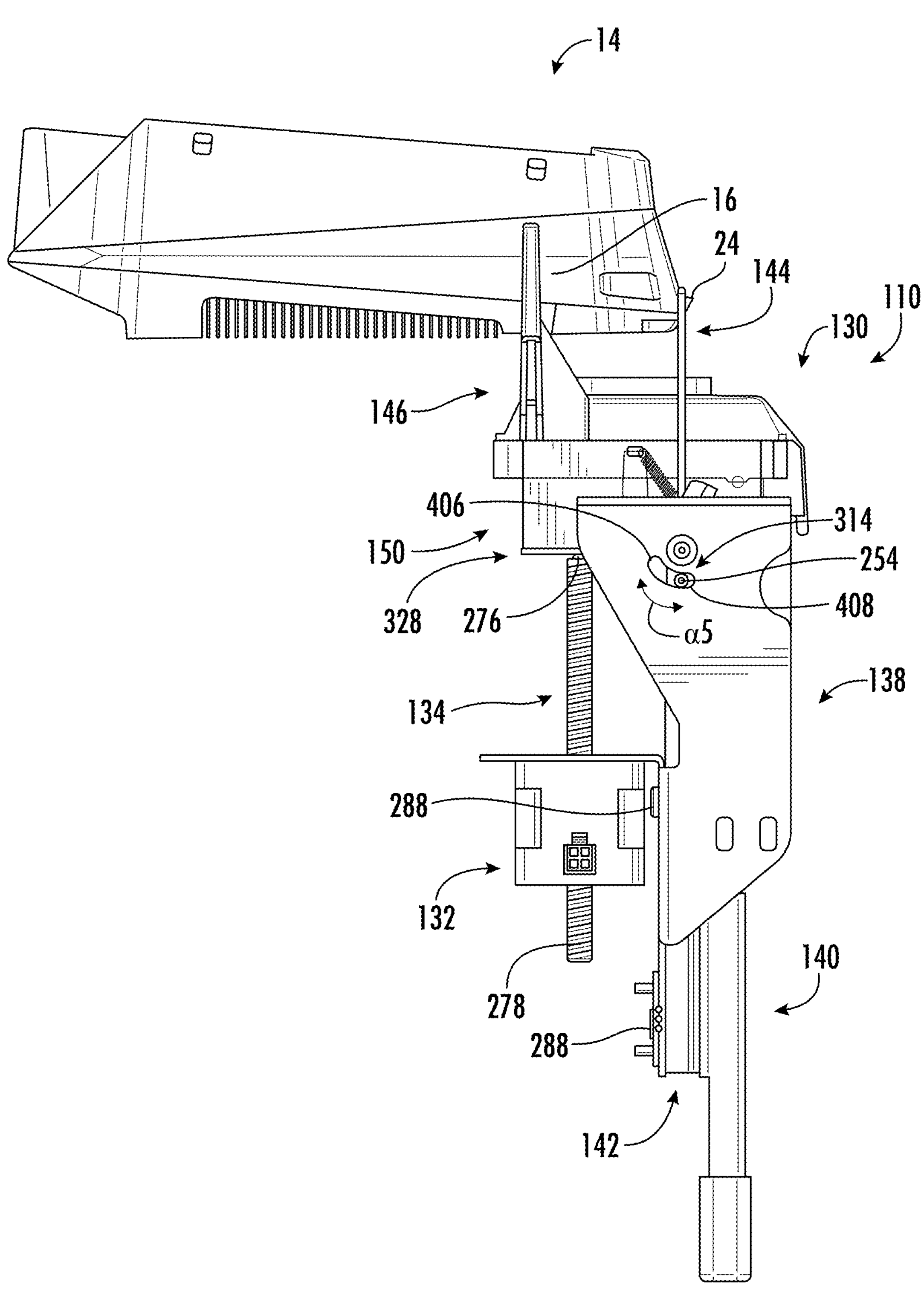
FIG. 15 is a partial, side, plan view of the UAV and the charging hub, which is shown in the extended position and connected to the UAV
Figure 16:
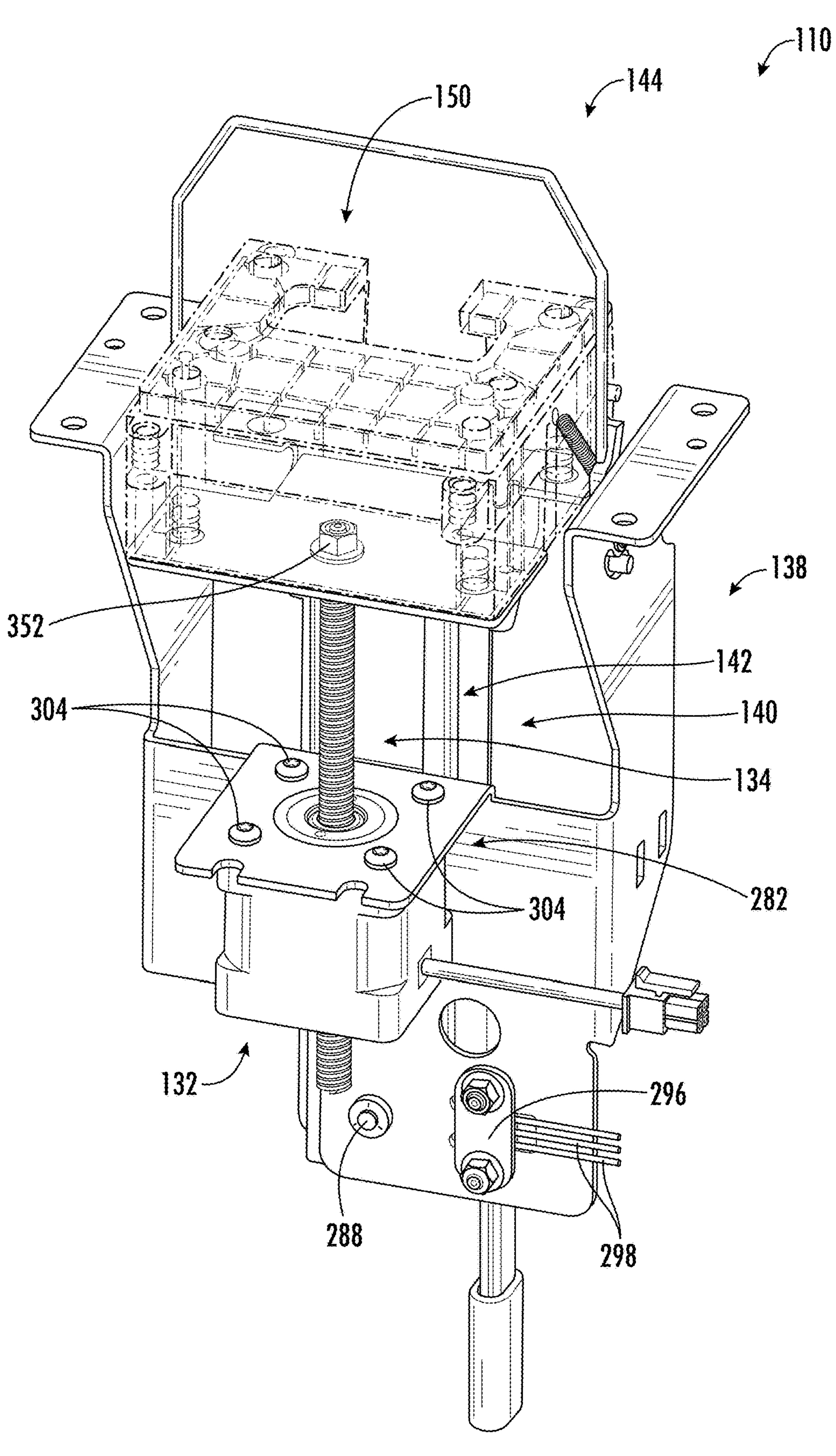
FIG. 16 is a partial, top, perspective view of the charging hub.

With reference now to FIGS. 13-18 and 29-33, the locking mechanism 144 will be discussed. The locking mechanism 144 is configured for engagement (contact) with the charger subassembly 130 and the UAV 10 and is (mechanically) movably connected (secured) to the mounting bracket 138 such that the locking mechanism 144 is pivotably repositionable (e.g., in relation to the charger subassembly 130) between a passive (disengaged, open, unlocked) position (FIGS. 17, 18) and an active (engaged, closed, locked) position (FIG. 15).

In the passive position, the locking mechanism 144 is disengaged (separated, spaced) from the UAV 10, and in the active position, the locking mechanism 144 engages (contacts) the UAV 10 (e.g., the power source 14). Engagement between the locking mechanism 144 and the UAV 10 (mechanically) connects (secures) the charging hub 110 to the UAV 10 in order to inhibit (if not entirely prevent) movement (displacement) of the UAV 10 during repositioning of the charging hub 110 from the retracted position into the extended position, thereby stabilizing the UAV 10 on the landing platform 108. More specifically, upon engagement (contact) with the UAV 10, the locking mechanism 144 counteracts the vertical (upward) force that is applied to the UAV 10 by the charging hub 110, which may exceed the downforce of the UAV 10. The locking mechanism 144 thus acts as a countermeasure to the force applied to the UAV 10 by the charging hub 110 during extension and secures the UAV 10 (i.e., in relation to the landing platform 108) in order to facilitate electrical connection of the UAV 10 to the charging hub 110.

In certain embodiments, it is envisioned that the legs 12 of the UAV 10 may include feet (or other such members) that are configured for engagement (contact) with the alignment members 114 (FIGS. 6-9) in order to further stabilize the UAV 10 by further inhibiting (if not entirely preventing) movement (displacement) thereof during connection to the charging hub 110 and/or during transport of the base station 100 (e.g., on a moving vehicle).

The locking mechanism 144 includes: a bail 378; bail supports 380; and (one or more) at least one biasing member 382.

The bail 378 includes a bail body 384, which engages (contacts) the UAV 10 in the active position. More specifically, in the active position, the bail body 384 engages (contacts) a shelf 24 (FIGS. 15, 17, 18, 24) on the UAV 10.

The bail body 384 is configured as a wireform 386 and includes opposite lateral ends 388, 390. The lateral ends 388, 390 define anchors 392, which extends laterally outward from the bail body 384 in generally orthogonal (perpendicular) relation thereto and into the bail supports 380 and the mounting bracket 138 via the apertures 312 (FIG. 25) in the side panels 284 in generally opposite directions. More specifically, the anchors 392 engage (contact) and are connected (secured) to the bail supports 380 such that the bail 378 is captive thereto (e.g., is non-removable therefrom). It is envisioned that the anchors 392 may engage the bail supports 380 in any manner suitable for the intended purpose of establishing a fixed (e.g., non-movable) connection therebetween (e.g., via the use of a locking ring, etc.).

The bail supports 380 engage (contact) the mounting bracket 138 and receive the bail body 384 such that the bail body 384 extends into the bail supports 380. The bail supports 380 include a (first) bail support 380*i* (FIGS. 29, 30), which receives and is connected (secured) to the lateral end 388 of the bail body 384 and includes a first configuration, and a (second) bail support 380*ii* (FIGS. 29, 31), which receives and is connected (secured) to the lateral end 390 of the bail body 384 and includes a second configuration mirroring the first configuration. The bail supports 380*i*, 380*ii* include: bail support bodies 394; bosses 396, which extend laterally outward from the bail support bodies 394; limiters 398; (first) upper feet 400; and (second) lower feet 402.

The bosses 396 receive the anchors 392 and extend into the apertures 312 (FIG. 25) in the side panels 284 of the mounting bracket 138. Collectively, the bosses 396 and the anchors 392 define a pivot axis X (FIGS. 17, 29) for the locking mechanism 144, about which the locking mechanism 144 pivots during repositioning between the passive and active positions. In order to reduce friction between the mounting bracket 138 and the locking mechanism 144, it is envisioned that bushings 404 (FIGS. 17, 18) may be provided in the apertures 312, which are configured to receive the bosses 396 (and the anchors 392).

Figure 25:
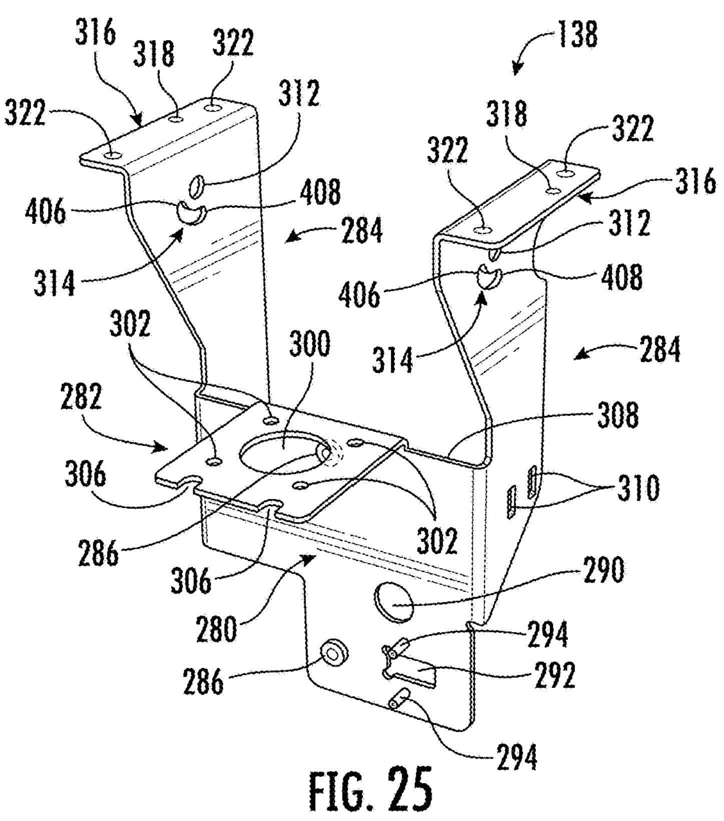
FIG. 25 is a top, perspective view of a mounting bracket of the charging hub.
Figure 26:
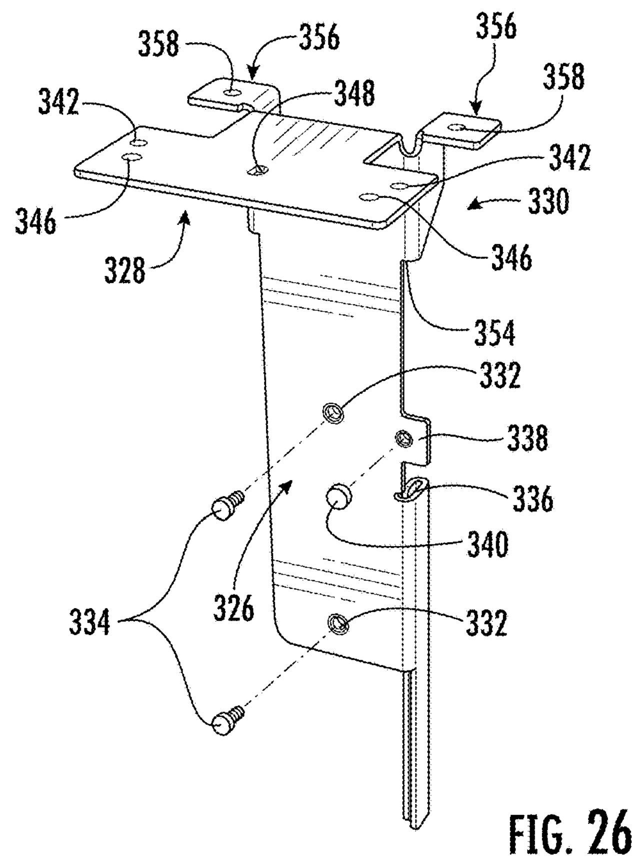
FIG. 26 is a top, perspective view of a slide bracket of the charging hub.

The limiters 398 extend laterally outward from the bail support bodies 394 and into the arcuate openings 314 (FIGS. 15, 18, 25) in the side panels 284 of the mounting bracket 138. As seen in FIGS. 15 and 25, the arcuate openings 314 include opposite ends 406, 408 that are configured for engagement (contact) with the limiters 398 in order to stop travel of the bail 378. More specifically, when the locking mechanism 144 is in the passive position, the limiters 398 engage (contact) the ends 406 of the arcuate openings 314, and when the locking mechanism 144 is in the active position, the limiters 398 engage (contact) the ends 408 of the arcuate openings 314. The arcuate openings 314 thus define a (predetermined, angular) range of motion $\alpha 5$ for the locking mechanism 144 during repositioning between the passive and active positions such that the limiters 398 confine the locking mechanism 144 to the range of motion $\alpha 5$.

In the illustrated embodiment, the charging hub 110 is configured such that the range of motion $\alpha 5$ lies substantially within the range of approximately 30 degrees to approximately 60 degrees. Embodiments in which the charging hub 110 may be configured such that the range of motion $\alpha 5$ lies outside the disclosed range are also envisioned herein, however (e.g., depending upon the particular configuration of the UAV 10).

In the illustrated embodiment, the locking mechanism 144 includes a pair of the limiters 398, one of which is included on each of the bail supports 380, and the mounting bracket 138 includes a pair of the arcuate openings 314, one of which is included on each of the side panels 284. Embodiments of the charging hub 110 that include a single arcuate opening 314 and a single limiter 398 are also envisioned herein, however.

The upper feet 400 are positioned (located) at upper ends 410 of the bail supports 380. The upper feet 400 are configured for engagement (contact) with the posts 254 (FIGS. 18, 19, 21-23) on the charging base 150 during extension of the charging hub 110 (e.g., movement of the charging hub 110 from the retracted position towards the extended position), which facilitates repositioning of the locking mechanism 144 from the passive position into the active position. More specifically, during extension of the charging hub 110, the upper feet 400 are brought into engagement (contact) with the posts 254, which causes the locking mechanism 144 to pivot towards the UAV 10 about the pivot axis X as extension of the charging hub 110 continues, thereby facilitating automatic repositioning of the locking mechanism 144 from the passive position towards the active position and engagement (contact) between the locking mechanism 144 (e.g., the bail 378) and the UAV 10 (e.g., the shelf 24).

The lower feet 402 are positioned (located) between the upper ends 410 of the bail supports 380 and lower ends 412 thereof. The lower feet 402 and are configured for engagement (contact) with the posts 254 on the charging base 150 during retraction of the charging hub 110 (e.g., during movement of the charging hub 110 from the extended position towards the retracted position), which facilitates repositioning of the locking mechanism 144 from the active position into the passive position. More specifically, during retraction of the charging hub 110, the lower feet 402 are brought into engagement (contact) with the posts 254, which causes the locking mechanism 144 to pivot away from the UAV 10 about the pivot axis X as retraction of the charging hub 110 continues, thereby facilitating automatic repositioning of the locking mechanism 144 from the active position towards the passive position and disengagement of the locking mechanism 144 (e.g., the bail 378) from the UAV 10 (e.g., the shelf 24).

In the illustrated embodiment, the feet 400, 402 further include bearing members 414. The bearing members 414 are angled (beveled, chamfered) in configuration and are configured for engagement (contact) with the posts 254 in order to correct any misalignment between the bail supports 380 (e.g., the feet 400, 402) and the posts 254 during extension and retraction of the charging hub 110. More specifically, in the event of such misalignment, the bearing members 414 engage (contact) the posts 254, which causes the upper feet 400 and/or the lower feet 402 to flex (bend), thereby repositioning the bail supports 380 into proper alignment with the posts 254.

The biasing member(s) 382 are connected to and extend between the bail supports 380 and the charger subassembly 130 (e.g., the charging base 150). More specifically, the biasing member(s) 382 include (first) ends 416, which are connected (secured) to the charging base 150, and (second) ends 418, which are connected (secured) to the bail supports 380.

In the illustrated embodiment, the locking mechanism 144 includes a (first) biasing member **382*i*, which is connected to and extends between the bail support 380*i* and the charger subassembly 130 (e.g., the charging base 150), and a (second) biasing member 382*ii*, which is connected to and extends between the bail support 380*ii* and the charger subassembly 130 (e.g., the charging base 150). It envisioned, however, that the particular number of biasing members 382 may be increased or decreased in alternate embodiments. For example, an embodiment of the locking mechanism 144 that includes a single biasing member 382** is also envisioned herein.

During extension and retraction of the charging hub 110, the biasing members 382 expand and contract, thereby applying a spring-loaded force to the locking mechanism 144 that further facilities automatic repositioning of the locking mechanism 144 between the passive and active positions. More specifically, the biasing members 382 are configured to facilitate repositioning of the locking mechanism 144 from the passive position towards the active position during extension of the charging hub 110 and repositioning of the locking mechanism 144 from the active position towards the passive position during retraction of the charging hub 110.

Figure 32:
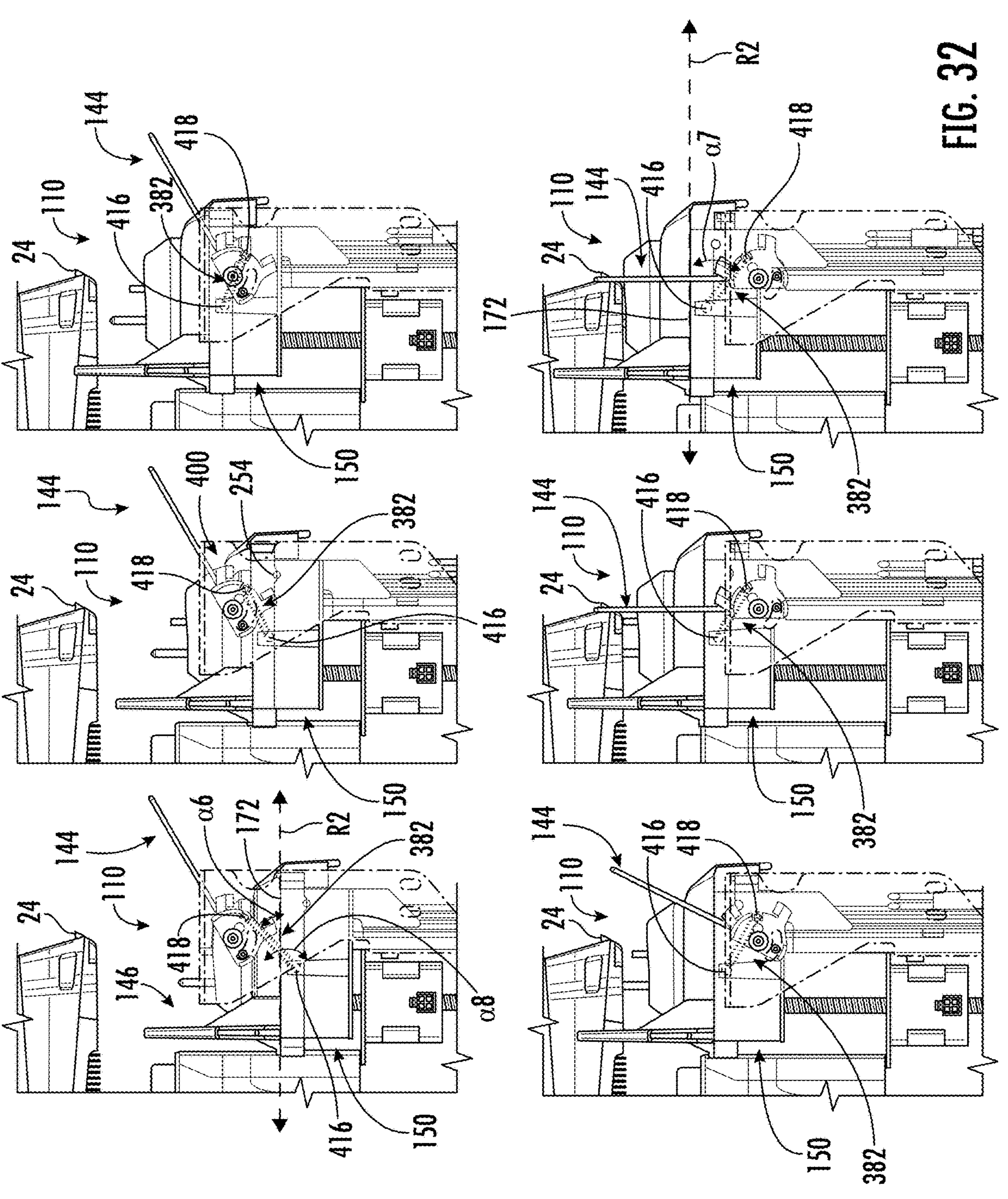
FIG. 32 is a partial, side, plan view of the UAV and the charging hub during extension.
Figure 33:
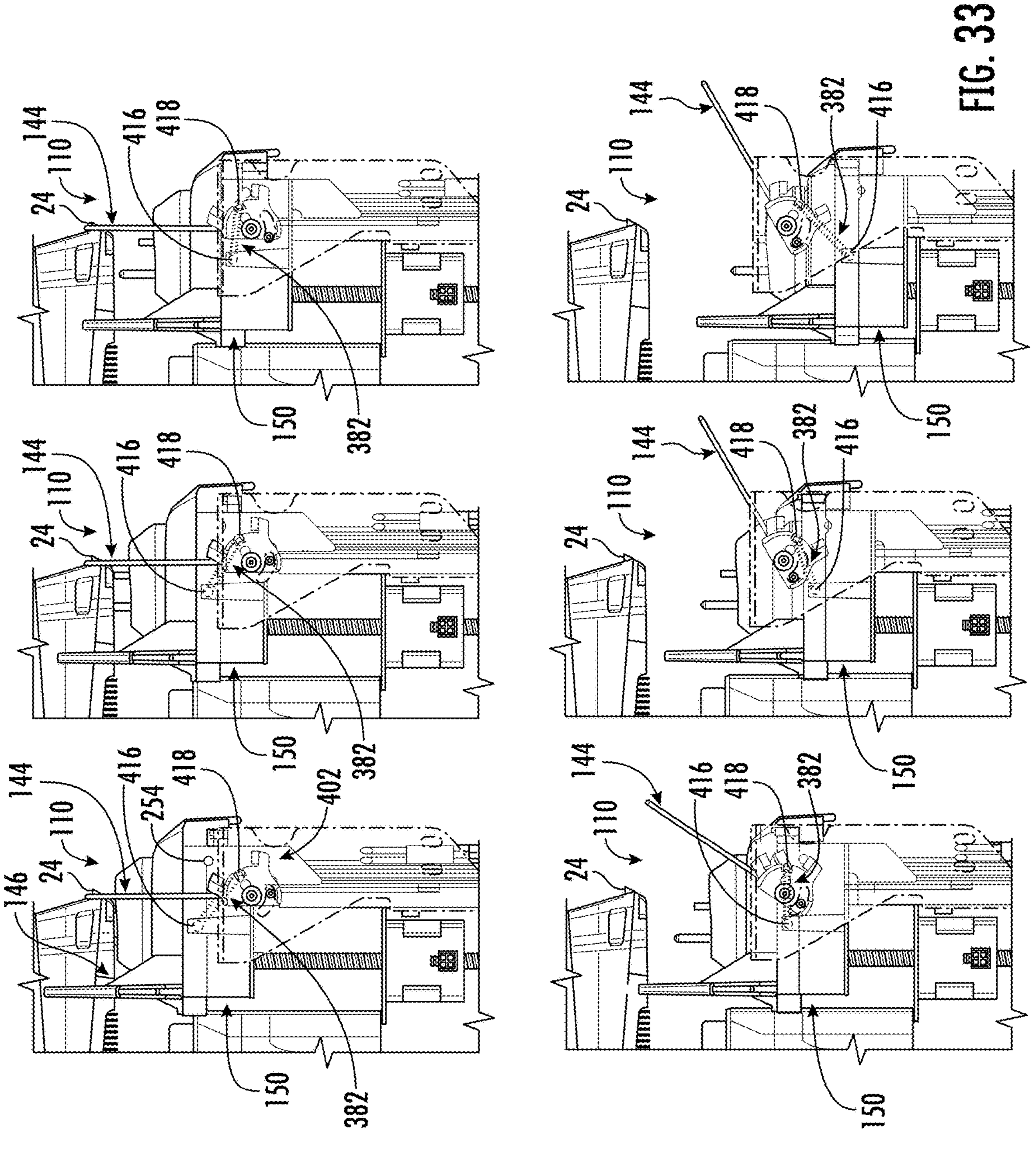
FIG. 33 is a partial, side, plan view of the UAV and the charging hub during retraction.
Figure 34:
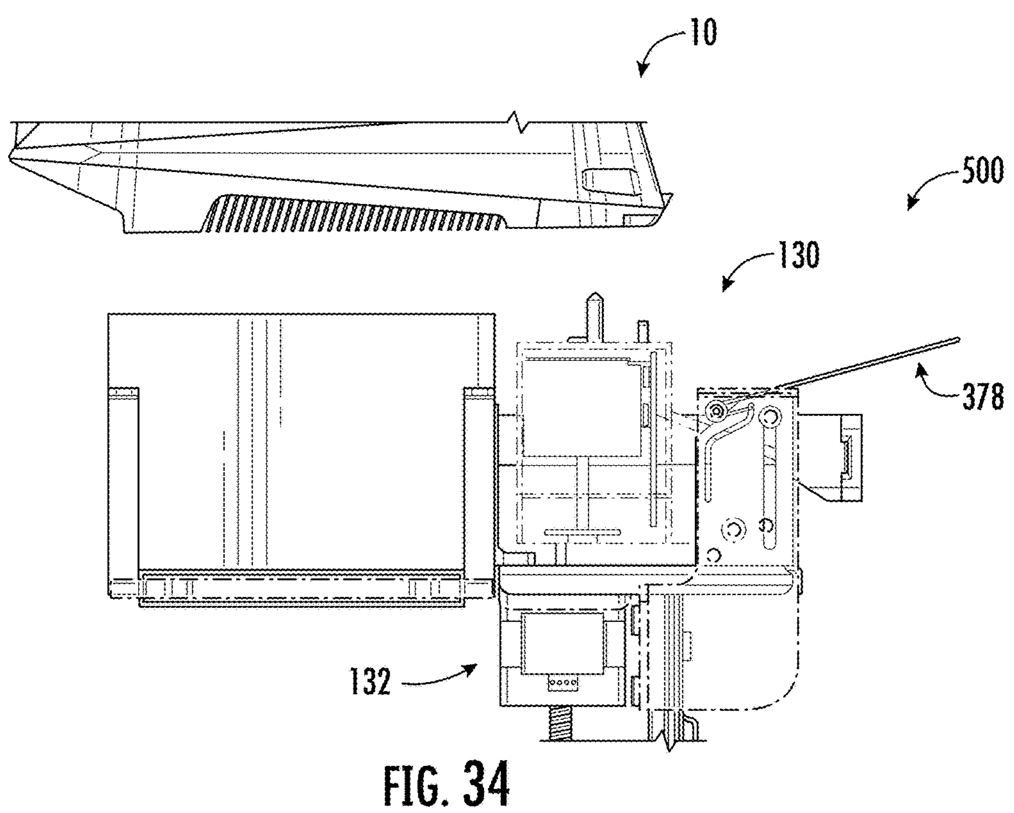
FIG. 34 is a partial, side, plan view of the UAV shown with an alternate embodiment of the charging hub, which is shown in the retracted position.
Figure 35:
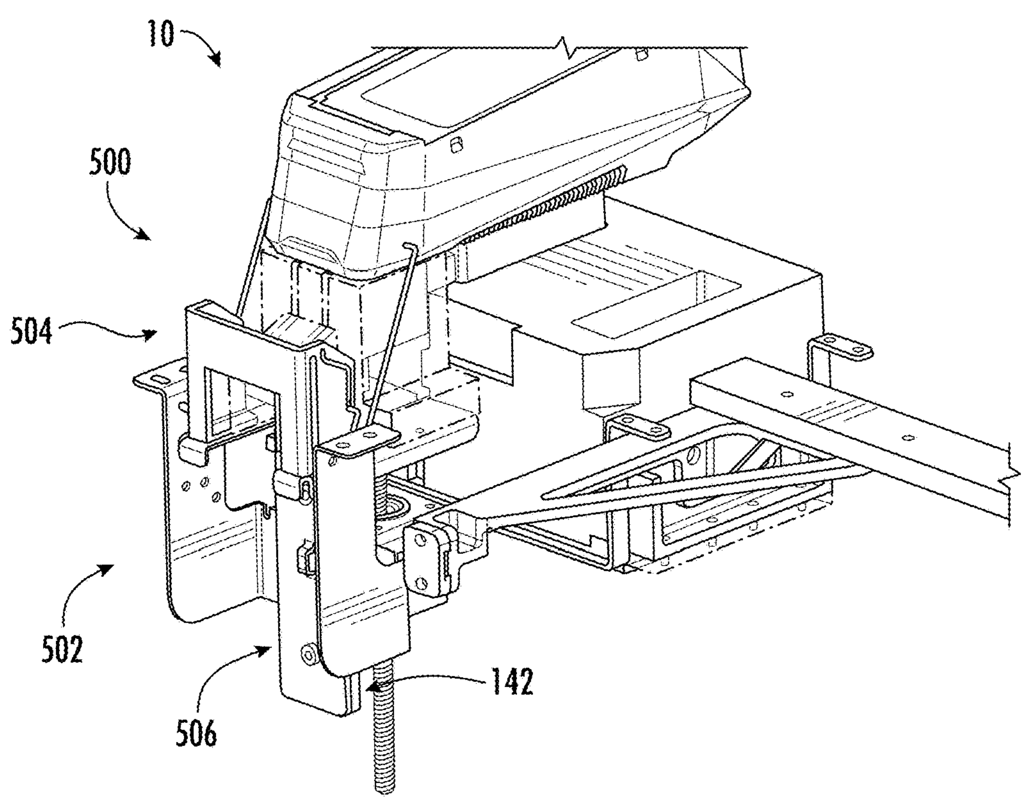
FIG. 35 is a partial, top, perspective view of the UAV and the charging hub seen in FIG. 34 with the charging hub shown in the extended position.
Figure 36:
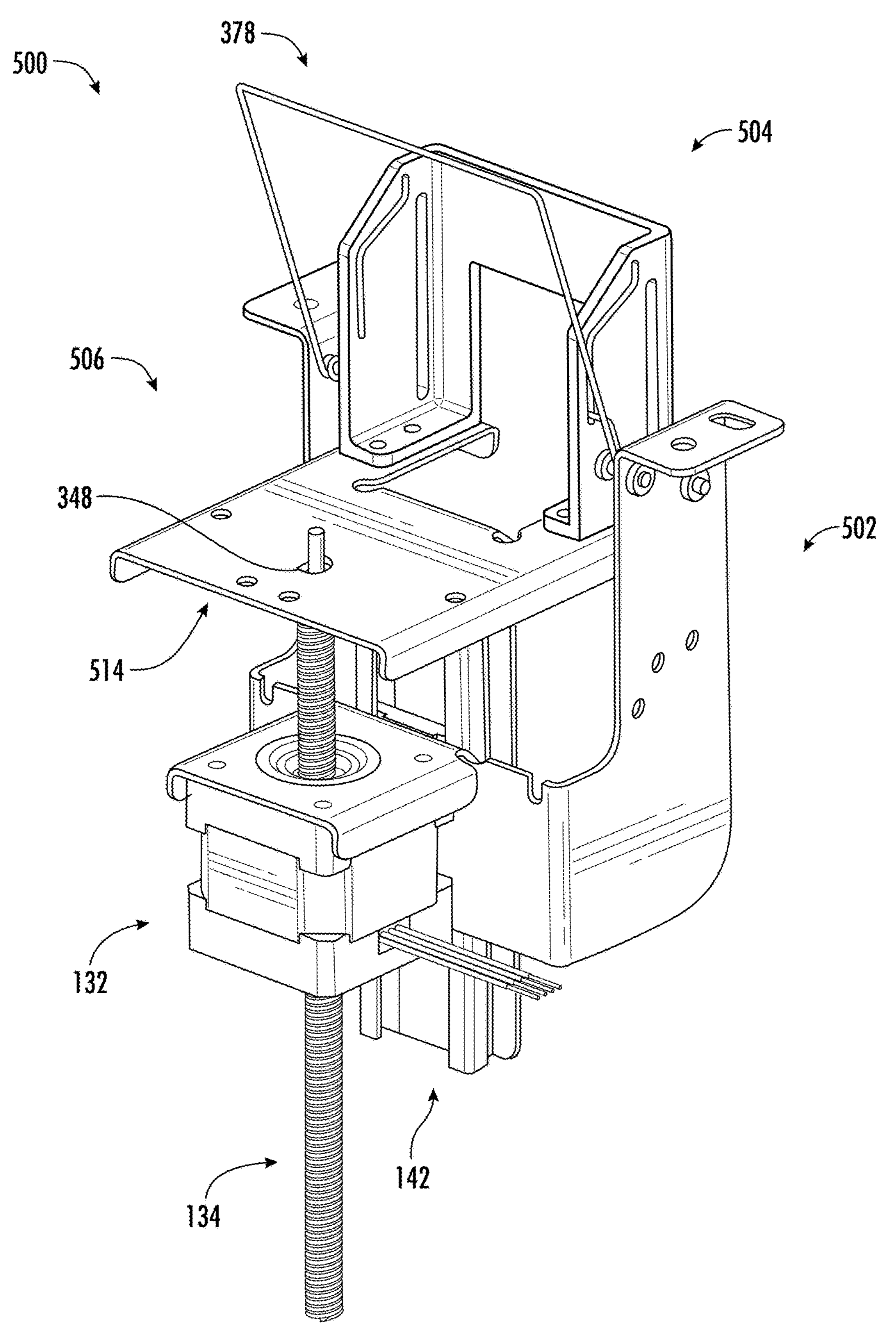
FIG. 36 is a partial, top, perspective view of the charging hub seen in FIG. 34.
Figure 37:
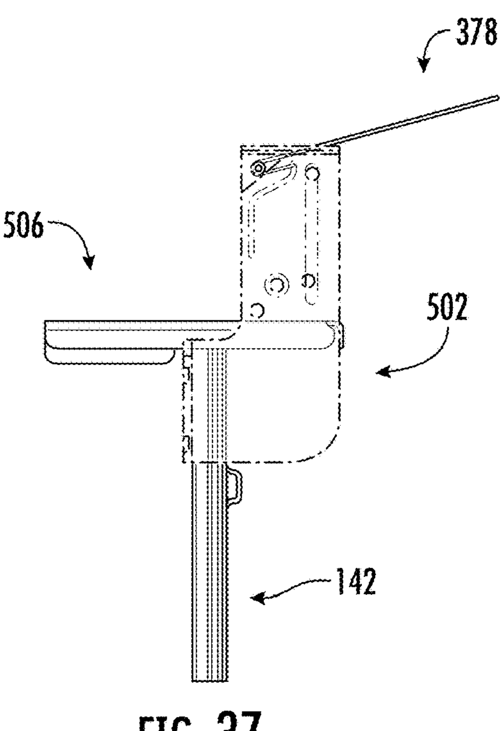
FIG. 37 is partial, side, plan view of the charging hub seen in FIG. 34.
Figure 38:
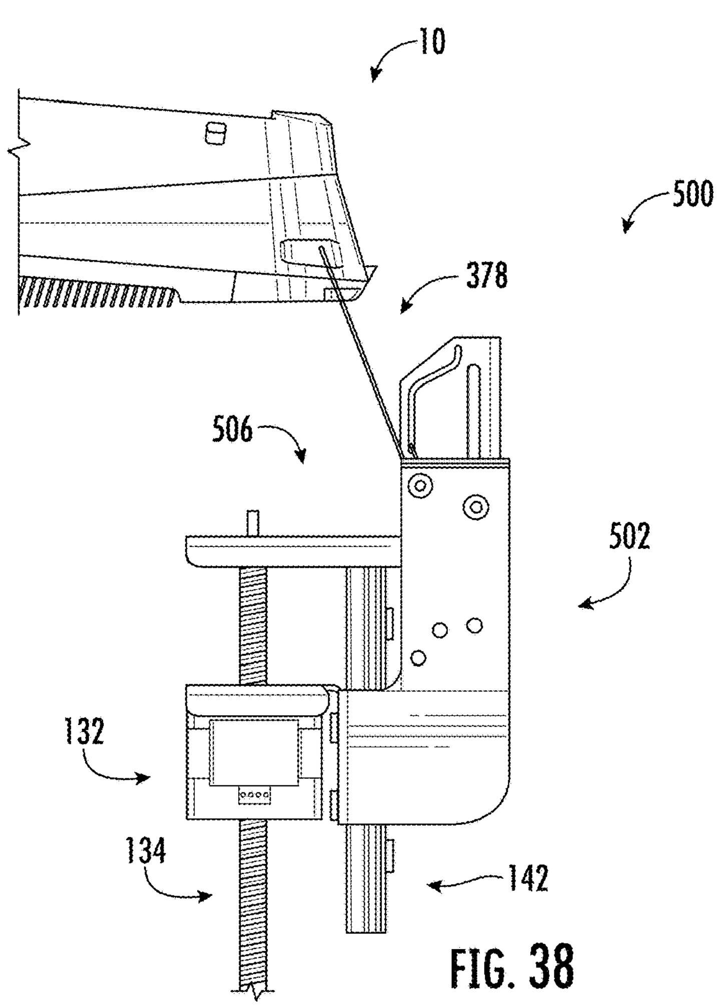
FIG. 38 is a partial, side, plan view of the UAV and the charging hub seen in FIG. 34 with the charging hub shown in the extended position.
Figure 39:
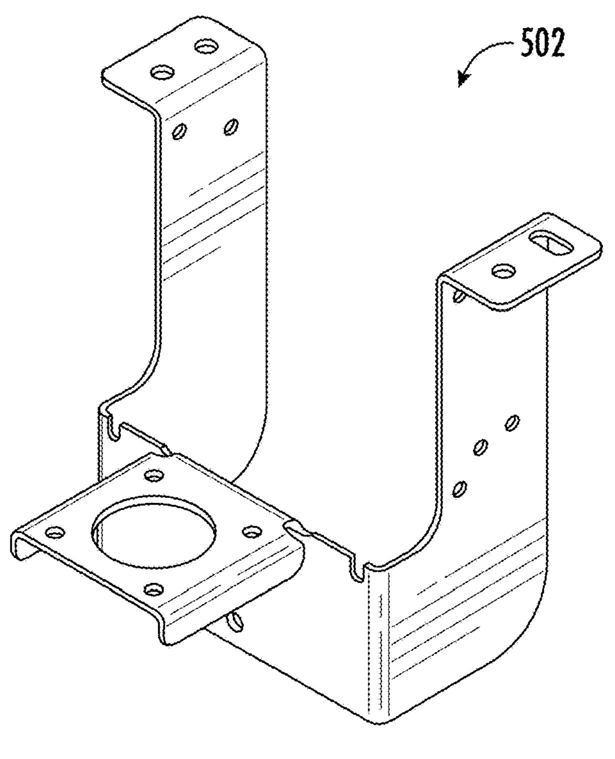
FIG. 39 is a top, perspective view of a mounting bracket of the charging hub seen in FIG. 34.

During extension and retraction of the charging hub 110 (e.g., during repositioning of the locking mechanism 144 between the passive and active positions), the biasing members 382 are repositioned in relation to the bail supports 380 and the charging base 150. The orientations of the biasing members 382 are thus continuously varied with movement of the charging hub 110, as seen in FIGS. 32 and 33 and described in further detail below.

When the charging hub 110 is in the retracted position, the biasing members 382 are oriented such that the ends 418 thereof are positioned (located) vertically above the ends 416, which applies a biasing force to the locking mechanism 144 that biases the locking mechanism 144 towards the passive position. More specifically, in the illustrated embodiment, the charging hub 110 is configured such that the biasing members 382 extend an angles $\alpha$6 in relation to a horizontal reference axis R2, which extends in generally parallel relation to the upper surface 172 of the body 154 of the registration member 146, that lies substantially within the range of approximately 30 degrees to approximately 60 degrees.

During extension of the charging hub 110, as the upper feet 400 engage (contact) the posts 254 on the charging base 150, the bail 378 pivots towards the UAV 10, thereby overcoming the biasing force and causing the bail 378 to engage the shelf 24, which automatically secures (locks) the charging hub 110 to the UAV 10.

Upon reaching the extended position, the biasing members 382 are oriented such that the ends 418 thereof are positioned (located) vertically below the ends 416, which applies a biasing force to the locking mechanism 144 that biases the locking mechanism 144 towards the active position. More specifically, in the illustrated embodiment, the charging hub 110 is configured such that the biasing members 382 extend at angles $\alpha$7 in relation to the reference axis R2 that lies substantially within the range of approximately 75 degrees to approximately 105 degrees. As such, in the illustrated embodiment, the biasing members(s) 382 are movable through an (angular) range of motion $\alpha$8 that lies substantially within the range of approximately 15 degrees to approximately 75 degrees. Embodiments in which the charging hub 110 may be configured such that the range of motion $\alpha$8 lies outside the disclosed range are also envisioned herein, however.

During retraction of the charging hub 110, as the lower feet 402 engage (contact) the posts 254 on the charging base 150, the bail 378 pivots away from the UAV 10, thereby overcoming the biasing force and causing the bail 378 to disengage the shelf 24, which automatically releases (unlocks) the charging hub 110 from the UAV 10.

With general reference now to FIGS. 4, 6-11, 15, and 18, various methods will be discussed including, for example, methods of docking the UAV 10 with the base station 100 and methods of inhibiting corrosion on the charging hub 110.

Prior to landing, the base station 100 is configured such that the landing platform 108 is in the first configuration (FIGS. 6, 7) (e.g., such that the alignment members 114 are in the extended position) and such that the charging hub 110 is in the retracted position (FIG. 10), and the roof 104 is moved into the open position (FIG. 4). Positioning of the charging hub 110 in the retracted position removes the charging hub 110 from the window 118 in the landing platform 108 in order to increase the landing envelope, which inhibits (if not entirely prevents) interference with both landing and takeoff by the charging hub 110, thereby reducing the requisite precision during landing.

Upon landing of the UAV 10, the UAV 10 is subjected to the multi-stage alignment procedure, which includes the first, second, and third stages of alignment. As discussed in further detail below, during the first and second stages of alignment, the UAV 10 is repositioned in relation to the base station 100 (e.g., the landing platform 108), and during the third stage of alignment, the charging hub 110 is repositioned in relation to the UAV 10.

During the first stage of alignment, the landing platform 108 is reconfigured into the second configuration (FIGS. 8, 9) as the alignment members 114 are repositioned into the retracted position. During retraction, the alignment members 114 engage (contact) and reposition the UAV 10 in order to generally center the UAV 10 on the landing platform 108 and generally align the UAV 10 with the charging hub 110.

During the second stage of alignment, the charging hub 110 is extended through the window 118 in the landing platform 108, which is positioned such that connection of the charging hub 110 to the UAV 10 further centers the UAV 10 on the landing platform 108. During extension of the charging hub 110, actuation of the motor assembly 132 (FIG. 18) causes linear movement of the drive member 134. Linear movement of the drive member 134 causes corresponding movement of the slide bracket 140, which is supported and facilitated by the guide mechanism 142 (e.g., via the slidable interface between the carriage 362 (FIGS. 27, 28) and the rail 364), and the charger subassembly 130 such that the registration member 146 (e.g., the horns 176) engages (contacts) the UAV 10 (e.g., the power source 14). Engagement (contact) between the registration member 146 and the UAV 10 repositions the UAV 10 on the landing platform 108 as the power source 14 is received by (inserted into) the cradle 180 (FIGS. 19, 21), thereby further increasing alignment of the UAV 10 with the charging hub 110 (e.g., alignment between the electrical contacts 20, 240).

During the third stage of alignment, as extension of the charging hub 110 continues, the alignment members 228 on the charging hub 110 are inserted into the UAV 10, and the locking mechanism 144 pivots from the passive position into the active position about the pivot axis X (FIGS. 17, 29) via engagement (contact) between the bail supports 380 (e.g., the upper feet 400) and the charging base 150 (e.g., the posts 254) and the biasing force applied by the biasing members 382. Insertion of the alignment members 228 into the charging hub 110 deflects the charging head 148, thereby overcoming the biasing force applied by the biasing members 220, 234 (FIG. 23), to the extent necessary to further align the electrical contacts 20 on the UAV 10 with the electrical contacts 240 on the charging hub 110 and facilitate electrical connection thereof, and repositioning of the locking mechanism 144 into the active position secures (locks) together the charging hub 110 and the UAV 10 via engagement of the bail 378 with the shelf 24.

In order to facilitate engagement (contact) between the electrical contacts 20, 240 and reduce the requisite precision, the openings 22 (FIG. 24) include a generally L-shaped configuration, which allows for engagement (connection) and disengagement (disconnection) of the electrical contacts 20, 240 in multiple degrees-of-freedom. More specifically, the openings 22 include (first) channel portions 26, which extend in a generally vertical orientation, and (second) channel portions 28, which extend in a generally horizontal orientation (e.g., such that the channel portions 26, 28 extend in generally orthogonal (perpendicular) relation).

Following charging, the roof 104 is moved into the closed position (FIGS. 1-3, 5) and the UAV 10 can be stored in the base station 100.

When use of the UAV 10 is necessary or desired, the procedure discussed above is reversed prior to takeoff by retracting the charging hub 110 and by reconfiguring the landing platform 108 into the first configuration via extension of the alignment members 114.

During retraction of the charging hub 110, the electrical contacts 20, 240 are disengaged, the alignment members 228 are removed (withdrawn) from the UAV 10, which allows the charging head 148 to return to the normal position under the influence of the biasing force applied by the biasing members 220, 234, and the locking mechanism 144 is repositioned from the active position into the passive position via engagement (contact) between the bail supports 380 (e.g., the lower feet 402) and the charging base 150 (e.g., the posts 254) and the biasing force applied by the biasing members 382, thereby separating the bail 378 from the shelf 24.

With reference now to FIGS. 34-41, a charging hub 500 will be discussed, which is an alternate embodiment of the charging hub 110. The charging hub 500 includes features similar to the aforedescribed charging hub 110 and, accordingly, will only be discussed with respect to certain differences therefrom in the interest of brevity. As such, identical reference characters will be utilized to refer to elements, structures, features, etc., common to the charging hubs 110, 500.

In addition to the charger subassembly 130, the motor assembly 132, the drive member 134, and the guide mechanism 142, the charging hub 500 includes: a mounting bracket 502; a retainer 504, which includes the bail 378; and a slide bracket 506.

The mounting bracket 502 is (mechanically) connected (secured) to the motor assembly 132 and the guide mechanism 142. Additionally, the mounting bracket 502 interfaces with (e.g., receives) the retainer 504 and is operatively (e.g., indirectly) connected (secured) thereto via the slide bracket 506, whereby axial movement (translation) of the motor assembly 132 causes corresponding, concomitant axial movement (translation) of the slide bracket 506 and, thus, the retainer 504 and the charger subassembly 130 via the guide mechanism 142 during extension and retraction of the charging hub 500.

The retainer 504 is (mechanically) connected (secured) to the slide bracket 506, as indicated above, and is configured for releasable engagement (contact) with the UAV 10 (e.g., the power source 14) via the bail 378.

In addition to the retainer 504, the slide bracket 506 is (mechanically) connected (secured) to the charger subassembly 130 and the guide mechanism 142. The slide bracket 506 and includes a (first) leg 512 (FIG. 40) and a (second) leg 514, which are oriented in generally orthogonal (perpendicular) relation. More specifically, the leg 512 extends in a generally vertical orientation, and the leg 514 extends in a generally horizontal orientation.

The leg 512 is (mechanically) connected (secured) to the guide mechanism 142 and is generally centered along (the length of) the leg 514. More specifically, in the illustrated embodiment, the leg 512 is formed integrally (unitarily, monolithically) with the leg 514 such that the slide bracket 506 is formed from a single piece of (metallic) material.

Figure 40:
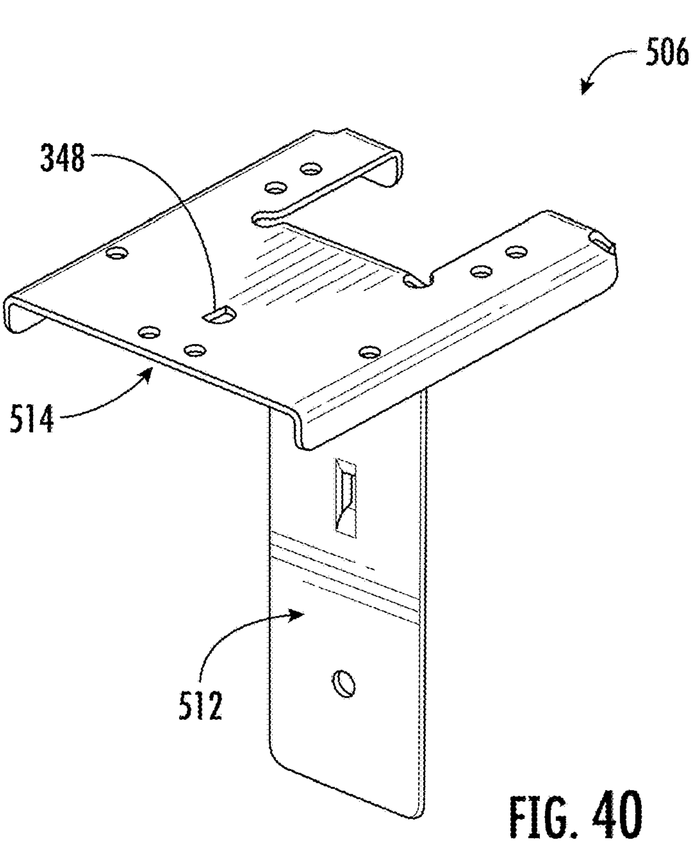
FIG. 40 is a top, perspective view of a slide bracket of the charging hub seen in FIG. 34.
Figure 41:
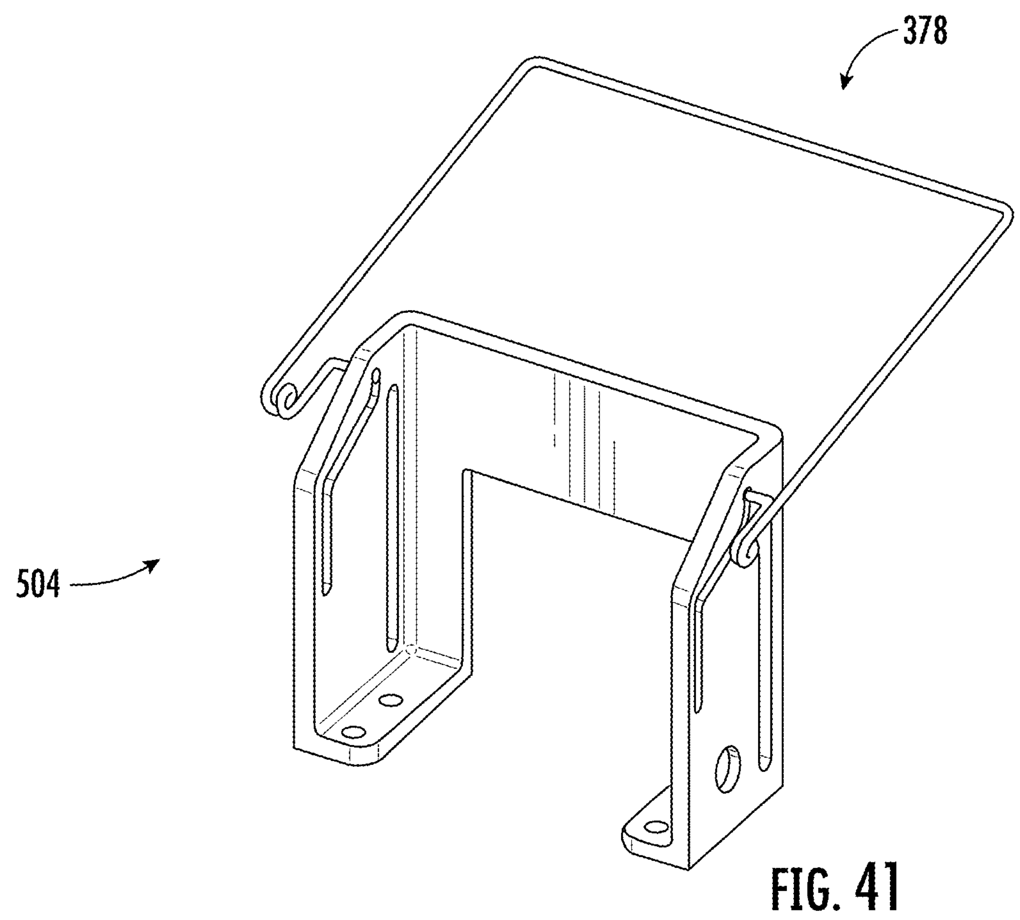
FIG. 41 is a top, perspective view of a retainer of the charging hub seen in FIG. 34.

The leg 514 is (mechanically) connected (secured) to the retainer 504 and the charger subassembly 130. As seen in FIG. 40, the leg 514 includes the aperture 348 such that the drive member 134 extends into (e.g., through) the slide bracket 506.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of" Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately) 225°) and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A charging hub for a base station configured to receive an unmanned aerial vehicle (UAV) during docking, wherein the charging hub comprises:

a charging base;

a registration member connected to the charging base and configured for engagement with the UAV; and a charging head configured for electrical connection to the UAV, wherein the charging head is repositionable in relation to the charging base and the registration member between a normal position and a deflected position to facilitate alignment between first electrical contacts on the UAV and second electrical contacts on the charging head, wherein the charging head is repositionable along an axis extending in substantially parallel relation to an upper surface of the registration member.

2. The charging hub of claim 1, wherein the registration member defines a window receiving the charging head such that the charging head is movable within the window during repositioning between the normal position and the deflected position.

3. The charging hub of claim 1, wherein the registration member includes first alignment members configured for engagement with an external surface of the UAV.

4. The charging hub of claim 3, wherein the charging head includes second alignment members configured for insertion into the UAV.

5. The charging hub of claim 4, wherein the second alignment members are positioned between the first alignment members.

6. The charging hub of claim 1, wherein the charging head includes:

an umbrella; and a printed circuit board (PCB) assembly connected to the umbrella, wherein the PCB assembly is positioned between the charging base and the registration member such that the charging head is captive to the registration member.

7. The charging hub of claim 6, wherein the PCB assembly is slidable and rotatable in relation to the charging base.

8. The charging hub of claim 6, wherein the charging head includes first magnetic members, and the charging base includes second magnetic members substantially aligned with the first magnetic members to bias the charging head towards the normal position.

9. The charging hub of claim 8, wherein the PCB assembly includes the second magnetic members and the second electrical contacts.

10. The charging hub of claim 9, wherein the second electrical contacts extend through the umbrella.

11. A charging hub for a base station configured to receive an unmanned aerial vehicle (UAV) during docking, wherein the charging hub comprises:

a charging head configured for electrical connection to the UAV, wherein the charging head includes:

an umbrella; and a printed circuit board (PCB) assembly connected to the umbrella, wherein the PCB assembly includes:

at least one alignment member configured for insertion into the UAV; and first electrical contacts configured for engagement with second electrical contacts on the UAV, wherein the at least one alignment member and the first electrical contacts extend through the umbrella.

12. The charging hub of claim 11, wherein the PCB assembly includes:

a PCB mount including the at least one alignment member; and a PCB subassembly connected to the PCB mount, wherein the PCB subassembly includes the first electrical contacts.

13. The charging hub of claim 12, further comprising:

a charging base supporting the charging head and defining a channel configured to receive the PCB assembly such that the PCB assembly extends into the charging base.

14. The charging hub of claim 13, wherein the charging head is repositionable in relation to the charging base between a normal position and a deflected position to facilitate alignment of the first electrical contacts and the second electrical contacts.

15. The charging hub of claim 14, wherein the charging head is slidable and rotatable in relation to the charging base.

16. The charging hub of claim 14, wherein the charging head includes first magnetic members, and the charging base includes second magnetic members substantially aligned with the first magnetic members to bias the charging head towards the normal position.

17. The charging hub of claim 16, wherein the second magnetic members are embedded within the PCB assembly.

18. A charging hub for a base station configured to receive an unmanned aerial vehicle (UAV) during docking, wherein the charging hub comprises:

a charging base; and a charging head configured for electrical connection to the UAV and repositionable in relation to the charging base in multiple degrees of freedom between a normal position and a deflected position, wherein the charging head is biased towards the normal position.

19. The charging hub of claim 18, wherein the charging base and the charging head include corresponding biasing members.

20. The charging hub of claim 19, wherein the corresponding biasing members are magnetic.

* * * * *